(12) United States Patent
Maestle

(10) Patent No.: US 7,177,834 B1
(45) Date of Patent: Feb. 13, 2007

(54) MACHINE-IMPLEMENTABLE PROJECT FINANCE ANALYSIS AND NEGOTIATING TOOL SOFTWARE, METHOD AND SYSTEM

(76) Inventor: Wilfried A. Maestle, 4200 Cathedral Ave., N.W., Suite 919, Washington, DC (US) 20016

( * ) Notice: Subject to any disclaimer, the term of this patent is extended or adjusted under 35 U.S.C. 154(b) by 1004 days.

(21) Appl. No.: 09/676,248

(22) Filed: Sep. 29, 2000

(51) Int. Cl.
*G06Q 40/00* (2006.01)

(52) U.S. Cl. .......................................... 705/38; 705/35

(58) Field of Classification Search .................. 705/38, 705/35
See application file for complete search history.

(56) References Cited

U.S. PATENT DOCUMENTS

| | | | |
|---|---|---|---|
| 5,381,332 A | * | 1/1995 | Wood ............................. 705/8 |
| 5,704,045 A | * | 12/1997 | King et al. .................... 705/35 |
| 5,756,140 A | * | 5/1998 | Shoop et al. ................ 426/302 |
| 5,878,404 A | * | 3/1999 | Stout et al. .................... 705/38 |
| 6,092,050 A | * | 7/2000 | Lungren et al. ............... 705/10 |
| 6,269,347 B1 | * | 7/2001 | Berger ......................... 705/38 |
| 2005/0182709 A1 | * | 8/2005 | Belcsak et al. ................ 705/38 |

FOREIGN PATENT DOCUMENTS

JP 02004157805 A * 6/2004

OTHER PUBLICATIONS

Downes J and Goodman J, Dictionary of Fianncial and Investment Terms, Fifth Edition, 1998, pp. 66, 124, 138, 430, 464.*
Access 97 Bible, IDG Books Worldwide, Ind, 1997, pp. 538-539.*
Price J Haddock M and Brock H, Collegte Accounting Seventh Edition, Glencoe Division, 1993, pp. 524-525.*

* cited by examiner

*Primary Examiner*—Charles R. Kyle
(74) *Attorney, Agent, or Firm*—Crowell & Moring LLP

(57) ABSTRACT

A financial simulation computer program product and method to create a project preparation, negotiating, and testing environment using standard project finance tools. A computer usable medium having computer-readable program code is embodied in a medium for generating financial statements, financial data, charts, graphs and reports using the standard project finance tools. The product and method allow automatically generated or manual entry of and editing of capital expenditure time series for multiple contracts in multiple capital expenditure categories. Limited recourse including debt service reserve accounts, stand-by loans and risk-sharing with suppliers and off-takers is taken into account. A desired financing time horizon is selected for each loan. For each loan the user can either manually enter disbursements or select a capital expenditure category and finance a percentage of the category. A loan disbursement time series is automatically generated. A loan disbursement times series is optionally generated independently of changes in capital expenditures and exchange rates based upon an earlier automatically generated loan disbursement time series.

2 Claims, 15 Drawing Sheets

| | |
|---|---|
| ROWS 2-9 | BASIC PROJECT DATA-TIME HORIZON |
| ROWS 10-51 / ROWS 739-748 | CURRRENCIES |
| ROWS 72-356 | CAPITAL EXPENDITURE |
| ROWS 360-371 | OVERHEADS-GENERAL ADMINISTRATIVE COSTS, FACTORY OVERHEADS, INSURANCE |
| ROWS 405-429 | MAINTENANCE COST-NOT DIRECTLY ATTRIBUTABLE TO INDIVIDUAL PRODUCTS |
| ROWS 433-463 | DEPRECIATION AND REINVESTMENT-REINVESTMENT SCHEDULES |
| ROWS 67-479 / ROW 1040 | PAID IN EQUITY-MONTHLY EQUITY SUBSCRIPTION-DIVIDEND EQUITY SUBSCRIPTION PLAN |
| ROWS 480-499 | STAND BY LOANS-SWEEP-ADD. SHAREHOLDER INVESTMENT |
| ROWS 539-734 | LOANS |
| ROWS 995-1022 | TAXES AND SUBSIDIES |
| ROWS 1899-1929 | GENERAL INFORMATION PRODUCTS - INVENTORY CYCLE |
| ROWS 2000-2999 | PRODUCT 1 - CAPACITY USE, PRODUCTION COST, SALES |
| ROWS 3000-3999 | PRODUCT 2 - CAPACITY USE, PRODUCTION COST, SALES |
| ROWS 4000-4999 | PRODUCT 3 - CAPACITY USE, PRODUCTION COST, SALES |

| | |
|---|---|
| ROWS 2-9 | BASIC PROJECT DATA-TIME HORIZON |
| ROWS 10-51<br>ROWS 739-748 | CURRRENCIES |
| ROWS 72-356 | CAPITAL EXPENDITURE |
| ROWS 360-371 | OVERHEADS-GENERAL ADMINISTRATIVE COSTS, FACTORY OVERHEADS, INSURANCE |
| ROWS 405-429 | MAINTENANCE COST-NOT DIRECTLY ATTRIBUTABLE TO INDIVIDUAL PRODUCTS |
| ROWS 433-463 | DEPRECIATION AND REINVESTMENT-REINVESTMENT SCHEDULES |
| ROWS 67-479<br>ROW 1040 | PAID IN EQUITY-MONTHLY EQUITY SUBSCRIPTION-DIVIDEND<br>EQUITY SUBSCRIPTION PLAN |
| ROWS 480-499 | STAND BY LOANS-SWEEP-ADD. SHAREHOLDER INVESTMENT |
| ROWS 539-734 | LOANS |
| ROWS 995-1022 | TAXES AND SUBSIDIES |
| ROWS 1899-1929 | GENERAL INFORMATION PRODUCTS - INVENTORY CYCLE |
| ROWS 2000-2999 | PRODUCT 1 - CAPACITY USE, PRODUCTION COST, SALES |
| ROWS 3000-3999 | PRODUCT 2 - CAPACITY USE, PRODUCTION COST, SALES |
| ROWS 4000-4999 | PRODUCT 3 - CAPACITY USE, PRODUCTION COST, SALES |

FIG. 12B

MACHINE-IMPLEMENTABLE PROJECT FINANCE ANALYSIS AND NEGOTIATING TOOL SOFTWARE, METHOD AND SYSTEM

MICROFICHE APPENDIX

I attach a first Microfiche Appendix of my computer program listing consisting of a total of 16 microfiche and a total of 1521 frames, and a second Microfiche Appendix (Flow Chart and Graph Appendix) of entry forms flow charts and graphs of the hereinafter described computer program consisting of a total of 4 microfiche and a total of 357 frames.

BACKGROUND OF THE INVENTION

The present invention relates to a project finance analysis and negotiating tool (also referred to by the acronym "PFANT") and, more particularly, to machine-implementable software that permits banks, engineering companies, project sponsors, credit insurance advisers and others having interest in a project to undertake a comprehensive financial analysis for negotiating major building projects such as industrial plants and roads.

Interested parties to a project finance deal attempt to undertake a thorough financial analysis before financial closure. The analysis is part of the due diligence of any potential lender. The parties create a financial model based on a feasibility study (market survey, engineering etc.). Usually they agree on a limited recourse package to support the project-company in case of cash flow problems.

The science of project financing is becoming more developed and studied. Various sources exist for learning about the many aspects of project financing, one example being a text authored by John D. Finnerty entitled *Project Financing/Asset-Based Financial Engineering* published in 1996.

The parties create the financial model specifically for the project they prepare. This is usually done with a spreadsheet(s). Creating a financial model is a highly specialized and costly task. Financial models are subject to change as project-preparations progress. During negotiations proposals are aired whose consequences quite often cannot be properly assessed without revising the financial model first. This adds cost and delays project preparations.

Financial modeling spreadsheet software is now usually generated on a project-specific basis. In addition to taking into account the specific details of a particular project, the software modeler has to work with the requirements of a particular spreadsheet software package. In an effort to overcome some of these time-consuming problems, certain "golden rules" have been developed for project finance modeling in order to give a modeler a methodology regarding layout, structure and technique interaction to improve skill levels. Such an approach is taken in a prior art publication entitled *Financial Modeling For Project Finance*, a Euromoney/DC Gardner workbook.

Notwithstanding the usefulness of such guidelines and relatively sophisticated spreadsheet software, they do not eliminate the laborious tasks associated with project finance modeling. More importantly, they do not provide interested parties with sufficient flexibility during negotiations to determine if a project is feasible and under what circumstances.

To this date there exists no project finance software package that creates a project preparation, negotiating and testing environment with the standard project finance tools (debt service reserve accounts {[DSRA], sweep, stand-by loans, deferral credits for inputs and off-take fees, input price as a function of sales price).

SUMMARY OF THE INVENTION

It is an object of the present invention to provide what I refer to as a Project Finance Analysis and Negotiating Tool, or PFANT. Specifically, it allows a non-financial modeler to describe production and marketing in a multi-product, multi-currency environment; enter data without going through a programming exercise; and quantify the financial impact of proposals on the negotiating table during negotiations. This approach reduces costs, speeds up and facilitates project preparations. It also empowers non-financial specialists and thus opens up the project financing process to many other potentially interested parties.

The Project Finance Analysis and Negotiating Tool (PFANT) can use a graphical user interface (GUI) to automate the spreadsheet program. The PFANT generates, inter alia, a cash flow, income statement and a balance sheet using standard project finance tools. The PFANT further allows the user to:

specify up to three products with a linear production function which, like other hereinbelow mentioned items, is scaleable as computing power increases.

create up to eleven currencies project currencies) and attach these currencies to loans, products or inputs;

simulate currency shocks and volatility and take care of foreign exchange gains or losses;

enter up to sixty capital expenditure (CAPEX) contracts in any project currency;

loan-finance up to 100% of any CAPEX contract, a sub-element of the contract or a group of contracts (e.g., all equipment contracts) for a freely definable time period (first to last disbursement month) and to capitalize up to 100% of interest thereon during the time period starting with the first disbursement month until the last interest capitalization month where the latter can be any month up to and including the first loan repayment month;

design manually disbursement plans;

repay in equal installments, as an annuity or by a manually designed repayment plan, including combining equal installments with the sweep;

set up stand-by loans for the construction and loan repayment phase;

design an equity subscription plan while ensuring that the DSRAs are always at their required balances and a target equity ratio is met;

automatically depreciate capital expenditure linearly and to automatically reinvest;

enter overheads in any project currency;

enter up to fourteen fixed operating cost items (scaleable) per product in any project currency and to establish a price trend for each fixed operating cost item;

enter up to fourteen variable input items per product and establish price trends and/or price volatility for each variable input item;

share risks through the variation of the input price according to the output sales price (two input factors per product—scaleable) subject to a freely selectable minimum input price (for which a price trend can be established) and through the deferral-credits of input payments if the sales price goes below a trigger price and the company faces cash flow problems;

use three sales methods: (1) sales through off-takers, (2) direct sales, and (3) mark up sales. In case of off-take sales (up to three contracts per product) risk sharing is possible through a handling and/or flat fee deferral-credit mechanism if sales prices fall below a freely selectable trigger price and the company faces cash flow problems;

present the cash flow, the income statement and the balance sheet on a monthly, quarterly, semi-annual and annual basis with the usual ratios; and freely set the fiscal year.

The PFANT software comes with the standard financial ratios. It provides graphical illustrations of, inter alia, liquidity, profitability and debt service coverage. The PFANT software illustrates, among other things, the robustness of the limited recourse package graphically by demonstrating how much allocated recourse will be used up under a given exchange rate or cost scenario.

The PFANT software provides a major analytical leap as it allows a limited recourse package to be subjected to different sorts of cost and currency shocks without hands-on changes to the spreadsheet. The direct (without programming) access to the results and the comprehensive graphical illustrations makes it a useful negotiating tool. No programming sessions (interruptions) are needed to integrate and assess proposals.

The PFANT software allows a standardized approach to project finance models. It allows potential creditors or export credit insurance agencies to double check financial models that have been submitted to them without going through a time consuming audit of these models. The PFANT software comes with a standardized variable list. It provides a complete project finance environment in which all currencies, prices and costs can be freely set.

The PFANT software uses an "as you type" (real time) entry validation system that gives the user immediate feedback. This prevents lengthy error messages as the entries of a whole data set (e.g. describing a loan) are validated when the user hits Enter.

By virtue of the unique PFANT software architecture, I have been able to provide software which achieves a number of advantages, namely:

checking entries as they are inputted, double checking models, working on different scenarios and undertaking extensive sensitivity analysis in the form of automatic test runs for key variables (e.g. interest and exchange rates, costs and start-up dates) with the results being written into a file;

using the GUI to provide the user with the ability to enter data during negotiations and have a relatively quick assessment of multiple scenarios with differing proposals and counterproposals, and to save these scenarios for future reference as the negotiations and/or project proceeds;

interactively providing immediate access to the impact of relevant project data on a project's viability;

providing a program which is machine- or Internet-implementable which requires only a few mandatory entries such as technical capacity and input-output coefficients to allow users initially to accept default values with later refinement and thereby obtain an approximate answer at early stages of project design; and allowing users to exchange information with other interested parties.

BRIEF DESCRIPTION OF THE DRAWINGS

Other objects, advantages and novel features of the present invention will become apparent from the following detailed description of the invention when considered in conjunction with the accompanying drawings.

FIGS. 12A and 12B are, respectively, a schematic of the case file structure showing the Worksheets 1–9, and the data bank (Worksheet1) of the case file structure.

DETAILED DESCRIPTION OF THE DRAWINGS

Although this disclosure is directed to persons of ordinary skill in the field of project finance modeling, which persons are familiar with the customary financial terminology, I am defining below the terms used throughout and the manner in which I am using them, which I believe to be generally consistent with normal and customary usage. To the extent there are any discrepancies, the following terminology should control the interpretation of my disclosure. Furthermore, a more complete description of the routines if found in the second microfiche appendix, notwithstanding the fact that the essential disclosure to enable a person of ordinary skill to make and use the invention is fully described hereinbelow.

Figure 11A:
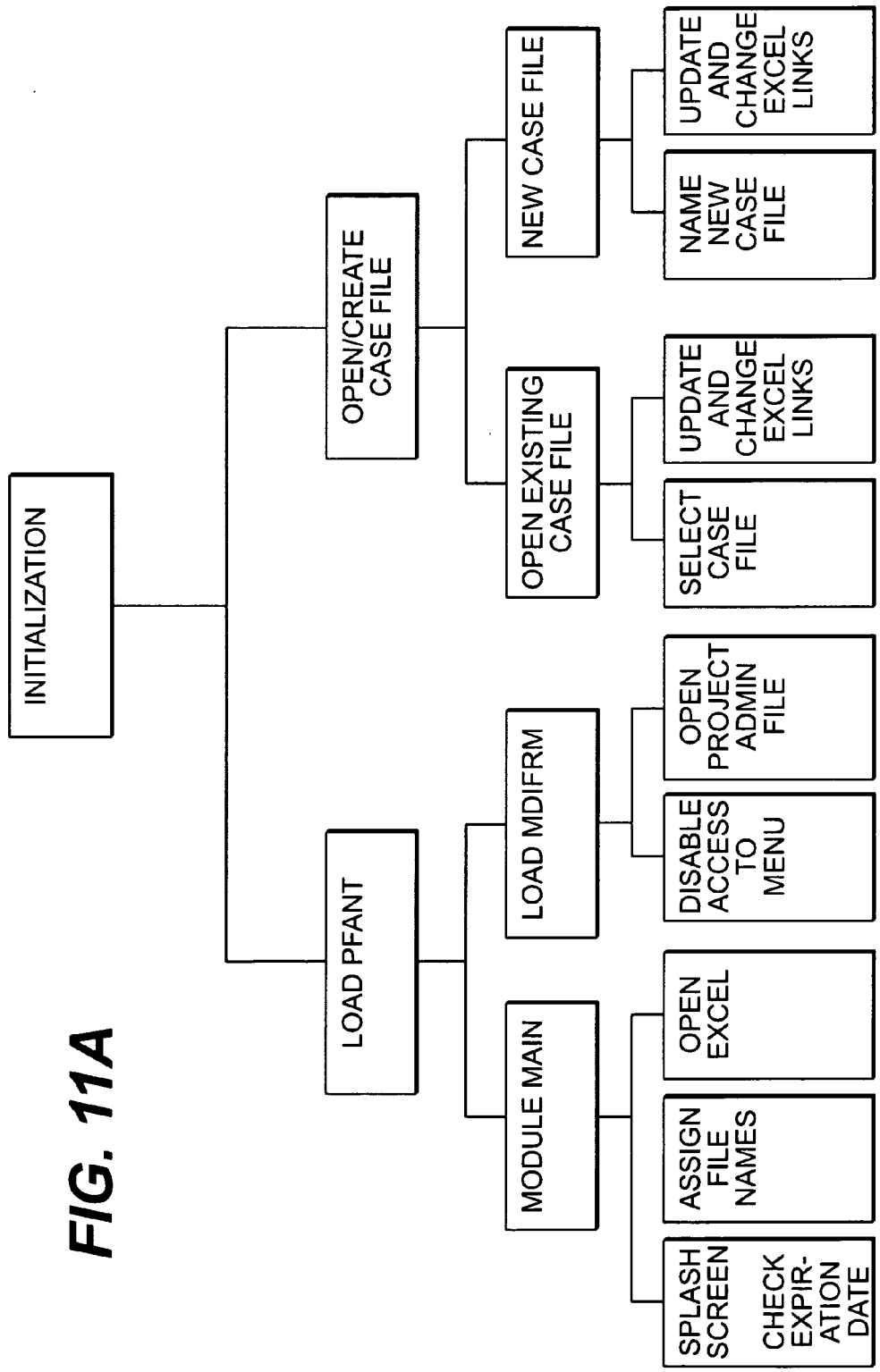
FIGS. 11A, 11B, and 11 C are file structure charts of the computer program for initialization, input and editing of project data, and showing results and sensitivity testing.
Figure 11B:
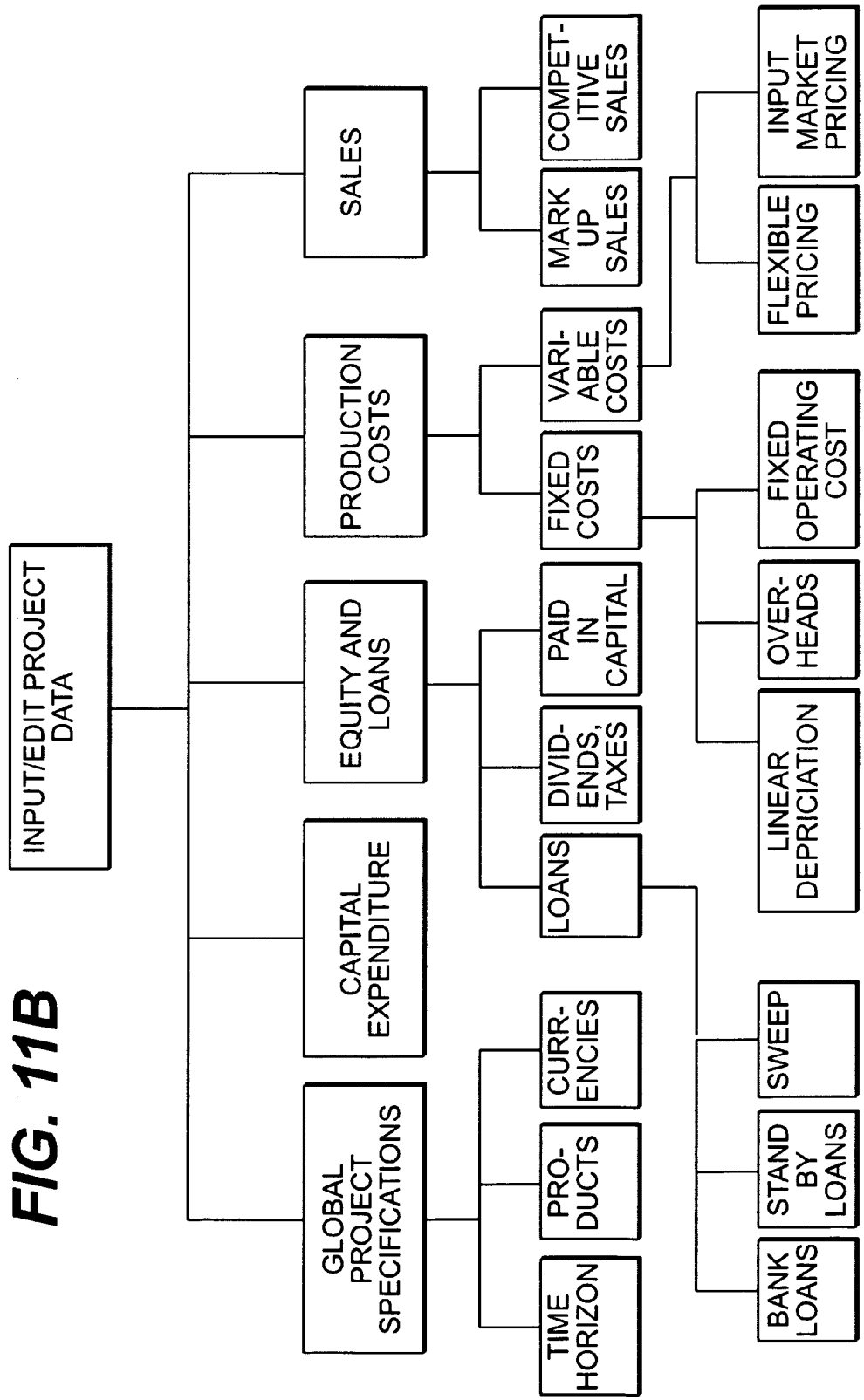
Figure 11C:
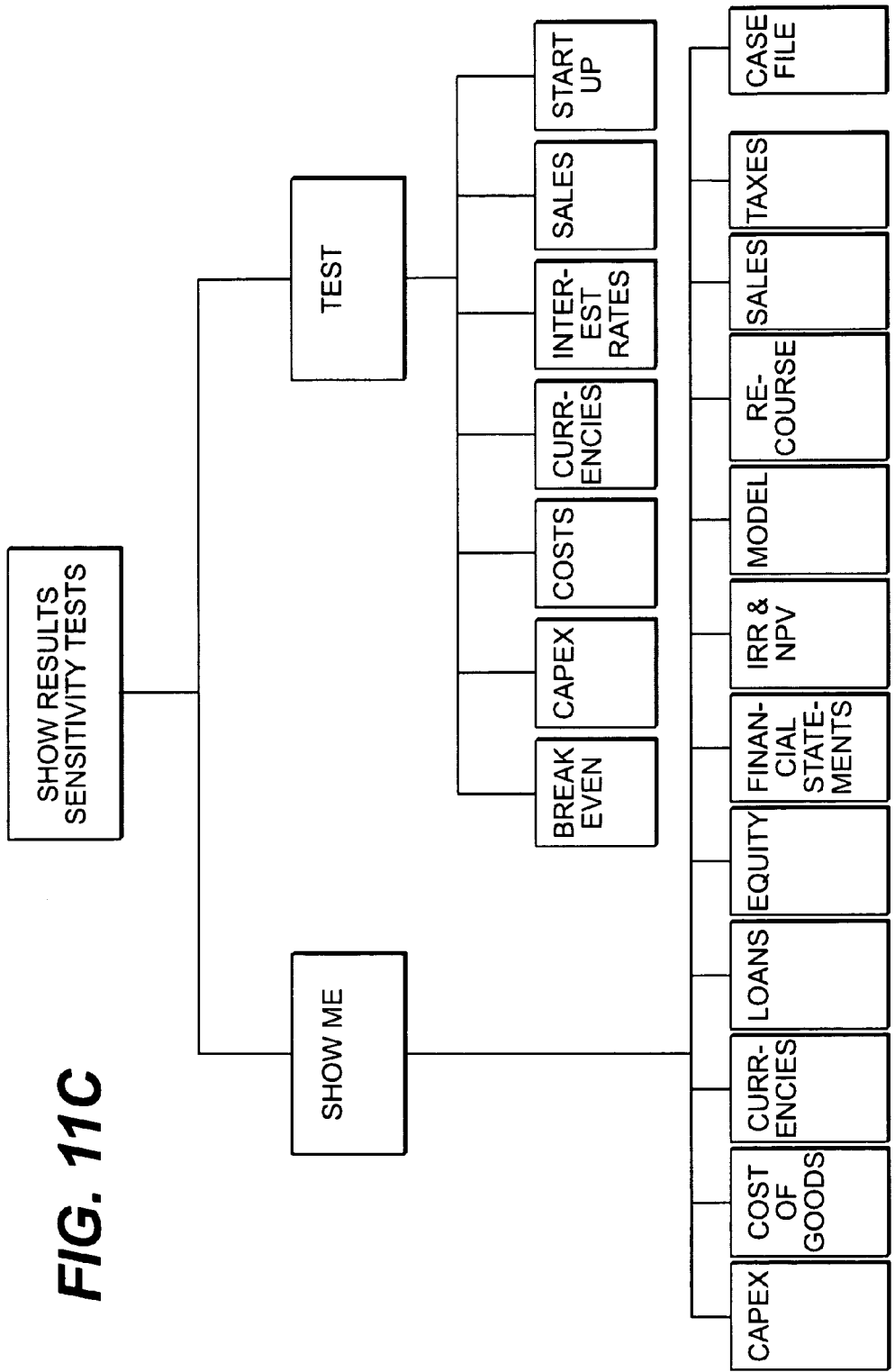

The basic file structure of the computer program is shown in self-explanatory FIGS. 11A, 11B, and 11C, beginning with utilization and then shown results and doing sensitivity testing.

Terminology

Actual Capacity Usage

Each plant has a theoretical maximum capacity. The Actual Capacity Usage is a percentage of the maximum capacity—e.g. 95%.

Additional Shareholder Investment

A company must be able to fulfill its payment obligations as they arise. It must either have sufficient cash in hand (stock) or cash flow to provide the necessary liquidity. In case the cash flow remains negative after all the available limited recourse has been used up, the PFANT first empties the cash account. Once the cash account has been emptied, the PFANT turns to the project sponsors for additional cash—this is called additional shareholder investment.

Administrative Overheads

Administrative cost that are not directly related to a product.

Annuity

One of several loan repayment methods. With an annuity the debt service is equal over the loan repayment period i.e. the sum of principal and interest is always the same.

Appreciation

If a currency appreciates, more units of the numéraire have to be paid for one unit of the currency.

Arrangement Fee

Commercial fee that a lead bank charges for arranging a loan through a consortium of banks.

Average No. of Days from Creation of Payment Obligation to Payment

Sellers and buyers agree in the sales contract on payment conditions. Payment may be due in advance, at the time of receipt of goods or service or later. It is however not unusual to delay payment. This saves working capital. The Average No. of Days from Creation of Payment Obligation to Payment is the average no. of days the project company delays actual payment.

Average No. of Days Before Receipt of Payment

Sellers and buyers agree in the sales contract on payment conditions. Payment may be due in advance, at the time of sale or later. It is not unusual to delay payment. This decreases the firm's liquidity. The Average No. of Days before Payment is the time average no. of days from the moment of sales to receipt of payment.

Balance on DSRA

The balance is the amount of monies held in the debt service reserve account (trust account). The PFANT differentiates between the required balance as specified in the trust agreement (usually part of the legal project documents) and the actual balance on the account.

Balance Sheet

Statement of assets and liabilities of a company.

Base—Percent of Next Debt Service

The trust agreement for the debt service reserve account usually specifies what amount has always to be kept in the debt service reserve account. This is called the base. In addition, monthly step ups are often agreed upon.

Base for Input Factor Pricing

Output prices can be quite volatile. This can put the cash flow of a company at severe risks. One way to mitigate such risks is to pass them partly on to major input suppliers. If the price for an input varies with the sales price, in case of a slump the payment obligations of the company towards its input suppliers will also go down. In the PFANT the user can select as base for variable input factor pricing a sales contract and the related sales prices.

Break Even Price

Sales price of a good that allows the company not to make any losses nor to generate any earnings.

Break Even Month

The PFANT allows the user to select a month and then search for the sales price that allows the company to break even in that month. The month the user is looking at is the "target" break even month.

Case File

The case file is a spreadsheet that serves as a data bank. The case file is mobile and can be exchanged with other users. A spreadsheet is used to store a project case to allow for easy inspection.

Cash Flow

Statement of all cash in flows and outflows during a period.

Commitment Fee

A commercial bank usually charges a fee (e.g. 0.25 percent per year) on the loan amount that the borrower has not yet drawn down. Example: Total loan amount USD 100,000. In after one year, the user has utilized USD 60,000, he will have to pay a commitment fee of 0.25 percent on the still unused loan amount, that is USD 100 per year. The commitment fee is often payable three months in arrears.

Commodity Market Pricing

The output sales price is determined competitively on the output market. The firm is a price taker. (the alternative to this method is mark up or cost plus pricing).

Construction Period

Time from project start to start up of operation i.e. the moment the plant starts to operate.

Corporate Taxes

Taxes on the income of a corporation. Corporate taxes are country specific and tax rates on retained earnings often differ from tax rates on disbursed income (dividends).

Cost of Goods

Sum of variable and fixed operating cost directly attributable to a product.

Cost Plus Pricing

Synonym for mark up pricing. The sales price is derived on the basis of cost plus a mark up percentage.

Current Ratio

Current assets divided by current liabilities. The current ratio is a rough liquidity measure. A high current ratio means that you have a lot of cash or quite liquid assets (like finished goods) that you can use to pay of current liabilities.

Cycle Status at Project Start (Variable Costs)

The PFANT uses a circular function (sine curve) to simulate price volatility. The cycle status describes the angle (degree) of the function at project start. To keep things simple, the PFANT uses four different description (half way up, top price, half way down, bottom price. This technology and terminology is applied mutatis mutandis to exchange rates, off-take sales prices and variable input prices.

Cycle Length

Number of months it takes a price to go through a full up and down swing. The PFANT allows the user to set the cycle length (frequency).

Days from Order to Delivery

Time from placement of the order to receipt in stock. Important for inventory management.

Deferral Mechanism (Off-Taker)

Sometimes the off-taker agrees to defer some of his fees if the project company has cash flow problems. The PFANT implements the deferral as a loan given to the project company. That is, while the full amount of fees that is due is paid and appears in the income statement as an expense, the project company receives at the same time a loan equal to the amount of fees that is deferred. Often the deferral is subject to a trigger price.

Deferral Variable Costs

Sometimes the supplier of a principal input agrees to delay receipt of payment if the company has cash flow problems. The PFANT implements the deferral as a loan given to the project company by the supplier. I.e. the full price for the input is paid, however, the project company receives a loan equal to the deferred amount. The deferral is often subject to a trigger price.

Debt Ratio

Total liabilities/Total assets

Debt Equity Ratio

Total liabilities/total equity

Debt Service

Periodical payments of interest and principal over the loan repayment period.

Debt Service Coverage Ratio (Free Cash Flow+Financing)/Debt Service

Debt Service Reserve Account (DSRA)

Trust account often requested by commercial lenders. The project documentation usually requires that the DSRA must be replenished up to the required balance before cash flow can be used for other purposes. The balance of the DSRA serves as collateral. Lenders can ask the trustee to make the balance in the trust account available if the project company does not service its debts.

DSRA Base and Step Ups

The debt service reserve account has usually a base (a percentage of the next debt service). In addition, often monthly step ups are required. The step ups ensure that at the payment date in addition to the amount in the base, the amounts to be paid as debt service are in the trust account. Once the debt has been serviced, the base is still intact providing the lender the certainty, that the next installment can be serviced. DSRA accounts usually differentiate between a base for interest and a base for principal.

Depreciation

A capital good looses value through passage of time (technical obsolesence) or(and) use for production. The loss of value is called depreciation. The PFANT uses the linear depreciation method. The linear depreciation method assumes that the depreciation is equal over the lifetime of the captial good.

Direct Costs

Direct cost can be directly allocated to the production of a good. If ten workers are needed to man a production line for a product, these ten workers represent direct labor. The materials used in the production line are direct material.

Disbursement Methods

The PFANT knows two disbursement methods: Manually entered ammounts, or following the expenditure schedule of a contract in one of the capital expenditure categories.

Disbursement Schedule

A loan has a loan effectiveness date, a first disbursement date and a last disbursement date. The last disbursement date must be before the last repayment date.

Down Payment

Percentage of payment due at date of contract effectiveness. A contractor often needs the down payment for mobilization.

Equal Installments

Loan repayment method. The loan amount is divided by the number of installments.

Equipment

Machinery, tools etc necessary for production.

Equity Ratio

Equity divided by total capital (equity+liabilities).

Exchange Rate Volatility

The PFANT uses a sine function to simulate currency volatility. You can influence both the the length of a currency cycle (frequency) and the size of the swings (amplitude) around the long term value of the exchange rate.

Financial Statements

The financial statements of the PFANT comprise the Cash flow, income statement and balance sheet.

Fiscal Year

Accounting year of the firm. The fiscal year may or may not coincide with the calendar year.

Fixed Operating Costs

Fixed cost caused by the operation of the project company. E.g. salaries for guards.

Flat Fee p.a. (Off-Taker)

The PFANT allows Off-takers to a handling fee and/or a flat fee for their services as traders.

Flat Learning Curve

Often it takes time to run in a plant. Output can be flat first, and then pick up. The PFANT calls this a flat learning curve.

Flat Payment p.a.

Payment due regardless of amount sold or bought. E.g. a connection charge.

Gross Profit Margin (Net Sales−Cost of Production)/Net Sales

GDP-Deflator

Discount factor for the numéraire. Allows to simulate inflation/deflation of the unit of account.

General Purpose Loans

Loans that can be used for any purpose. In contrast to stand-by loans, suppliers' credits or deferral loans.

Handling Fee

Usually the off-taker charges a percentage of the sales receipts for his services as a trader.

Handling Fee Deferral Percent

The PFANT allows the project company to share risks with the off-taker. The user can decide what percentage of the handling fee is deferred (in form of a loan to the project-company).

Hierarchy—Limited Recourse

In project finance, sponsors incorporate a project company. The project-company receives equity and loans. Without additional agreements the corporate veil would limit the potential losses of the project sponsors to their share in the equity. For lenders, this is often not acceptable. They request limited recourse that kicks in if the project-company gets into trouble. The limited recourse can take various forms: Stand by loans, additional shareholder investment etc. The project documentation usually contains a set of rules that govern the limited recourse. The PFANT calls this set of rule the Limited Recourse Hierarchy. The hierarchy determines which limited recourse component is drawn down first, second, etc. and how repayment works.

Import Content

Value of goods that are imported into the country where the project company operates.

Income Statement

Statement of operations of the firm. Reports all sources and amounts of revenues and expenses incurred by the firm with the resulting profit (net income) earned during the reporting period.

Indirect Taxes

An indirect tax is levied on a good or a service and not a person. In contrast to direct taxes like the income tax.

Input Price as Percent of Off-Take Contract or Sales Price

Method to share risks with your principal supplier. The input price varies with the output price. If sales receipts are down, so are payment obligations vis-a-vis the supplier.

Input Output Coefficient

The input output coefficient will be 0.5 if 0.5 units of input a are needed to produce one unit of output.

Interest Calculation Methods

The PFANT works with two methods: Standard—year has 365 days. Euro—year has 360 days. The Euro method leads to a higher effective interest rate.

Interest Coverage Ratio (Free Cash Flow+Financing)/Total Interest

Interest on DSRA

The debt service reserve account is a trust account for project company funds that serve as collateral for lenders. The DSRA is held by a trustee bank. The interest earned on the account goes to the project company.

Internal Rate of Return (IRR)

Interest rate at which the net present value of an investment is zero.

Inventory Cycle

Average time a finished good remains in stock before it is sold.

Limited Recourse

Without additional agreements the corporate veil of the project-company would limit the potential collateral to the assets of the project company. In case of a cash flow crisis it would be up to the lenders to inject additional funding. For lenders, this is often not acceptable. They request limited recourse that provides additional safety and kicks in if the project-company gets into trouble. The limited recourse can take various forms: Stand by loans, additional shareholder investment etc.

Linear Learning Curve

Often a plant has to be run in. A linear learning curve assumes that the production increases equally during the learning period.

Linear Depreciation

Depreciation in equal amounts over the useful lifetime of the machine.

Learning Curves

Often time is needed to run in the plant. At start up output is low. Over time it increases. The pattern of output increase is called a learning curve.

Local Content

Value of goods that are bought locally in the country where the project company operates.

Management Fee

A commercial bank usually charges a fee for the administration of a loan. The management fee is usually due at loan effectiveness.

Manual Repayment Plan

Some economically viable types of project generate cash flows that do not allow loan repayment in equal installments or as an annuity. In such cases it is necessary to manually tailor the repayment schedule to the repayment capacity.

Mark Up Pricing

Synonym for cost plus pricing. Sales price is determined by a cost base plus a percentage mark up.

Mark Up Base

Cost used for mark up or cost plus pricing. The PFANT allows various selections (e.g. Total Operating Costs).

Mark Up Percent

Percentage of cost basis added to cost to derive the sales price.

Maximum Capacity

Theoretical maximum output per year.

Maximum Deferral—Credit Amount

Cash flow risks can be shared with off-takers and/or input suppliers who agree to have their payments deferred.

Minimum Price/Unit of Output (Variable Cost)

Sometimes the price of an input is linked to the market sales price of the output. This allows to pass through cash flow risks. However, normally the input supplier insists on a minimum price.

Minimum Stock

Permanent stock. Minimum amount of an input that is always kept in stock.

Monthly Step Ups

A debt service reserve account has usually a base. The base is a percentage of the next debt service. Lenders often request that on top of the base the project company makes monthly step ups so at the next payment date the debt can be serviced (using the amount accumulated through the monthly step ups) without the base being touched.

Net Income

Profits after taxes.

Net Present Value

Discounted value of future payments.

Net Working Capital (Current assets−current liabilities).

Numeraire

Unit of account.

Off-Take Agreements

Long-term agreements with trading firms that commit themselves to sell the output of the project company.

Overheads

The PFANT uses the expression overheads for fixed operating costs that are not directly attributable to a product.

p.a.

Per annum—per year.

Pre-Production Costs

Sundry cost like legal fees incurred before start up of operations.

Product Specific Limited Recourse

Limited recourse provided in the context of an off-take contract or of a variable input supply contract.

Profit Margin

Net Income/Net Sales

Project Start

First month in the project cycle. Start of the construction period. The construction period ends at the start up month—the first month the plant operates.

Quick Acid Test (Cash+Accounts Receivables)/Current Liabilities

Reinvestment

Capital expenditure to update the plant and keep it competitive.

Repayment Methods

Annuity, equal installments or manual repayment plan.

Replenishment of DSRA

The loan documentation usually stipulates that a depleted debt service reserve accounts (trust account) must be replenished once cash flow is available. The replenishment of the DSRA has usually priority over other non-operating payment needs.

Return on Equity

Net income/((Equity $t-1$+Equity $t$)/2)

$t$ stands for time period

Return on Total Assets

Net Income/((Assets $t-1$+Assets $t$)/2))

Sales Expenses

Cost incurred by the project company or the off-taker directly related to sales. E.g. Transport cost to point of delivery.

Senior Debt

Debt serviced with priority. Available funds are first applied to service senior debt.

Stand by Loan Construction, Repayment Phase

A loan made available to the project company during the construction or repayment period in case of cash flow problems. A stand by loan is a limited recourse instrument.

Start Up of Operations

End of the construction period. Plant starts to operate and produce output.

Steep Learning curve

Often it takes time to run in a plant. Output increases can be big at first, and then level off. The PFANT calls this a steep learning curve.

Supplier's Credit

The PFANT assumes that at start up of operation (the moment when the plant starts to produce) the equipment is fully in place. At start up of operations the equipment is activated in the balance sheet at the full equipment-procurement contract value. However, it is quite possible that not all payments under the procurement contract have been effected. There might e.g. a final payment be pending. Amounts not yet paid are at start up listed in the balance sheet as supplier's credits under liabilities.

Sweep

Sometimes lenders require a project company to use available cash flow (after other payment obligations have been met) for pre-payment of loans. Available cash flow is swept into pre-repayment to mitigate risk.

Time Needed to Produce One Unit of Output

The time a product spends in the production process before it is finished. This information is needed to calculate the balance sheet position work in progress.

Total Unconditional Reserves

In case of cash flow problems, recourse can be made available either unconditionally, i.e. without the fulfillment of further conditions, or conditioned on trigger price being met.

Total Unused Product Recourse

Limited recourse amounts available from the supplier of an input or/and the off-taker that have not been drawn down.

Unused Recourse

Recourse are funds available to the company in case of a cash flow crisis. Such (limited) recourse can be made available in several ways. The PFANT defines unused recourse as recourse amounts that have not been drawn down and are still available.

Utilization

Loan amount that has been drawn down and not been repaid. At the end of the repayment period when the loan has been fully repaid the utilization is zero.

Variable Costs

Costs that vary with the number of units of output produced.

Work in Progress

Work in progress are fixed assets (buildings or equipment) or goods that are under construction or fabrication, and hence are not yet ready to be used or to be sold.

I. General Overview

A. The Data

Figure 4:
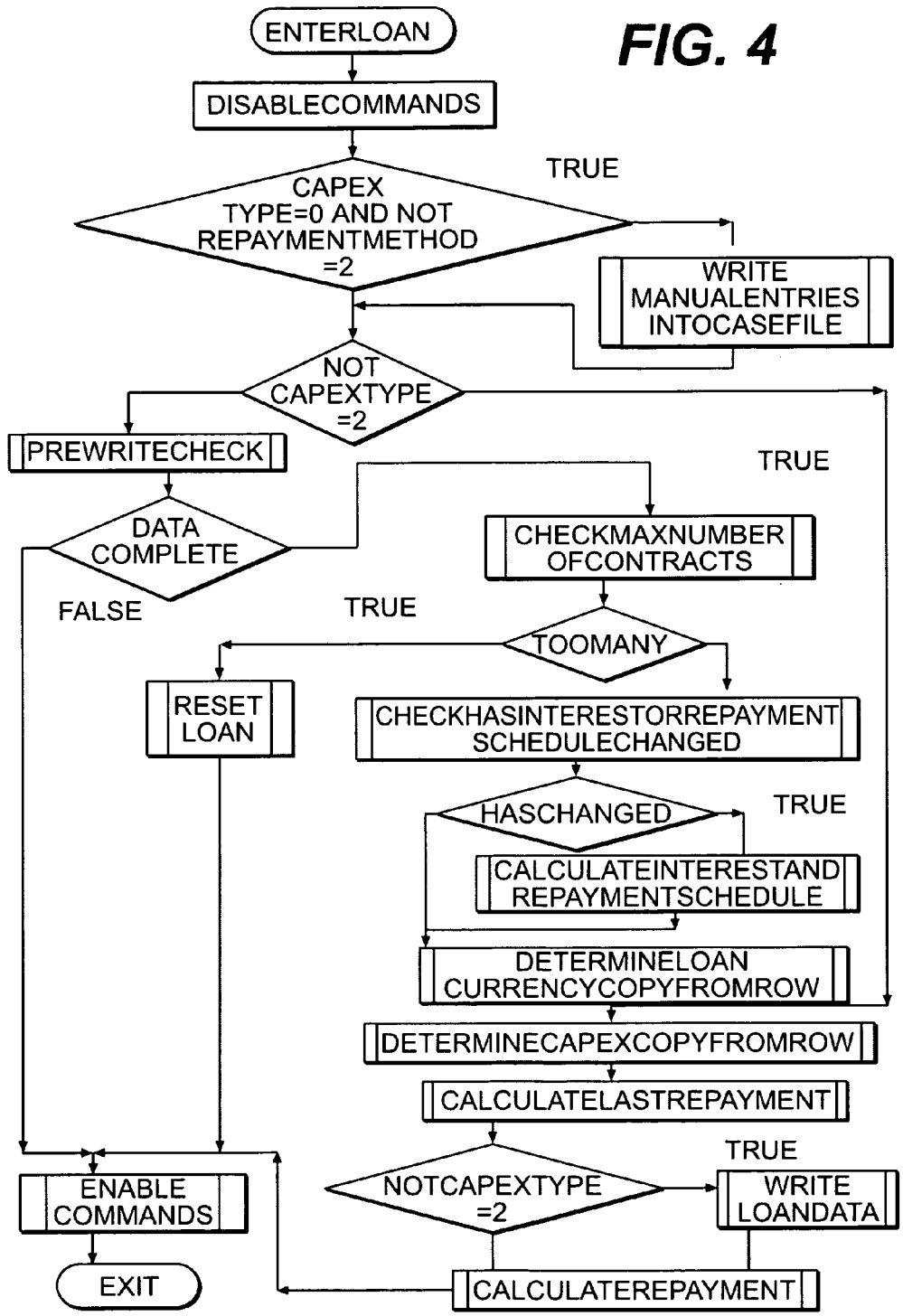
FIG. 4 is a representative flow chart of an enter loan procedure for writing data into the case file.
Figure 12A:
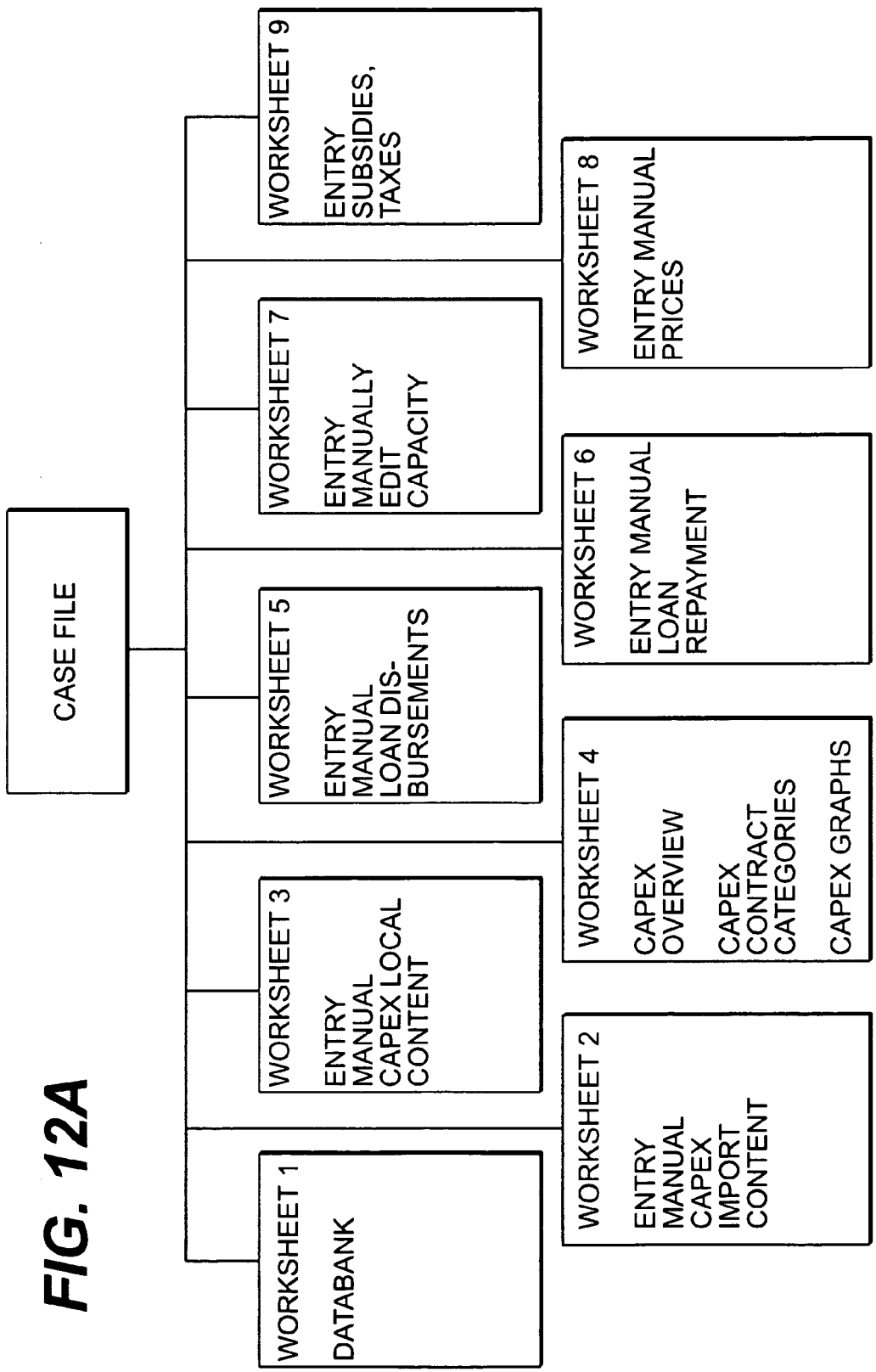

The PFANT software describes each project finance deal by a set of data that the user enters into a case file spreadsheet. A list of the variables comprising such a data set is found in Table I. The case file, whose structure is shown in FIG. 12, functions as a data bank and is linked to the product cost calculation files and the cash flow calculation spreadsheet. The PFANT software provides a graphical user interface (GUI) which allows the user to look directly at the case file spreadsheet or to access the data. The GUI allows entries into the case file and manipulation of earlier entries in a manner like that shown in the EnterLoan procedure flow chart of FIG. 4. The GUI provides entry forms for individual topics such as, inter alia, technical specifications, currencies, capital expenditure and loans. Each currency, capital expenditure contract etc. is described by an individual record. The individual records make up a data subset (e.g. the loan data subset). The data subsets in the case file are sequentially read. The user can call up, modify or delete individual records. If she deletes a record, the records with a higher index position are moved into a lower positions. New entries are added to the end of the data subset. The user gives the record a name (e.g. Loan 1). She can access the record by writing its name in a combo box or selecting it from a drop down list. The PFANT software checks the name against all names in the data subset as the user writes the name into the combo box. The PFANT software loads the corresponding record if the name is equal to an existing record name. If no match is found, the entry fields corresponding to the subset are cleared for a new subset entry and the software displays the corresponding default values.

TABLE I

| Data | Optional - Required | Default | Impact of Default |
| --- | --- | --- | --- |
| NAME, SCHEDULE AND TECHNICAL SPECS. | | | |
| Basic Project Data | | | |
| Project Name | Required | Name of Project | None |
| Project Start Month | Required | January | Project start January |
| Project Start Year | Required | 2000 | Project starts in 2000 |
| End of Project | Required | 73 | Analysis ends in project month 73 |
| Start of Fiscal Year | Required | January | FY starts in January |
| Start up of Operations | Required | 4 | Project starts to produce in Project Month 4 |
| Technical Specifications | | | |
| Product | Required | Empty | No production, no Sales |
| Measurement Unit Output | Required | Empty | Output not specified (tons, kg, pounds etc.) |
| Maximum Capacity p.a. | Required | One | Maximum output one unit per year |
| Actual Capacity Usage - % | Required | Zero | Production zero |
| Capacity use at Start up - % pa | Required - exception: Manual Learning curve | Zero | No production in start up month |
| Learning Period - Month | Required | One | Learning period one month |
| Learning Curve | Required | None | No learning curve. Production starts with actual capacity usage. |
| Time/Unit of Output (Days, hours, minutes, seconds) | Required | Zero | Current asset position work in progress is zero. Underestimation of working capital needs |
| Share Overheads - % | Optional | Zero | No overheads allocated to product. In case of mark up pricing, lower mark up base. |
| Share Depreciation | Optional | Zero | No depreciation allocated to product. In case of mark up pricing lower mark up base. |

TABLE I-continued

| Data | Optional - Required | Default | Impact of Default |
|---|---|---|---|
| CURRENCIES | | | |
| Numeraire | | | |
| Name of Numeraire | Required | Numeraire | Unit of calculation called numeraire. |
| GDP- Deflator | Required | Zero | No inflation in numeraire. |
| Last Project Month Inflation | Required | One | Inflation ends in project month one |
| Additional Currencies - Optional | | | |
| Additional Currency | Optional | Empty | Only numeraire available. |
| Exchange Rate | Required with Add. Currency | Empty | Model does not allow you to enter additional currency into case file. |
| Exchange Rate trend - % p.a. | Optional | Zero | Exchange rate constant |
| Last Month of Exchange Rate Trend | Optional | One | Exchange rate trend ends in project month one. |
| % - Currency Swings | Optional | Zero | Exchange rate is stable. No volatility. |
| Months - Length of Currency Cycle | Optional | Sixty | Frequency of currency cycle (up and down of exchange rate) is 12 months. |
| Start of Currency Cycle | Required | Half Depreciated | At project start additional currency is at long term trend exchange rate. Price of numeraire goes up. |
| One Time Devaluation (+) - Appreciation (−) | Optional | Zero | No one time currency shock. |
| Month of One time Exchange Rate Change | Required | One | Currency shock, if any, in project month one. |
| CAPITAL EXPENDITURE (CAPEX) | | | |
| Site, Buildings, Equipment, Pre-Production Costs | | | |
| Site, Buildings, Equipment, Pre-Production | Optional | Empty | No capital expenditure in the respective category |
| Currencies Import-Local Content | Required with capex | Numeraire | Numeraire is currency of respective capex contract. |
| Customs - % | Required with capex | Zero | No customs on capex import content |
| Month of First Payment | Required with capex | One | First disbursement in project month one |
| Month of Last Payment | Required with capex | One | Last disbursement in project month one |
| Manual Entry | Optional | Manual | You have to enter manually capex during disbursement period. If you make no entries, capex is zero. |
| Automatic Entry | Optional | Manual | You have to tell the program the total contract amount, the percentage of down and final payment. |
| Total Contract Amount | Required with automatic entry | Zero | Capex zero |
| % - Down Payment | Optional | Zero | Capex in first disbursement month zero |
| % Final Payment | Optional | Zero | Capex in last disbursement month zero |
| LOANS | | | |
| Bank Loans | | | |
| Loan Page One | | | |
| Loan (name) | Optional | Empty | No loan |
| Loan Currency | Required with loan | Numeraire | Numeraire is loan currency. |
| Interest p.a. - % | Optional | Zero | No interest payments |
| Interest Calculation Method | Required with loan | Standard | Year has 365 days. |
| No. of Months interest paid in Arrears | Required with loan | Six | Interest - if any - paid six month in arrears. |
| % of Interest Capitalized | Optional | Zero | No interest capitalized. |
| Management Fee - % | Optional | Zero | No management fee |
| Arrangement Fee - % | Optional | Zero | No arrangement fee |
| Commitment Fee % | Optional | Zero | No commitment fee |
| No. of Months Commitment Fee is paid in Arrears | Required with loan | Three | Commitment fee is paid three months in arrears. |
| Disbursement Phase - DSRA as % of next Debt Service | Optional | Zero | No DSRA during disbursement phase |
| Repayment Phase - DSRA as % of next Debt Service | Optional | Zero | No DSRA during repayment phase |
| Interest on DSRA - % p.a. | Optional | Zero | No interest on DSRA |
| Monthly Step ups | Optional | Checked | Model calculates monthly step ups for DSRA |
| Loan Page Two Financing | | | |
| Capex Type | Optional | Total CAPEX | Loan finances percentage of total capex. |
| Capex Category | Required with loan | Total Expenditure | Loan finances % of total expenditure under the contract. |

TABLE I-continued

| Data | Optional - Required | Default | Impact of Default |
|---|---|---|---|
| % of Payment | Required with loan if financing is not Manual | 100% | Loan finances 100% of disbursements of a Capex Type and Capex Category in a selected time period (see below) |
| Manual Disbursement Schedule | Optional | Not checked | No access to manual disbursement schedule |
| Month of Loan Effectiveness | Required with loan | One | Loan effective in month one |
| First Disbursement Month | Required with loan | One | First disbursement possible in project month one |
| Last Disbursement Month | Required with loan | One | Last disbursement possible in project month one |
| Repayment | | | |
| Repayment (Method) | Required with loan | Equal installments | Loan repaid in equal installments |
| Sweep | Optional with equal installments | Toggle not pressed | No sweep |
| Last Month Capitalization of Interest | Required with loan | One | Last capitalization of interest possible in project month one |
| Month - Start Repayment Phase | Required with loan | Two | Repayment phase starts in project month two. |
| First Repayment Month | Required with loan | Three | First repayment in project month three |
| No of Installments | Required with loan | One | Loan is fully repaid in the first repayment month. |
| STAND BY LOANS, SWEEP | | | |
| Stand by Loans | | | |
| Maximum Amount (Construction Phase) | Optional | Zero | No stand by loan during construction phase |
| Interest - % p.a. | Optional | Zero | No interest payment |
| Maximum Amount (Repayment Phase) | Optional | Zero | No stand by loan during repayment phase |
| Interest - % p.a. | Optional | Zero | No interest payment |
| Last Disbursement Month (only Stand by Repaym.) | Required | One | No disbursements |
| Sweep | | | |
| % of Cash Flow | Optional | Zero | No sweep |
| Month - Start Sweep | Required with sweep | One | Sweep starts in project month one |
| Month - End Sweep. | Required with sweep | Two | Sweep ends in project month two |
| PAID IN CAPITAL AND DIVIDENDS | | | |
| Paid in Capital | | | |
| Project Month | Required with paid in capital | One | Equity paid in enters in project month one |
| Equity paid in this Month | Optional | Zero | Value of paid in capital this month is zero. No capital paid in this month |
| Dividends | | | |
| % - Dividend | Optional | Zero | No dividend paid |
| Payments (Monthly, Quarterly, Semi-annually, Annually) | Required with dividends | Quarterly | Dividends are paid quarterly |
| First Dividend Payment Month | Required with dividends | One | First dividend payment possible project month one |
| Minimize Additional Shareholder Investment | Optional | Not checked | Possibly lower balance in the cash account: Earnings allocated to dividends payable can be higher than the remaining cash flow in a month. You can minimize Additional Shareholder Investment by restricting allocation to dividends payable to the amount of remaining cash flow. |
| TAXES AND SUBSIDIES | | | |
| Subsidies | | | |
| Manual Entry of Subsidies | Optional | Not checked | No access to entry field for manual editing/entry |
| Automatic Entry of Subsidies | Optional | Checked | Model generates automatically subsidies according to your specifications. |
| Start Subsidy Month | Required with subsidy | One | First subsidy - if any - in project month one |
| Last subsidy Month | Required with subsidy | One | Last subsidy - if any, - in project month one |
| Subsidy p.a. | Optional | Zero | No subsidy |
| Corporate Tax | | | |
| Manual Tax Rate Entry | Optional | Not checked | No access to entry field for manual editing/entry |
| Automatic Tax Rate Entry | Optional | Checked | Program generates automatically tax rates according to your specifications |
| % - Tax Rate retained | Optional | Zero | No corporate tax on retained income |

TABLE I-continued

| Data | Optional - Required | Default | Impact of Default |
| --- | --- | --- | --- |
| Income | | | |
| % - Tax Rate disbursed Income | Optional | Zero | No corporate tax on dividends |
| Tax Payment (monthly, quarterly, semi-annually, annually) | Required with tax | Monthly | Corporate tax is paid monthly |
| Tax Holiday - months. | Optional | Zero | No tax holiday |
| % Tax Rate ret. Income during Holiday | Optional | Zero | Corporate tax on retained income is zero during tax holiday |
| % Tax Rate disb. Income during Holiday | Optional | Zero | Corporate tax on disbursed income is zero during tax holiday |
| Years - Carry forward Losses | Optional | Zero | No carry forward of losses |
| Property Tax | | | |
| Manual Tax Rate Entry | Optional | Not checked | No access to entry field for manual editing/entry |
| Automatic Tax Rate Entry | Optional | Checked | Program generates automatically tax rates according to your specifications |
| % - Property Rate | Optional | Zero | No property tax |
| Tax Payment (Monthly, Quarterly, Semi-annually, Annually) | Required with tax | Monthly | Property tax is paid monthly |
| Tax Holiday - Months. | Optional | Zero | No tax holiday |
| % Tax Rate during Holiday | Optional | Zero | Property tax is zero during tax holiday |
| DEPRECIATION AND MAINTENANCE | | | |
| Amortization and Depreciation | | | |
| Capex Category | Optional | Empty | No access to entry field for depreciation and reinvestment |
| Reinvestment | Optional | Checked | Access to reinvestment in case of buildings and equipment |
| No Reinvestment | Optional | Not checked | No access to reinvestment |
| Number of Years - Linear Depreciation | Required with depreciation | One | Capex in the respective category is amortized/depreciated within one year after start up |
| Reinvestment - % of Capex | Optional | Zero | No reinvestment |
| First Reinvestment | Required with reinvestment | One | First reinvestment one year after start up |
| Last Reinvestment | Required with reinvestment | One | Last reinvestment one year after start up |
| Months between Reinvestments | Required with reinvestments | One | Reinvestment takes place every month |
| Maintenance | | | |
| Maintenance Category | Optional | Empty | No access to entry field for maintenance |
| % - of Capex | Optional | Checked | Maintenance entry as percentage of the capital expenditure in the respective capex category |
| Manual | Optional | Not checked | You cannot enter an absolute maintenance cost figure |
| Maintenance Costs as % of Capex Equipment | Optional | Zero | No maintenance costs |
| Increase - % p.a. | Optional | Zero | Maintenance costs are constant |
| First Month Maintenance Cost Increase | Required with maintenance cost increase | One | First cost increase in project month one (cost at project start is inflated) |
| Last Month Maintenance Cost Increase | Required with maintenance cost increase | One | Last cost increase in project month one |
| GENERAL AND ADMINISTRATIVE COSTS, FIXED OPERATING COSTS | | | |
| General and Administrative Costs, Factory Overheads and Insurance | | | |
| Cost Category | Required | Administrative Costs | Entry Admin. Costs. Click on desired category to switch |
| Currency | Required with cost | Numeraire | Cost in numeraire |
| Cost p.a. at Prices current at Project Start | Optional | Zero | No cost |
| Cost Increase p.a. % | Optional | Zero | No cost-increase |
| First Month Cost Increase | Required with cost increase | One | Cost increase starts in project month one |
| Last Month Cost Increase | Required with cost increase | One | Cost increase ends in project month one |
| Fixed Operating Costs | | | |
| Product | Optional | Empty | No access to fixed operating cost caused by product. No fixed operating costs |
| Name of Fixed Operating Cost Item | Optional | Empty | No access to fixed operating cost caused by product. No fixed operating costs |
| Currency | Required with fixed operating costs | Numeraire | Fixed operating cost in numeraire |
| Cost p.a. at Prices | Optional | Zero | No fixed operating costs |

TABLE I-continued

| Data | Optional - Required | Default | Impact of Default |
|---|---|---|---|
| Current at Project Start | | | |
| Cost Increase p.a. % | Optional | Zero | No cost increase |
| First Month Cost Increase | Required with cost increase | One | First cost increase project month one |
| Last Month Cost Increase | Required with cost increase | Two | Last cost increase project month one |
| VARIABLE COSTS | | | |
| Variable Cost determined by Input Market | | | |
| Product | Optional | Empty | No access to variable cost caused by product. No variable costs |
| Variable Cost | Optional | Empty | No access to variable cost |
| Unit of Measurement | Required with variable costs | Empty | You cannot enter variable cost |
| Input Output Coefficient | Required with variable costs | Empty | You cannot enter variable cost |
| Minimum Stock - No. of Input Units | Optional | Zero | No minimum stock. Working capital lower |
| Delivery Time 0 < Days < 91 | Optional | Zero | Inventory build up at start up and not before. Lower working capital needs |
| Currency | Required with variable costs | Numeraire | Variable cost in numeraire |
| Price/Unit Input Factor in selected Currency | Required with variable costs | Empty | You cannot enter variable cost. |
| Input Price Trend - % p.a. | Optional | Zero | Price/unit of input constant |
| First Month of Trend | Required with variable costs | One | Price/unit of input starts to increase in first project month |
| Last Month of Trend | Required with variable costs | Two | Project month two is the last month of price increase/unit of input. |
| % - Price Swing | Optional | Zero | No price volatility |
| Months - Length of Cycle | Required with price swings | Twelve | Price goes within twelve months through a complete up and down turn (frequency). |
| Cycle at Project Start | Required with price swings | Half Way up | Price is at long term trend at project start. |
| Down Payment - % | Optional | Zero | No down payment |
| Avg. Days before Paym. 0 < Days < 91 | Optional | Zero | Payment immediately upon receipts. Working capital higher |
| Flexible Input Pricing | | | |
| Product | Optional | Empty | No access to variable cost |
| Variable Cost | Optional | Empty | No access to variable cost |
| Unit of Measurement | Required with variable costs | Empty | You cannot enter variable cost. |
| Input Output Coefficient | Required with variable costs | Empty | You cannot enter variable cost. |
| Minimum Stock - No. of Input Units | Optional | Zero | No minimum stock. Working capital lower |
| Delivery Time 0 < Days < 91 | Optional | Zero | Inventory build-up at start up. Lower working capital. |
| Trigger Price Deferral | Optional | Zero | Threshold price/unit for deferral zero |
| % deferred | Optional | Zero | No deferral |
| Maximum Amount Deferred | Optional | Zero | Deferral - loan is zero. No variable costs are deferred |
| % - Interest p.a. on deferred Amount | Optional | Zero | No interest on deferral - loan |
| Sales Contract | Required with variable cost | Manual Entry | No Sales Contract as base for input price. Manual entries. Press Edit Market Price and enter market price time series as base. |
| Currency | Required with variable costs | Numeraire | Variable cost in numeraire |
| Cost/Unit as % of Sales Price | Required with variable costs | Zero | Variable cost zero |
| Maximum Price/unit of Output | Optional | Zero | Cost/unit of input has no upper limit. |
| % - Minimum Price Increase p.a. | Optional | Zero | Minimum price/unit of input constant |
| First Month Min. Price Increase | Required with minimum price increase | One | Minimum price/unit of input starts to increase in first project month. |
| Last Month Min. Price Increase | Required with minimum price increase | Two | Project month two is the last month of minimum price increase |
| Down Payment - % | Optional | Zero | No down payment |
| Avg. Days before Paym. 0 < Days < 91 | Optional | Zero | Payment immediately upon receipt. Working capital higher |

TABLE I-continued

| Data | Optional - Required | Default | Impact of Default |
|---|---|---|---|
| SALES | | | |
| Inventory Cycle | | | |
| Product | Optional | Empty | No access to inventory cycle for product. Inventory cycle zero |
| Average No. of Days goods remain in Stock before sold (<= 91, 2 days) | Optional | Zero | No balance sheet position finished goods for product. Lower working capital |
| Commodity Market Pricing | | | |
| Product | Optional | Empty | No access to off-take sales contract. No sale |
| Contract | Optional | Empty | No off-take sales. Product not sold. Production costs incurred not recovered. |
| Contract Currency | Required with off-take contract | Numeraire | Numeraire is contract currency. |
| Share of Contract in Total Sales - % (of the Product) | Required with off-take contract | Zero | No output sold under the contract |
| Avg. No. of days before Receipt of Payment | Optional | Zero | Immediate payment. Reduces working capital. |
| Automatic Price | Optional | Checked | Program generates sales price time series according to your specifications. |
| Manual Price | Optional | Not checked | Allows you to edit/enter a sales price time series. |
| Price per Unit | Optional | Zero | Sales receipts will be zero or negative (sales expenses). |
| Sales Price Trend % p.a. | Optional | Zero | Sales price constant. |
| First Month of Trend | Required with sales price trend | One | Trend starts in project month one. |
| Last Month of Trend | Required with sales price trend | Two | Trend ends in project month two. |
| % - Price Swings | Optional | Zero | Sales prices don't fluctuate. |
| Months - Length of Cycle | Required with price swings | Twelve | Sales price goes within twelve months through a complete up and down cycle. |
| Cycle at Project Start | Required with price swings | Half Way up | Sales price at long term trend at project start. Goes up to top price. |
| Currency Transport Costs Company Off-taker | Required with transport costs | Numeraire | Transport costs in numeraire |
| Transport Costs/Unit Company Off-taker | Optional | Zero | No transport costs |
| % Cost Increase p.a. Company Off-taker | Optional | Zero | Transport cost/unit constant |
| First Month Transport Cost Increase Company Off-taker | Required with transport cost/unit increases | One | First transport cost/unit increase in project month one |
| Last Month Transport Cost Increase Company Off-taker | Required with transport cost/unit increases | Two | Last transport cost/unit increase in project month two |
| Currency Insurance Company Off-taker | Required with insurance costs | Numeraire | Insurance costs in numeraire |
| Insurance Costs/Unit Company Off-taker | Optional | Zero | No insurance costs |
| % Cost Increase p.a. Company Off-taker | Optional | Zero | Insurance cost/unit constant |
| First Month Insurance Cost Increase Company Off-taker | Required with insurance cost/unit increases | One | First insurance cost/unit increase in project month one |
| Last Month Insurance Cost Increase Company Off-taker | Required with insurance cost/unit increases | Two | Last insurance cost/unit increase in project month two |
| Indirect Tax - % | Optional | Zero | No indirect tax deducted from price paid by end user |
| Duty - % | Optional | Zero | No duty deducted from gross sales receipts |
| % - Handling Fee | Optional | Zero | No handling fee deducted |
| Flat fee p.a. | Optional | Zero | No flat fee deducted |
| First Month Flat Fee Increase | Required with flat fee increase | One | Flat fee increased the first time in project month one |
| Last Month Flat Fee increase. | Required with flat fee increase | Two | Flat fee increased the last time in project month one |

TABLE I-continued

| Data | Optional - Required | Default | Impact of Default |
|---|---|---|---|
| % - Handling Fee deferred. | Optional | Zero | No handling fee deferred |
| % Flat Fee deferred. | Optional | Zero | No flat fee deferred |
| Trigger Price | Optional | Zero | Deferral mechanism triggered at prices above zero |
| Max. Deferred Amount | Optional | Zero | No deferral-loan for fees |
| % - Interest on Deferred Amount | Optional | Zero | No interest on deferral-loan |
| Mark up Pricing | | | |
| Product | Optional | Empty | No access to mark up sales contract. No sale |
| Contract | Optional | Empty | No mark up sales contract. Product not sold. Reduced earnings as production costs incurred for unsold output are not recovered |
| Share of Contract in Total Sales - % (of the product) | Required with mark up contract | Zero | No output sold under the contract |
| Avg. No. of Days before Receipt of Payment | Optional | Zero | Immediate payment. Reduces working capital needs |
| Mark up Basis | Required with mark up contract | Total operating costs | Your mark up will be added to the total operating costs |
| Mark up - % | Optional | Zero | Output is sold at the mark up basis. No profit on the product |
| Flat Payment | Optional | Zero | No flat payment like e.g. connection charges |
| Flat Payment Increase % p.a. | Optional | Zero | Flat payment constant |
| Currency Transport Costs Company | Required with transport costs | Numeraire | Transport costs in numeraire |
| Transport Costs/Unit Company | Optional | Zero | No transport costs |
| % Cost Increase p.a Company | Optional | Zero | Transport cost/unit constant |
| First Month Transport Cost Increase Company | Required with transport cost/unit increases | One | First transport cost/unit increase in project month one |
| Last Month Transport Cost Increase Company | Required with transport cost/unit increases | Two | Last transport cost/unit increase in project month two |
| Currency Insurance Company | Required with insurance costs | Numeraire | Insurance costs in numeraire |
| Insurance Costs/Unit Company | Optional | Zero | No insurance costs |
| % Cost Increase p.a. Company | Optional | Zero | Insurance cost/unit constant |
| First Month Insurance Cost Increase Company | Required with insurance cost/unit increases | One | First insurance cost/unit increase in project month one |
| Last Month Insurance Cost Increase Company | Required with insurance cost/unit increases | Two | Last insurance cost/unit increase in project month two |

B. The Data and Delete Validation

Data are validated in real time as the user makes her entries. The data validation software in the PFANT allows, for each entry field, the section of a range of permitted data entries and a required data type (e.g. a number has to be bigger than zero but smaller than 1000). The software checks as the user types whether an entry is of the required type and falls within the pre-set range. If the user tries to make an entry that does not correspond to the preset range or data type, she receives an error message telling her the required range. Her earlier entries in that specific field are cleared. As data records (e.g. for a loan) can be quite large, the immediate "as you type" feedback is better than the standard data validation technique that validates a data record once the Enter button is pressed to write the data subset into a file. This prevents the user from getting a long list of entry errors at the time she has filled out a complete form. The Entry check (pre-write check) has only to ascertain that no entry field is empty (as illegal entries are impossible).

The user can only delete a record if the data in the record are not necessary to perform calculations. E.g. if the user has entered a project currency and has used this currency to price an input, this currency must not be deleted as every input needs a price. The PFANT prevents illegal delete-operations.

C. Direct Calculation Results

Once entries for a record (e.g. an individual loan or a capital expenditure contract) have been made, the user exits the entry form and returns to the general menu. Before she gets access to the general menu, the files involved in the calculation of the monthly cash flow, income statement and balance sheet are calculated. From the general menu, the user has access to the result files.

D. Data Exchange

The case file is mobile and can be used for data exchange with other users of the PFANT. The case file can be saved under other names and thus be used to save scenarios. The PFANT accesses the case file for sensitivity testing.

II. Modules

To prevent unacceptable load time and memory constraints, a currently preferred embodiment of the PFANT is limited to:

- three products;
- six general purpose loans;
- two stand-by loans;
- sixteen variable inputs per product of which two per product allow output market price risk sharing;
- fourteen fixed operating items per product; and
- eighteen sales contracts (three off-take contracts per product (that can also be used for direct sales) and three mark-up contracts per product).

As the individual components work as modules, the PFANT software can be easily scaled up as more computing power becomes available. The necessary changes to the GUI are minimal.

A. Time Management—the Project Time Data Set

The PFANT software works on a monthly basis with a time horizon of 254 months. It allows to freely set the fiscal year. The construction phase (time from project start to start up of operations) can be up to 72 months. Start up can be project month 4<=Start up<=project month 72. Start up cannot be smaller than project month 4 as the project builds its own inventories. Maximum order time is 91.25 days (365 days/12*3). Thus the PFANT software can start ordering in project month 1 to have inputs in stock at start up in month 4.

The PFANT software allows the user to change the start up month. This facilitates sensitivity testing for construction delays. The PFANT software updates the learning curves, if any (see below), except in case capacity usage has been edited manually (as there is no way to infer the user's intentions).

The economic life of a project can be terminated at any project month higher than month 73. In the month chosen as end of project the cash flow and income statement go to zero and the balance sheet freezes at the historical values of the month before the end of analysis.

In calculating the internal rate of return and the net present value, the PFANT software assumes that at the end of the project, fixed assets are sold at their balance sheet values.

B. Technical Specifications—the Production Function Data Set

For each product technical specifications have to be entered. The Production Function Data Set comprises the Product Name, the Measurement Unit of Output (which is the reference for all output related entries like input coefficients), the Maximum Capacity (no. of units that can be produced per year), the Actual Capacity Usage (Output=Maximum Capacity/12*Actual Capacity Usage).

The PFANT software allows production learning curves to be generated automatically (flat, linear or steep). The user can freely select the start-up capacity usage (<actual capacity usage) and the length of the learning curve. The user can access every month during the productive life of the project company and manually set the production as a percentage of the maximum capacity. This allows implementation of maintenance shut-downs or seasonal production patterns.

The balance sheet position work-in-progress is automatically built. The user enters the time the firm needs to produce one unit of the product. If the user accepts the default value zero (time) the corresponding balance sheet position is zero. The PFANT software calculates work-in-progress at factor costs.

Overheads (fixed operating costs not directly related to a specific product) and depreciation are allocated to the three products according to the user's specifications. Respective entries are only relevant in case of mark up pricing if such cost should enter the mark up basis.

If the user deletes a product all data subsets related to that product are removed (e.g., all fixed operating costs caused by product 1).

C. Currencies—the Monetary Data Subset

Figure 2:
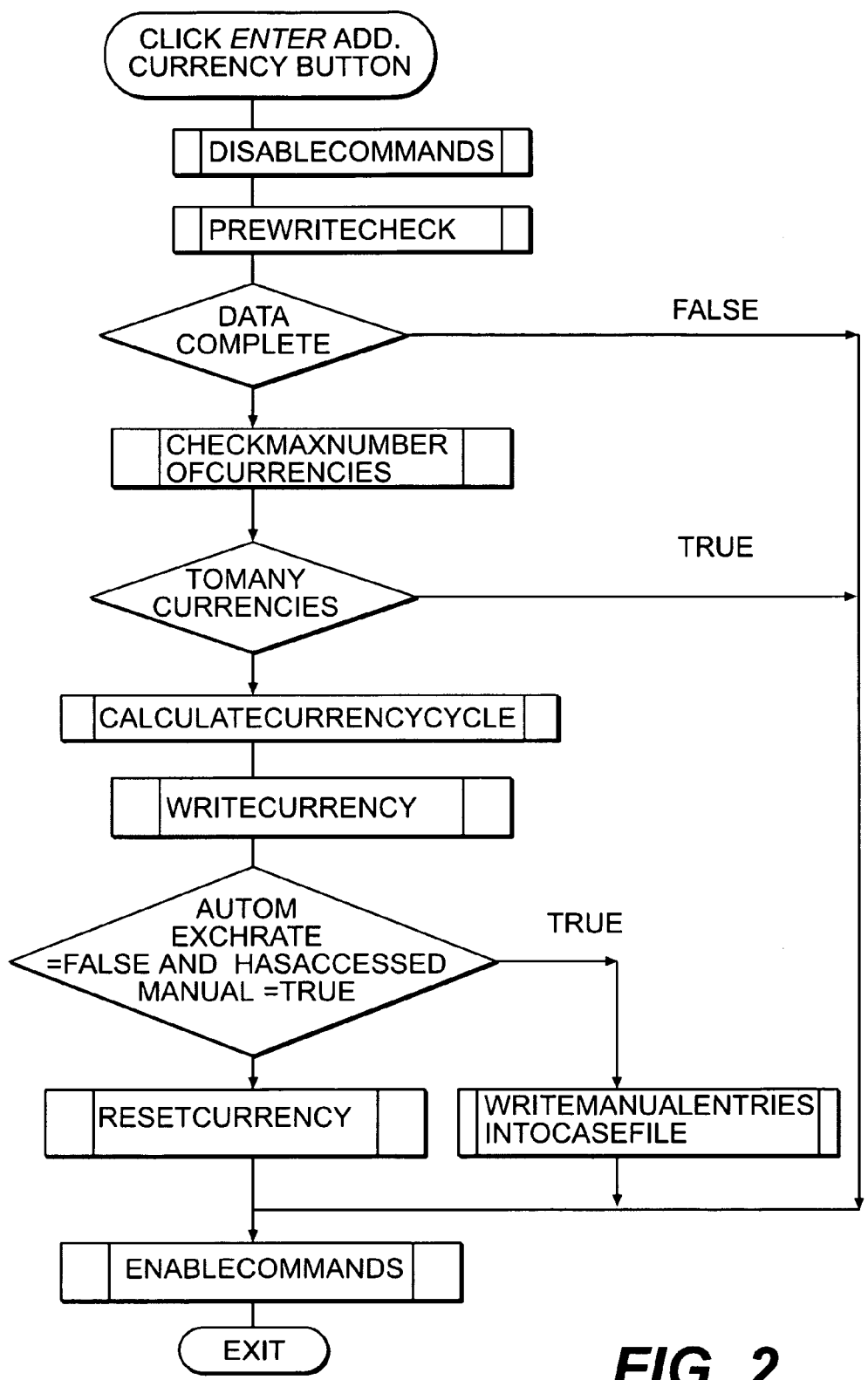
FIG. 2 is a representative flow chart from the monetary data subset showing the routine for entering up to eleven project currencies.

Up to eleven currencies (the project currencies) are usable, namely the currency of calculation (the numéraire) and up to ten other currencies. All entries made in other currencies are converted into units of the numéraire. The software steps allow the numéraire to be deflated and the last deflation month (relevant for IRR calculations) to be selected. FIG. 2 is a flow chart which shows entry of a new currency which can be later selected for linking with currency-convertible items.

An additional currency record consists of the currency name, the exchange rate at project start, an exchange rate array with 254 monthly exchange rates, the first and last exchange rate trend month and information on currency volatility and exchange rate shocks. The exchange rate array over the project lifetime can be generated automatically or manually (or first automatically and then manually edited to save typing). The user can establish depreciation or appreciation trends (up to project month 254). The model uses a sine function to simulate currency volatility. Both the length of a currency cycle (minimum frequency 12 months) and the size of the swings (amplitude <100 percent) around the long-term exchange rate can be freely selected. The user can select among the following options at which point in the cycle the currency should start:

Half depreciated (default)

Fully depreciated.

Half appreciated.

Fully appreciated.

The user is permitted to hit the project with a currency shock (one time appreciation or depreciation).

Every price in the program is associated with a currency: either the numéraire or an additional currency. The currency selection process is simple. On price relevant entry forms the user sees a listbox with all project currencies. The user selects a currency. When she hits Enter, the product data is linked to the selected currency. All changes made to the currency will be reflected in the price in units of numéraire.

Currency risks can seriously undermine a project. While it is not very likely that any project will go ahead with as many as eleven currencies, the ability to test the impact of currency risks help to focus minds on what is acceptable and what is too risky.

Currency Delete Validation

Every price is associated with a currency in my software. The user is not allowed to delete a currency that is in use. All records are searched for the name of the currency that the user wants to delete. If the currency is found in a record, the search routine is interrupted and the user is informed that the currency cannot be deleted.

The user can delete additional currencies if they are not used. However, the program does not work without the numéraire. The user is allowed to change the name of the numéraire. Before a name change is permitted, however, the currency data subset is searched for the envisaged new name of the numéraire. If the name is found, the user is informed that she cannot give the numéraire the name of an existing additional currency.

D. The Capital Expenditure (CAPEX) Data Subset (i) Capital Expenditure Entry Methods Four capital expenditure categories are supported with the PFANT program:
1. Site—no depreciation, no reinvestment
2. Buildings—depreciation and reinvestment
3. Equipment—depreciation and reinvestment
4. Pre-Production Costs—depreciation, no reinvestment.

In each category, up to fifteen contracts can be entered. The user can freely choose the contract currency for the local and the import content. The user can enter a customs tariff.

Figure 3:
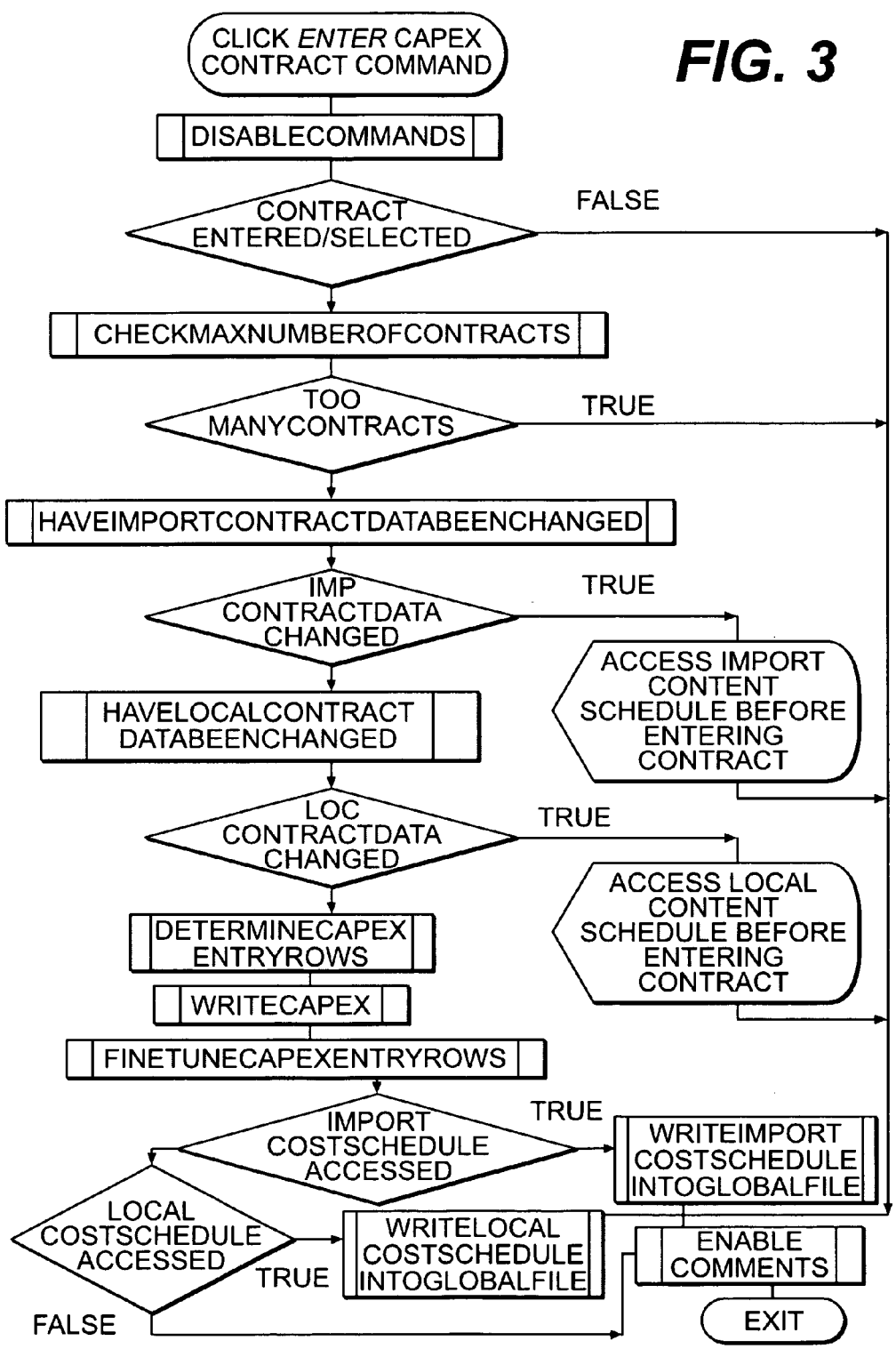
FIG. 3 is a representative flow chart of a capital expenditure entry routine from the capital expenditure (CAPEX) data subset.

Capital expenditure entries can be made either (1) manually for any given month during the construction period until the start up or (2) automatically, in which case the user has to enter the import and local content contract totals, the percentage of the down and final payments. A CAPEX-time series (total amount−down and final payment)/(construction period−2) is calculated. In a planned upgrade an algorithm for typical cost curves will be integrated. The CAPEX data are stored as expenditure time series broken down to the local and import content and customs and possible combinations thereof. The flow chart shown in FIG. 3 describes the steps in this routine triggered by hitting Enter. A utility to make across-the-board CAPEX changes to the import or local content of a contract (e.g. +10%) is provided.

(ii) Reinvestments and Provisioning, Expansion

Reinvestment is possible for buildings and equipment. The user can enter reinvestment as percentage of the capital expenditure in a category. She can set the first and last reinvestment month and space the number of months between reinvestments. Provisions are made for reinvestments in the income statement and the balance sheet. Reinvestment appears in the cash flow once undertaken. In case funds are insufficient for provisioning, such provisioning is undertaken once funds are available in sufficient amounts. Reinvestment is made regardless of sufficient provisioning. The program assumes that the company is able to mobilize sufficient funding through limited recourse or equity injection.

The reinvestment procedure can be used to expand capacity.

Capital Expenditure Delete Validation

If the user wants to delete a capital expenditure that is loan financed she has to first delete or change the loan(s). Changes in loan-financed CAPEX contracts are automatically reflected in the loan amount(s). The loan record(s) contain(s) the name of the contract(s) that is (are) financed. The loan data subset(s) is (are) searched for the name(s) of the capital expenditure contract(s) that the user wants to delete. If the name(s) is (are) found, the user is informed that the capital expenditure contract cannot be deleted.

E. The Loan Data Subset

The program works with five different loan types: general-purpose loans, stand-by loans, supplier credits, input cost and off-take fee deferral loans.

(i) General Purpose Loans—General

General purpose loans allow the user to inject loan funds into the company whenever she wants. The program generates disbursement and repayment schedules. If the project ends before the loan is fully repaid, the balance sheet shows the utilization of the loan the month before the end of the project. Interest payments then turn to zero. The loan output system generates the loan data as if funds were completely repaid regardless to the end of project life.

The loan name identifies an individual loan record. The user can choose any project currency as loan currency. Loan transactions are made in the loan currency. If the exchange rate changes foreign exchange (forex) gains or losses result as more or less has to be repaid in units of the numéraire. The program calculates and accounts for forex gains or losses, and accommodates the standard (year has 365 days) and the Euro (year has 360 days) interest calculation methods. The user can select the number of months interest is paid in arrears and the percentage of interest that is capitalized during the loan disbursement phase. The program allows capitalization of interest up to and including the First Repayment Month. It makes the management and arrangement fees payable at loan effectiveness. The user can select the number of months commitment fee is paid in arrears.

(ii) Debt Service Reserve Accounts

The user can establish debt service reserve accounts (DSRAs) for general purpose loans. DSRAs are held in the loan currency. The resulting currency gains and losses are tracked. Interest on outstanding amounts is paid in units of numéraire. Interest on the DSRAs that cannot be paid when due for lack of funds is deferred, calculated and held in units of numéraire. The program differentiates between the DSRA's during the disbursement and the repayment phases. Based on the next debt service, the required amount to be held as a base in the DSRA is calculated.

The user can request the PFANT to calculate monthly step ups to ensure that at payment dates for interest or principal the respective amount to be paid is on the DSRA on top of the required base. E.g. if the next debt service amounts to 1000 currency units and base requirements are 100%, payments have to be made every 10 months, the PFANT will require a base of 1000 and make 10 monthly step ups of 100.

(iii) Financing

Once capital expenditure has been entered in the program, the user can
(a) finance any expenditure. She can either select a CAPEX category, an individual CAPEX contract or even an expenditure sub-category within a contract, e.g., the import content;
(b) determine the share of contract payments that she wants to finance (e.g. 50%).
(c) choose the time slice she wants to finance for a contract or cost category (by setting the disbursement schedule accordingly). This can be useful if e.g. a down payment has to be made from the project company's funds in month 5 but the rest of the contract should be loan financed; and
(d) manually create a disbursement schedule.

Financing Options:

---

1st Choice CAPEX category/individual contract
    Total CAPEX
    Site              List of site contracts appears
    Buildings      List of building contracts appears
    Equipment     List of equipment contracts appears
    Pre-Production List of pre-production contracts appears
    Manual          Manual Editing of Disbursement Schedule
2nd Choice if the user has not opted for Manual Disbursement schedule
    Total Expenditure (this includes Customs)
    Total Imports
    Total Local Content
    Imports and Customs
    Local and Customs
    Imports and Local Content
3rd Choice Percentage of the total expenditure or the expenditure category to be financed.

---

With several mouse clicks the user can thus select financing patterns that would be very tedious to establish with conventional modeling techniques. The user can determine the start and end of the financing of a CAPEX category, contract or contract element (e.g., Total Imports), say 50% of CAPEX expenditure on imports under Site Contract 1 from project months 12 to project 22.

(iv) Repayment Methods

The repayment method chosen and the repayment schedule have repercussions on the disbursement schedule as, for example, the user cannot disburse after the loan has been fully repaid. Therefore, my program supports three repayment methods. The main features of the three methods are:

(a) Equal Installments

Disbursements can be made during the repayment phase up to the Month of Last Repayment (see Loan Page Two, bottom right corner). The interest can be capitalized up to and including the first repayment month. The user can apply the Sweep function to prepay the loan at payment dates if sufficient cash flow is available.

The user is allowed to harmonize payment dates for interest and principal. In case of equal installments, the first repayment date of principal is also made an interest payment date. If the principal is due every six months and interest is paid six months in arrears, interest and principal payment dates will coincide during the repayment phase. If the time between installments and the number of months interest is paid in arrears differ, interest and principal payment dates will not coincide.

(b) Annuity

Disbursements can be made until the last repayment installment (the annuity is recalculated). Interest can be capitalized up to and including the first repayment month. The Sweep cannot be used.

The user can freely choose the number of months for interest to be paid in arrears during the disbursement phase. Starting with the first repayment, however, principal and interest payment dates coincide.

The debt service (interest+principal) should be equal in case of an annuity. There are two reasons why this might not be the case:

1. The user has disbursed after the start of the repayment phase. The program recalculates the annuity and the debt service following this disbursement will be higher.
2. Interest and principal payment dates coincide during the repayment of an annuity. However, up to the first repayment date, it is up to the user to set the interest payment schedule. If the last interest payment date is closer to the first repayment date than the interim period between repayment dates, the debt service at the first repayment date will be lower than the following (equal) debt services. This happens as part of the interest, otherwise due at the first repayment date, has already been paid.

(c) Manual Repayment Plan

The program allows the user to tailor the repayment schedule. Disbursements can be made during the repayment phase up to the last repayment month. Interest can be capitalized up to the first repayment month.

Loan Data Entry Validation

The user must not be allowed to repay at any repayment date more than the loan utilization at that date. The program therefore validates manual entries accordingly. Example: The loan total is 1000 currency units. The user repays in two installments. Assume the user has entered 400 as the first installment. The validation will not allow the user to enter more than 600 as the second installment. Now, if the user returns to the first installment and enters, say 500, 1100 currency units are repaid—that is more than the company has borrowed. To avoid this, entries are checked as date are written into the case file. If the user has repaid too little, the amount still to be repaid is added to the last installment. If the user has tried to repay more than a respective month's utilization, the repayment will be restricted to the then outstanding amount.

(d) Allowed Combination of Disbursement and Repayment Methods

| Allowed combinations | |
| --- | --- |
| Disbursement Method | Repayment Method |
| Automatic disbursement schedule | Equal installments |
| | Annuity |
| Manual disbursement schedule | Equal Installments |
| | Annuity |
| | Manual Repayment Plan |

While a manually created disbursement schedule can be combined with all three repayment-methods (equal installments, annuity or manual repayment plan), an automatic disbursement schedule is restricted to equal installments and annuities for the following reasons. If the contract expenditure that is financed under an automatically created disbursement schedule changes (either because costs increases or the exchange rate changes) loan disbursements automatically vary with that change. This can be very handy and can save a lot of retyping. However, if the repayment amounts were designed to be manually entered for each installment, the program cannot know how the user wants the new loan amount to be repaid. The GUI permits only allowed combinations.

The user can create a manual disbursement schedule, however, using the automatic disbursement schedule to save substantial typing. She first has to enter a loan with an automatic disbursement schedule. Once the loan exists (and all the entry intensive disbursements have been automatically written into the respective loan data subset), the user has to call up the loan again and enter the loan as Manual. The disbursement figures are identical with one important difference. Once the user has reentered the loan as manual financing, disbursements in units of the loan currency will not change with variations in the underlying CAPEX contract or variations in the exchange rate.

(v) Loan Effectiveness, Disbursement Period and Repayment Phase

Regardless of the number of months interest is paid in arrears, the month selected by the user as start of the repayment phase will be an interest payment date. In the case of an annuity, all later interest payment dates will coincide with the principal payment dates. In the case of manual repayment or of repayment in equal installments, the next interest payment date will be the number of month that interest is paid in arrears after this date. If the user wants interest and principal payment dates to always coincide, she must set the number of months interest is paid in arrears equal to the number of months between installments.

(vi) The Sweep Function

The Sweep uses free cash flow to prepay general-purpose loans at payment dates during the Sweep period. The Sweep is available only with the equal installment repayment method. The Sweep period is the time from the first Sweep month to the last Sweep month. The user can freely set the Sweep period. The user has to input the fact that she wants to use the Sweep for an individual loan. Available cash flow is shared among the general-purpose loans participating in the Sweep according to their utilization (outstanding debt at this moment) taking into account Sweep funds accumulated since the last payment date of this specific loan. This is done because payment dates do not necessarily coincide. Prepayment takes place (1) until the repayment phase starts at interest payment dates, from then on (2) at principal payment dates. Ignoring amounts accumulated for Sweep would thus put loans with later payment dates at an advantage.

The Sweep is held in units of the numéraire until used. The Sweep works with a time lag of at least one month. Funds cannot be used in the month they become available. This would cause a circularity.

The Sweep can assume negative values. While cash flow set aside for the Sweep is kept in numéraire until used to prepay at payment dates, the user can freely choose the loan currency. In case the loan currency depreciates funds set aside at earlier exchange rates might be greater than what is needed to prepay the whole loan. The exceeding cash flow is released and will show up as a negative value in the cash flow.

(ii) Stand-by Loans Data Subset

In case the project-company does not generate sufficient funds to cover all its payment obligations, limited recourse is allowed through Stand-by Loans. The user can set the maximum loan amounts for the construction stand by and the repayment stand by loan. The user can determine a last disbursement month for the repayment phase stand-by loan. Stand-by loans are only repaid if sufficient cash flow is available once other payments have been made. The general-purpose loans are senior to the Stand-by Loans. The program pays interest on Stand-by Loans only if sufficient funds are available. Otherwise, interest payment is deferred.

(iii) Suppliers Credit

The program activates capital expenditure during the construction phase in the balance sheet as Work in Progress to the tune of disbursements made under the respective CAPEX category. The plant is assumed to be fully operational at Start up of operations. Thus CAPEX is activated at the sum of the full contract values of all the CAPEX contracts in the CAPEX category. For example, if three contractors have done construction work for the project company at Start up of operations, the work is assumed to be complete and the total value of the three construction contracts is activated. In case all payments under the contracts have been effected before Startup of operations, no monies remain due to the contractors, and thus there is no suppliers' credit after Start up of operations.

There might be retention money or a final payment instead of a performance bond. The program treats any outstanding payments at Start up as Suppliers Credit. This credit is reduced as contract payments are effected. No interest is envisaged. Financing costs are assumed to be part of the contract price.

F. Generation of Equity Subscription Plans

The PFANT program allows the user to pay in capital at any moment during the project cycle. In case of negative cash flow, the program automatically generates Additional Shareholder Investments—equity paid in by the shareholders to prevent financial collapse—if no funds are left in the cash account. The PFANT program features two methods to pay in capital that should be combined:

Method 1—Access to Whole Pay in Capital Time Array

This method should be used for a first approximation. No feedback on equity ratios is given. The user gains access to entry fields for all project months and can pay in capital in any project month. Once the user has finished her entries, the whole array is written into the case file.

Method 2—Monthly Entry of Paid in Capital

This method should be used for fine-tuning. The user has access to one project month at a time. The PFANT program shows the user the equity ratio, the required and actual balances on the debt service reserve account and the additional shareholder investment in the month under consideration. This allows the user to conveniently design (or revise) month per month an equity subscription plan that meets a minimum target equity ratio, keeps the DSRAs at their required level, and avoids additional shareholder investment.

The user can pay in capital in kind by creating a capital expenditure contract with the corresponding CAPEX in the pay in capital months. The same amounts then have to be entered as paid in equity in the respective months.

Example: Assume the user wants to model a transfer to the project company of two machines worth 1,000 and 3,000 currency units of numéraire respectively in project months 5 and 17. To do so, she has to create a CAPEX equipment contract with the numéraire as contract currency. She has to disburse under the CAPEX equipment contract 1000 currency units of numéraire in project month 5 and 3000 units of numéraire in project month 17. In project month 5, she has to pay in 1000 currency units of numéraire and then pay in 3000 units in project month 17.

Other equity categories generated in the balance sheet are retained earnings and cash flow from earlier periods earmarked for the prepayment of loans (the Sweep) but not yet used because the respective loan principal payment date(s) has not yet arrived.

G. Dividends (i) Dividend Percentage and Frequency

The PFANT program allows the user to select the percentage of earnings that is to be retained. The user can select the dividend payment frequency (monthly, quarterly, semi-annually or annually). Up to the First Dividend Payment Month (default is project month one) no funds are paid into the Dividends Payable account. Funds are paid into the account only if at the time of allocation:

1. the balance in the debt service reserve account is at the required level;
2. the stand-by loans are fully repaid and interest thereon has been paid; and
3. the deferral credits are fully repaid and no interest thereon is outstanding.

Funds in the account Dividends Payable are disbursed at the next dividend due date regardless of a possible worsening of the cash flow since the allocation.

(ii) Minimize Additional Shareholder Investment

If the user disburses through dividends more than cash is in hand, the program injects capital (additional shareholder investment) into the company. Additional shareholder investment can occur even with a perfectly profitable company as it is quite possible that earnings exceed the cash flow in a given month. To minimize additional shareholder investment the user can limit allocations to the Dividends Payable account to the available cash flow.

H. Taxes and Subsidies (i) Corporate Taxes

Figure 5:
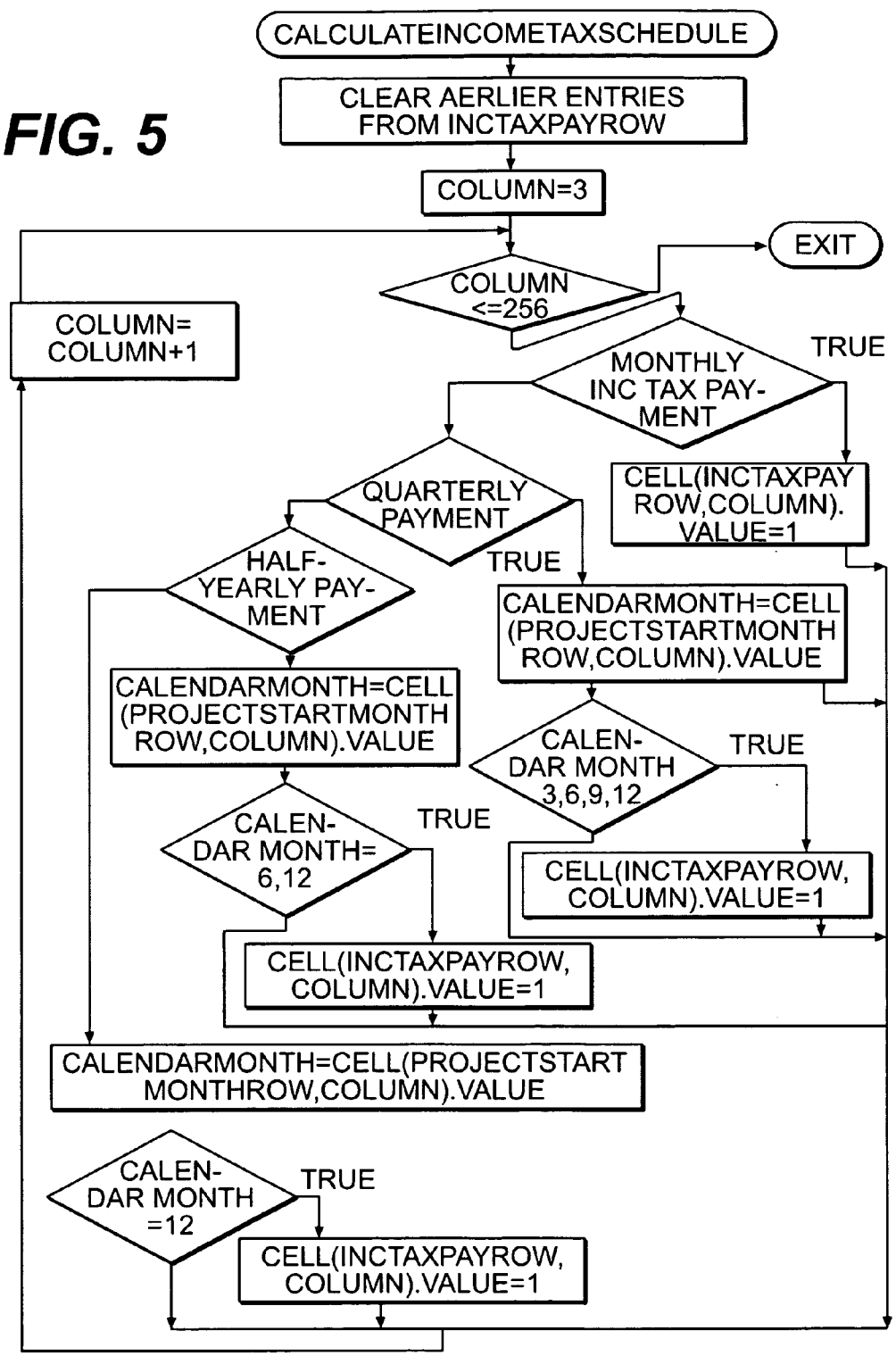
FIG. 5 is a representative flow chart for calculating the tax payment dates from the taxes and subsidiaries subset of an income tax calculation routine.

The PFANT program allows the user to enter different corporate tax rates for retained and disbursed income, to establish tax holidays with tax rates 0 or higher and to carry forward losses. The program automatically generates a monthly tax percentage rate. As tax codes widely differ, the PFANT allows manual editing of monthly tax rates. The user can choose the tax payment frequency (monthly, quarterly, semi-annually, annually), and the program then calculates the tax payment date in the manner shown on the flow chart of FIG. 5. Earnings volatility might vary substantially during the fiscal year. This might result in overpayment of taxes as payments might have been made on a quarterly bases but the assessment period is the tax year. At the end of the fiscal year, the program automatically refunds an overpaid amount (equivalent to carry forward of losses within the fiscal year).

(ii) Property Tax

Tax codes differ widely and change often. That makes generalization difficult. The PFANT program uses fixed assets as tax base for the property tax. The user can establish tax holidays and the tax payment frequency (Monthly, quarterly, semi-annually or Annually) or leave the default value. The PFANT program allows manual editing of the monthly tax rate.

(iii) Subsidies

The user can inject production subsidies into the company manually or automatically. She can determine the first and last subsidy month.

I. Costs (i) Variable Costs

The PFANT program structure foresees two different pricing mechanisms for inputs: (Type 1) input costs determined by the prices in the input market and (Type 2) prices determined by sales receipts. The latter allows the user to pass through some of the cash flow risks to the suppliers. The second pricing mechanism can be combined with a deferral (loan) mechanism.

(a) Type 1: Variable Costs—Determined by Prices in the Input Market

Figure 6:
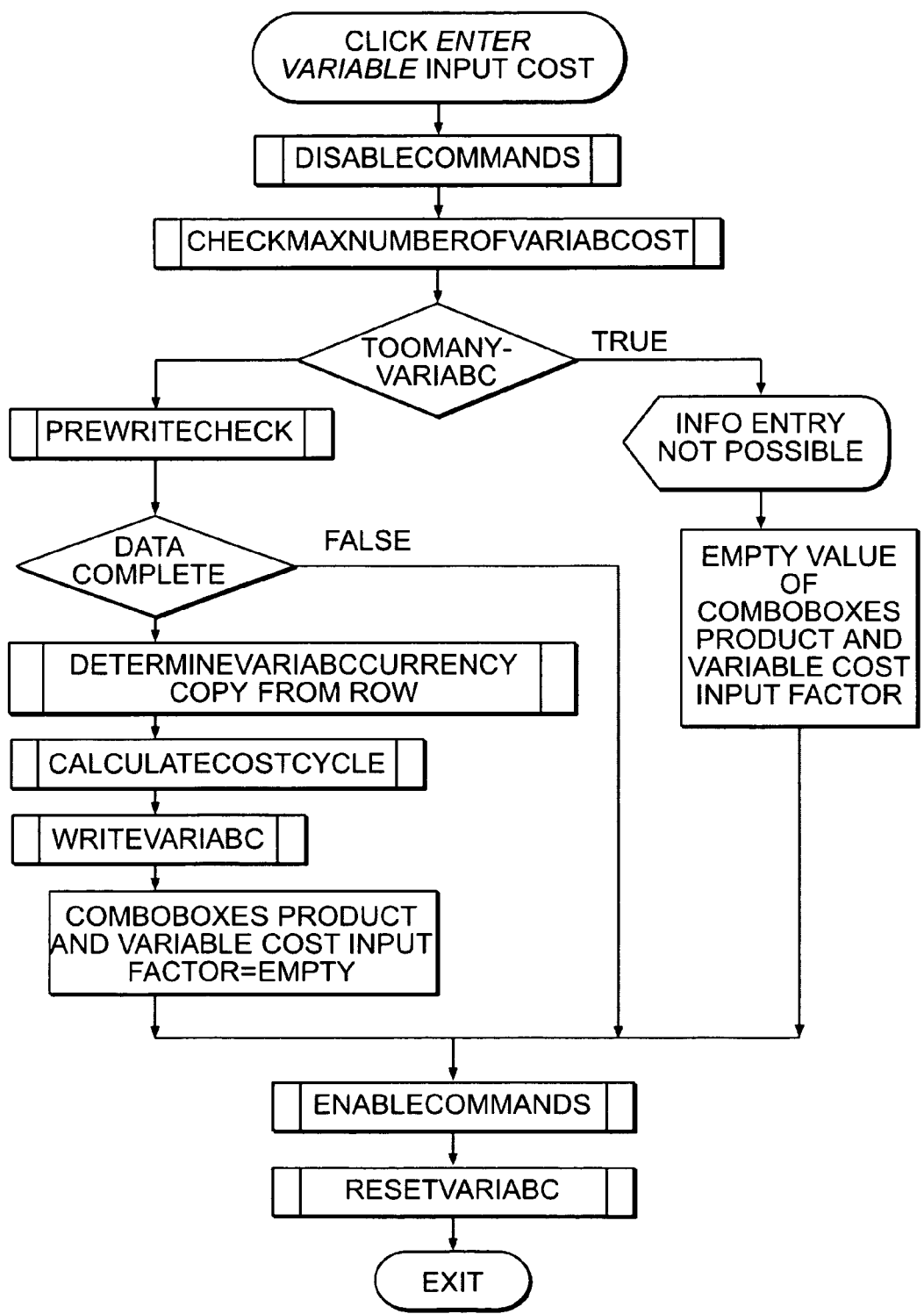
FIG. 6 is a representative flow chart of a variable cost entry and partial calculation routine determined by prices in input market prior to completion of calculation in the spreadsheet.

The user can enter multiple inputs (up to 14 inputs) using the variable cost routine shown in the flow chart of FIG. 6. Entries fall into two categories: technical and financial. The variable input record is described by (1) the product name and (2) the variable input name.

The user can call up the product (combobox 1) and then the variable input name (combo box 2). This resets (in case the input does not yet exist) the entry form or loads the data record into the entry form. Inputs can only be entered in relation to a product. If no product exists (/is called into Combobox 1) entry into the case file is denied. The program's access validation system prevents variable costs not allocated to products. The PFANT applies the same access validation to Type 2: Variable Costs, Fixed Operating Costs, Off-take and Mark-up sales contracts.

Entries fall in two categories: technical and financial. Technical entries comprise the unit of measurement for the input, the input-output coefficient, the minimum (or permanent) stock and the number of days from order to delivery ($0<=days<=91,25$). The PFANT program automatically builds inventories and orders the minimum stock on time for start up of operations. the user is allowed to freely select any project currency for the input. The only mandatory financial entry besides the currency is the price per unit of input. The user can establish an input price trend (increase or decrease), and select the first and last month of such a trend. She can simulate input price volatility, set the length of the price cycle and determine the status of the input price at project start Half-way up (default)
 Top Price
 Half-way down
 Bottom Price The percentage of down payment, the time from order to delivery and the average time from receipt to payment allow the program to calculate advance payments and accounts payable.

(b) Type 2: Variable Costs—Determined by Sales Receipts

The technical entries are identical to Type 1. The PFANT program allows the user to (1) select an off-take (sales)—contract or (2) to manually enter a market price scenario (e.g. if a market study is at hand) to serve as price base. A convenient combination of both is to first use an off-take sales contract and then edit manually the sales price time series as necessary. The financial data subset comprise the cost/unit of input as % of the sales price. For example, if the output sales price is 100 currency units per unit of output and the user wants the price of the input/unit be 50% of that price, the user writes 50 into the entry box. The model prices the input factor always at 50% of the sales price of the user's output—as long as the price is higher than a possibly stipulated minimum price. The user is allowed to enter a minimum price (usually contractually agreed). This minimum price can be inflated. The user can freely select the first and last month of the minimum price increase.

As with Type 1 Variable Inputs, the user can set in the software the percentage of down payment, the average time from order to delivery and the average time from receipt to payment. In addition, the user is allowed to shift part of the cash flow risks to the supplier. This is done through a deferral—credit mechanism. The company pays the full contract price but receives a loan from the supplier equal to the deferred amount. The deferral credit mechanism is triggered when the following conditions are met:

The company cannot fulfill its payment obligations.
 The input price is equal or higher than a negotiated trigger price.
 The agreed deferral—credit is not yet fully utilized.

The user can set a maximum credit amount. Payments are credited in the contract currency. Repayment takes place only if sufficient funds are available. The PFANT program accounts for foreign exchange gains or losses. Deferral happens if (1) the input price is higher than a trigger price entered by the user, cash flow is insufficient after draw down of the DSRAs and/or the stand by loan. The user can set an interest rate on deferral credits.

(ii)) Fixed Operating Costs

The user selects/enters a fixed operating cost item (up to 14 per product) by calling up the product name and then writing/selecting the name of the fixed operating cost item. The user can choose any project currency as cost currency. Costs are entered on a per-year basis and then converted into monthly cost. The user can establish a cost per year in- or decrease trend, and start and end this trend at any time.

(iii) Maintenance

Maintenance costs that cannot be allocated directly to a product as fixed operating costs (see above) can be entered (1) either as percent of the capital expenditure under the respective capital expenditure-category during the construction period or (2) as an absolute figure. Whatever method is chosen, maintenance is calculated in units of numéraire. The user can establish a maintenance-cost trend and set the first and last month of the trend.

(iv) Overheads

The PFANT program recognizes besides maintenance costs which cannot be directly allocated to a product, three further overhead categories: Administrative overheads, factory overheads and insurance. For each category, the user can select any Project Currency and enter the overheads p.a. The yearly cost is divided by twelve to get the monthly overheads. Overheads are taken into account from start up of operations onwards. The user can establish a cost trend and freely set the first and last month of the trend.

(v) Depreciation

The PFANT program uses the linear depreciation method to depreciate capital expenditure for buildings and equipment costs. Pre-production costs and capitalized interest during construction are also linearly amortized. There is no depreciation for capital expenditure on site. The user can select the number of years for depreciation for each capital expenditure category (Buildings, Equipment, Pre-production Expenses, Interest during construction).

Reinvestment is possible for buildings and equipment. Reinvestment for buildings and equipment is depreciated linearly over the same number of years that applies to depreciation of CAPEX made during the construction period.

J. Sales

The PFANT program provides three types of sales contracts: (1) off-take agreements with an off-taker as an intermediary based on commodity prices determined in the output market, (2) direct sales without the off-taker as an intermediary based on commodity prices determined in the output market (types (1) and (2) being called herein commodity market pricing), and (3) mark-up contracts which determine output prices as a function of the firm's production cost.

(i) Inventory Cycles

The PFANT program allows to set for each product the inventory cycle. Goods can remain in stock for up to 91 days before they are sold. This information is used by the program to calculate the balance sheet position finished goods and working capital needs.

Case 1—Inventory cycle=0 days

The balance sheet position for finished goods is zero.

Case 2—Inventory cycle=91 days

The balance sheet position for finished goods shows the maximum value for goods in stock—the value of the production of 91 days at production costs. The value of any output unsold after 91 days is set to zero by the program.

Figure 7:
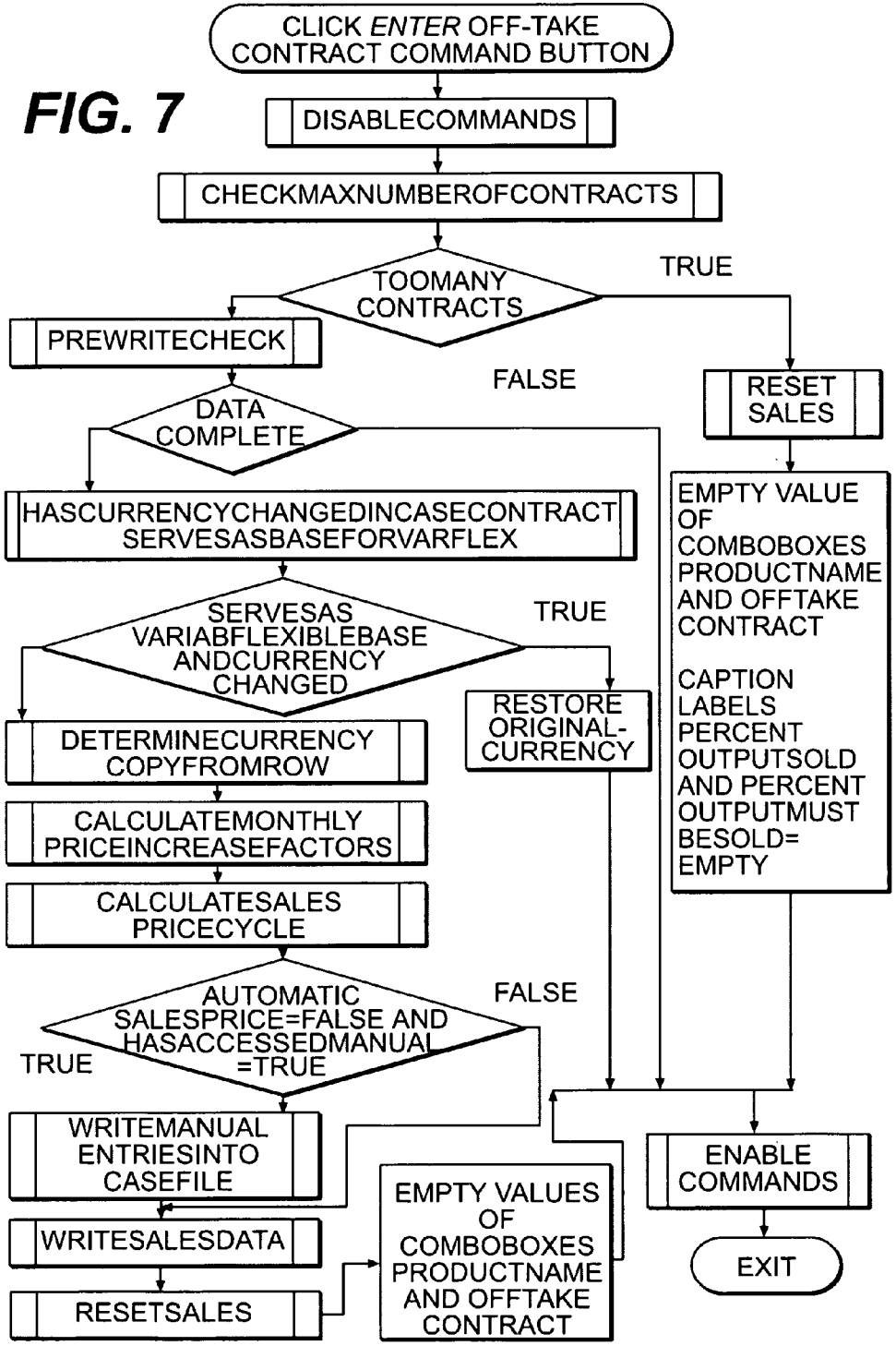
FIG. 7 is a representative flow chart of an entry and partial calculation routine for sales contracts involving off-take agreements or direct sales.
Figure 8:
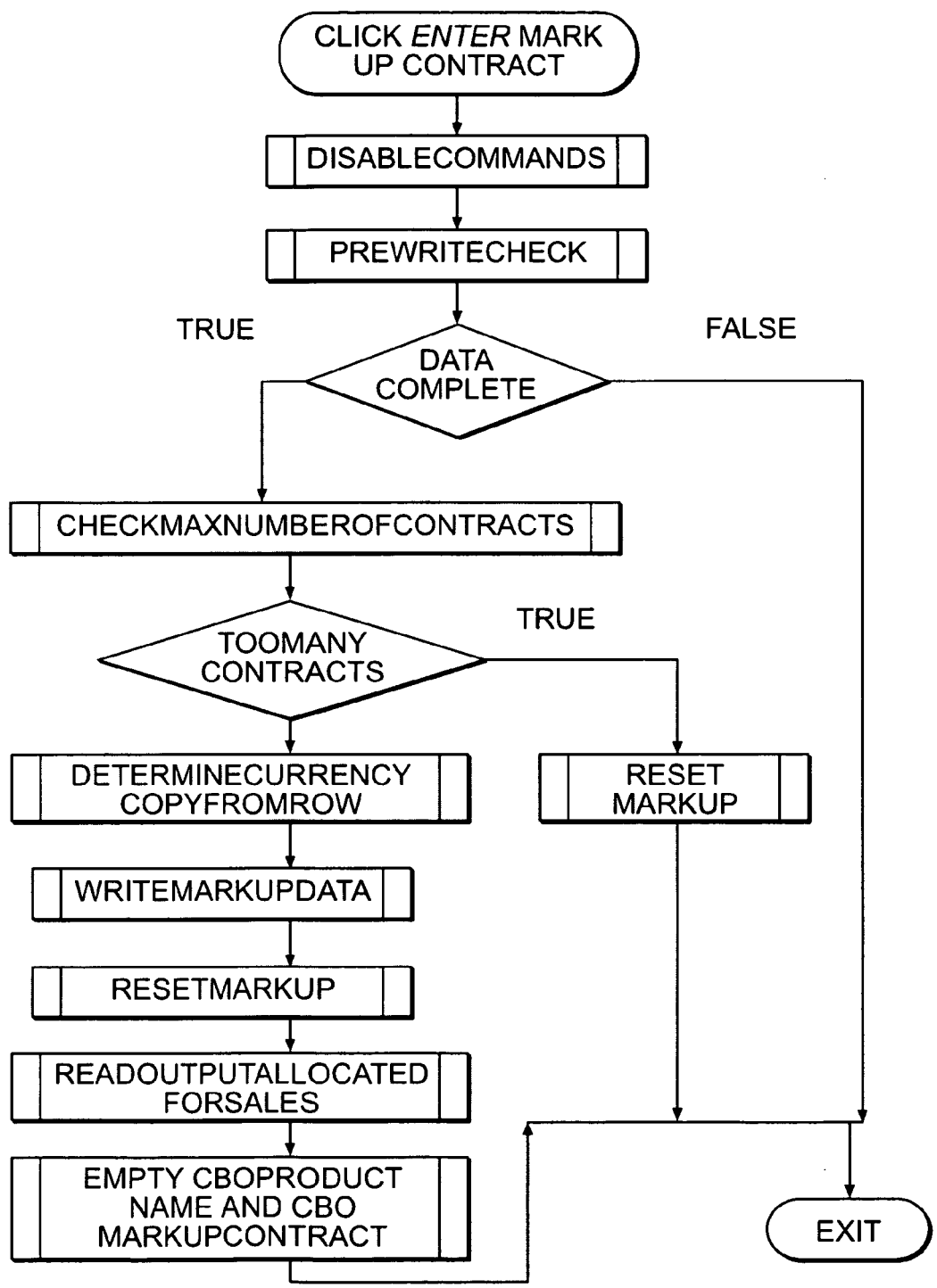
FIG. 8 is a representative flow chart in connection with mark-up pricing sales contracts of the mark-up basis routine.

(ii) Sales Types (1) and (2)—Commodity Market Pricing (a) Sales Contract Name, Share in Total Sales, Sales Contract Currency The user selects the product name and enters/selects the sales contract name in a combobox. This resets the form (in case the sales contract name is new) or loads the contract data in the entry form. The PFANT program prevents entry of sales contracts for non-existing products. The contract is assumed to be alive from start up to the end of the project. The user can select any Project Currency as sales contract currency. Transactions regarding the off-take contract proper (not sales expenses) are always made in the contract currency. As up to three contracts of types (1) and (2) and up to three mark up contracts (type 3) using the respective entry and partial calculation flow charts of FIGS. 7 and 8 are allowed, the program must prevent more than 100% of the output being sold. The user has to enter a percentage figure (default is zero). The program determines if sufficient output is available. If that is not the case, the user receives an error message and the field "Share of Contract in Total Sales" is cleared. Different sales contract types can be combined (e.g. in case of a generating plant, the ground load could be sold with a mark-up contract, and the remainder could go to the spot market and fetch with contract types (1) or (2) the going market rate).

Before the program deletes a contract, it checks whether the sales price is used to calculate a variable input price (risk sharing with supplier). The records of the variable input data subset are checked for the sales contract name. If the sales contract name is found in the variable input data subset, the user is informed that the sales contract cannot be deleted.

(b) Automatic and Manual Sales Price Generation Method

The PFANT program features two methods to enter the sales prices: automatic or manual. A sales price time series can be automatically generated and then edited as necessary. The manual entry allows data entry as obtained, e.g. from a market study.

If the user opts for automatic sales price entries, she can establish a price trend and freely select the first and last trend month. The user is allowed to generate sales price fluctuations around the long-term price trend. Such fluctuations can be generated regardless whether the sales prices have been generated automatically or manually. The program uses a sine function to simulate sales price volatility. Both the length of a price cycle and the amplitude of the price swings around the long-term price can be influenced. In case of sales price volatility, the user can set the price at project start as Half way up (default)
Top Price
Half way down
Bottom Price The user can enter the average number of days it takes from sale to receipt of payment. This impacts on receivables.

(c) Sales Expenses

The PFANT program allows the user to enter sales expenses both for the project-company and the off-taker. Entry methods are identical. There is, however, an important difference in the way sales expenses are treated. Whereas sales expenses incurred by the off-taker are deducted from the payments made to the project-company and thus reduce sales receipts, the sales expenses of the project-company are stated as such in the cash flow and income statement.

The user can choose any Project Currency as transport cost currency. She can enter the transport cost per unit and establish a transport cost increase trend. The user is allowed to select the first and last trend month. The same applies ceteris paribus to insurance costs.

The program allows the user to enter for each sales contract of type (1) or (2) an import duty and an indirect tax. Cascading VAT is ignored.

(d) Fees

Usually the off-taker receives a handling fee (a percentage of the sales receipts) for her services. Sometimes a flat fee is negotiated. The PFANT program allows the user to model such fees. Both fees are deducted from the payments to the project-company. The annual flat fee is converted into monthly payments. The user can set a flat fee cost trend.

(e) Deferral Mechanism Data

The PFANT program allows a shifting of part of the cash flow risks to the off-taker. This is done through a deferral—credit mechanism. The company pays the full sales price but receives a loan from the off-taker equal to the deferred handling/and or flat fee. The deferral credit mechanism is triggered when the following conditions are met:

The company cannot fulfill its payment obligations.
The sales price is equal or lower than a negotiated trigger price.
The agreed deferral—credit is not yet fully utilized.

(The user can determine the percentage of the handling fee and/or flat fee that is to be deferred. She can further set the interest rate per annum on the deferred amount.

(iii) Sales Types (3)—Mark up Pricing (a) General

As with sales contract types (1) and (2), the user selects the product name and enters/selects the sales contract name in a combo-box. This resets the form (in case the sales contract name is new) or loads the contract data in the entry form. Again, the PFANT program assumes that the contract is alive from start up to the end of the project. Contract currency is the numéraire. The program prevents that more than 100% of the output is sold (see above).

As with sales types (1) and (2) the average number. of days before receipt of payment is used to calculate receivables.

(b) Mark Up Basis

The PFANT program allows Total Operating Costs, Variable Costs, Fixed Operating Costs or Variable+Fixed Operating Costs as mark up basis. Adjustment is made for the share of the contract in total sales. The user can set the mark up percent. The program multiplies the mark up basis with the mark up percent. Parties might agree to a flat payment per annum, like, e.g., a connection fee. The user can establish a flat payment increase trend and select the first and last trend month.

Sales expense entries for the project company are identical to what was described above in the context of sales types (1) and (2).

K. Limited Recourse—the Hierarchy

Each limited recourse package needs a set of financial rules that governs (i) the sequence of support in case of cash flow problems and (ii) the replenishment of the DSRA's and/or repayment of limited recourse debt (stand bys, deferral credits) once the crisis is over. The PFANT program is governed by the (a) support and (b) replenishment/repayment rules below. The graphical presentation (see below) differentiates between conditional and unconditional support.

a) Limited Recourse—Crisis Intervention

| | |
|---|---|
| 1st Line of Defense: | DSRA: If cash flow after debt service is negative, the model will draw down the debt service reserve accounts if available. |
| 2nd Line of Defense: | Stand by loans: Should the cash flow remain negative once the DSRA's have been depleted, the model will draw down the stand by loan that is applicable (construction or repayment). |
| 3rd Line of Defense: | Deferral Credit Variable Costs: If the cash flow remains negative even after the stand by loans have been disbursed up to their maximum amount, the variable cost deferral kicks in - if available. |
| 4th Line of Defense: | Deferral Credit Off-Taker: If the cash flow is still negative after deferral of variable costs it is time to call upon the deferral of handling fees and flat fees, if agreed upon. |
| 5th Line of Defense: | Additional Shareholder investment: Any remaining negative cash flow will have to be met by additional shareholder investment, should the cash account be empty. |

Interest due on deferred amount: As long as the cash flow of the company is negative, no interest neither on the stand by loans nor on the deferral of variable cost or off-take fees will be paid.

(b) Limited Recourse—Replenishment, Repayment

| | |
|---|---|
| 1st Replenishment DSRAs | Before any amounts disbursed to the project-company are repaid, available cash flow is used to fulfill any payment obligations due under the senior debt (general-purpose loans). The remaining balance is used towards the replenishment of the debt service reserve accounts up to the required balance. |
| 2nd Repayment - Stand by Loans | If cash flow is available after the senior debt has been serviced and the DSRA been replenished, the remaining cash flow will be used to repay the principal first of the construction and then of the repayment stand by loan. Once the principal of both loans has been fully repaid, any deferred interest on these loans for the construction and repayment phase are senior to the deferral credits by input suppliers (variable costs) and off-takers (flat and handling fees). |
| 3rd Repayment - Variable Costs | If the cash flow after interest payments on the stand by loans is positive, the deferred variable cost will be paid (i.e. the variable cost loan will be repaid). Remaining positive cash flow will be applied towards any outstanding interest on the variable cost loan. |
| 4th Repayment Off-taker | Should cash flow remain positive after interest on variable cost loans has been paid, off-take deferral credit will be paid down. Once that is done, outstanding interest on the off-take credit will be paid. |
| 5th Dividends | Once all the above has been met, dividends can be disbursed. |

(c) Conditional and Unconditional Support

The PFANT program differentiates between unconditional recourse
    debt service reserve accounts
    stand-by loans
    and conditional recourse
    deferral credit for input cost—condition: price higher than trigger price
    deferral credit for handling or/and flat fee—condition: price higher than trigger price The PFANT program illustrates graphically the available and used limited recourse resources. The user can with one glance assess the impact of different scenarios on remaining recourse reserves. The graphs give an impression of the dynamics of recourse reserves usage overtime.

Figure 9:
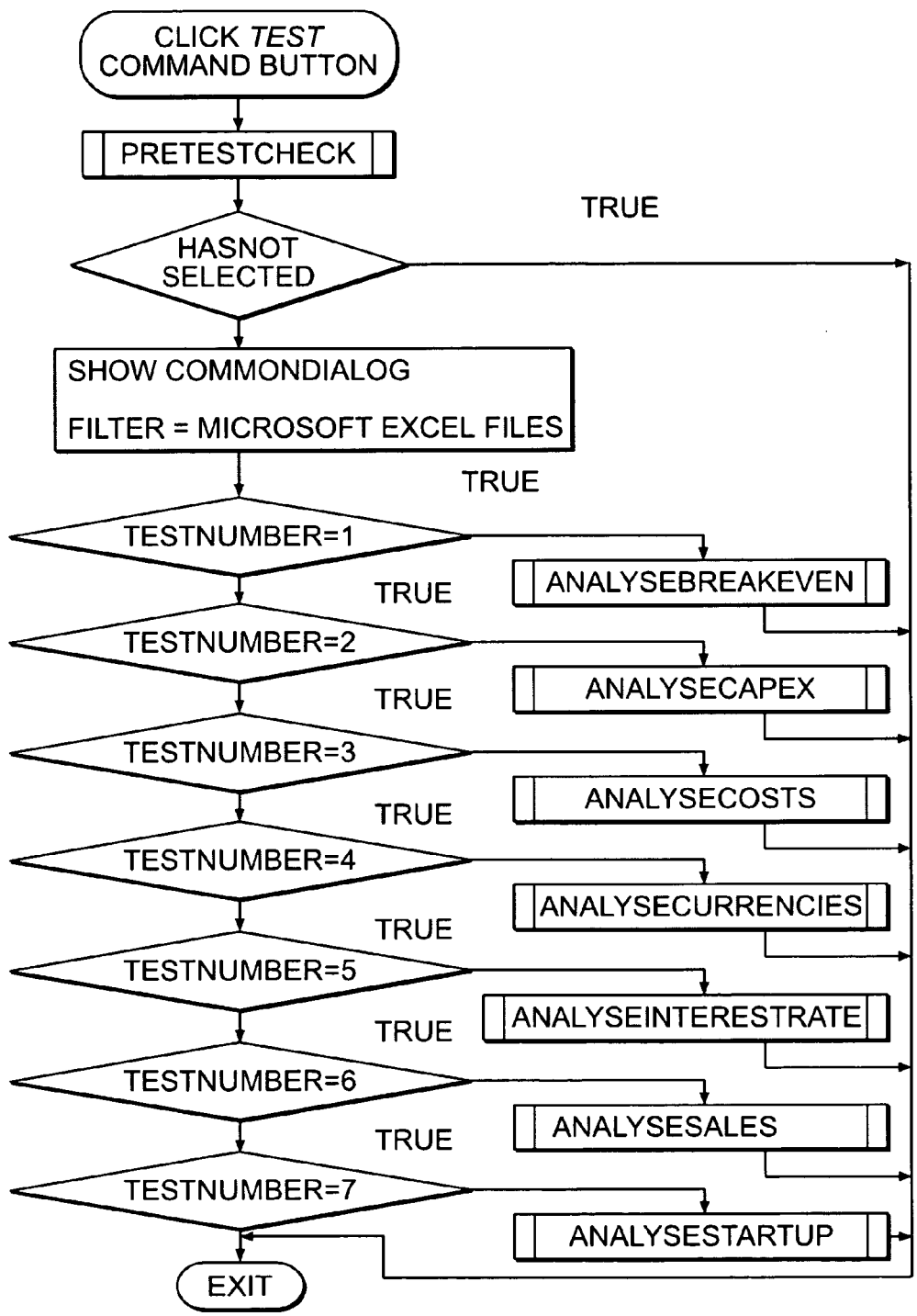
FIG. 9 is a representative flow chart of a test routine triggered by hitting the Test command button to do sensitivity testing for the most important variables.
Figure 10:
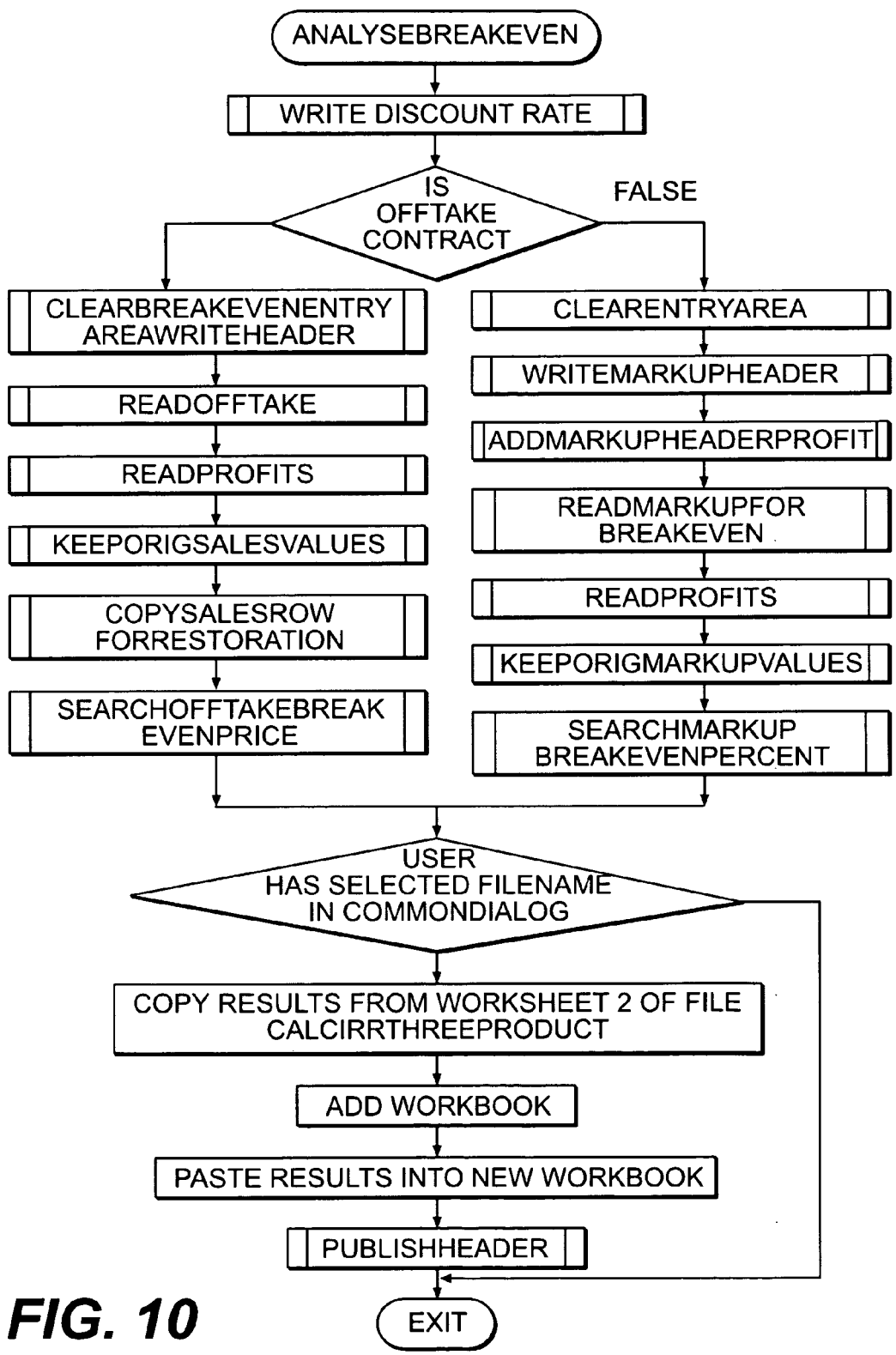
FIG. 10 is a representative flow chart of sensitivity testing sub-routine for analyzing break even sales which is one of the variables in the routine shown in FIG. 9.

FIG. 9 is a flow chart showing the selection of an automatic sensitivity testing routine for those variables deemed to be the most important, namely CAPEX, costs, currencies, interest rate, sales, and start up. FIG. 10 is a flow chart of the break even analysis for off-take and mark up contracts which uses an iterative procedure.

Similarly, for the mark up contract the steps include adding a mark up profit, assigning a mark up percentage to a variable, assigning the original mark up percentage to a variable and search the routines for the two mark up sales contracts.

Figure 1:
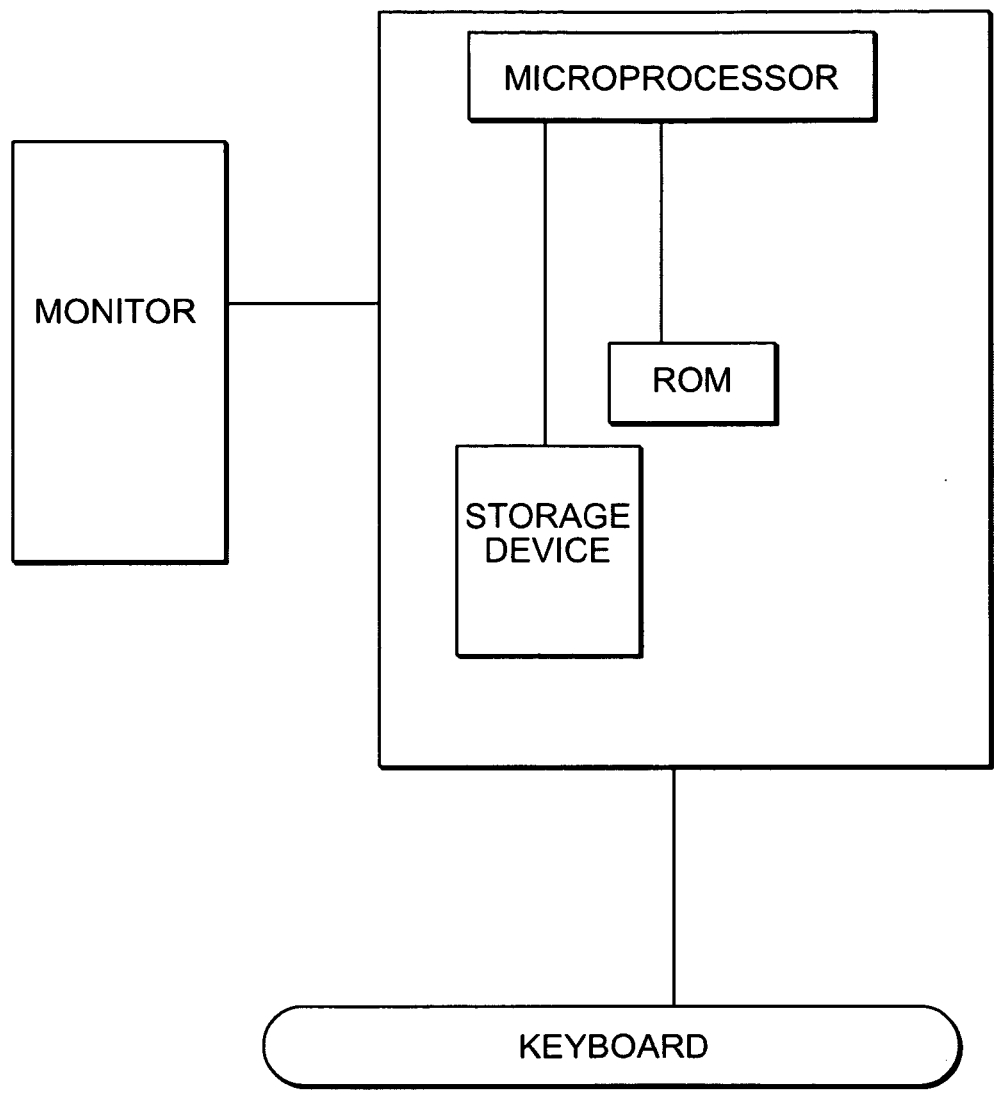
FIG. 1 is a schematic of a personal computer in which the program product of the present invention is stored in a conventional storage device of sufficient capacity, run by a sufficiently fast microprocessor and has its results displayed on, for example, a monitor.

The following description relates specifically to an embodiment of the program, called here ProFin Tools Project Finance, supplied to the user in the form of a floppy disk or CD-ROM or downloaded over the Internet from a site. After appropriate installation of the program from one of the aforementioned sources in a storage device of the PC shown in FIG. 1, a user initiates all starts with the File menu. If the user wants to start a new project, she goes to the File menu and clicks on New. The model loads a fresh project case file and will ask the user to name it. The Global menu gives the user access to global project data like currencies or the plant's technical specifications. Once the global data has been filled in, it is up to the user to decide the order in which she wants to enter further data. Once she has made entries, she can go to the output system by clicking on Model and then on Show Me on the drop-down menu. The program will present a form that allows the user to access the desired output and to look at numeric results and graphs that illustrate the impact of her actions. For an initial look at a new project, it is best to proceed from left to right on the menu bar.

The following description is in the form of a proposed user's guide written as chapters which follow the order on the menu bar as the user moves from left to right as would occur, for instance, with a first look at a new project. Following the thirteen chapters, I have set out two examples to project finance modeling using the program. The first example (Example I) involves a chemical facility in which three production lines are to be installed. The second example (Example II) involves a U.S. investor interested in entering the toll road business in a country using the franc as a currency.

Chapter 1

Installing ProFinTools—Project Finance

System Requirements

To run ProFinTools Project Finance, your system should have a Pentium II processor or higher and not less than 128 MB RAM. To work with the graphical user interface, you need a mouse. Software requirements are Windows 98 and Excel 97 or Excel 2000. You also need ample free space on the c: drive.

System Settings

ProFinTools Project Finance uses an entry control system that checks your entries as you type. For the model to work properly, the regional settings of your computer should be set to "English (United States)". It is essential that your system uses the point as the decimal symbol and the comma as the digit grouping symbol. You can check or change the settings by pressing the Start button, selecting Settings and Control Panel. On the Windows Control Panel-surface click on Regional Settings.

Program Status

ProFinTools Project Finance lets you know what's going on. While the graphical user interface is running, you receive in the lower left-hand corner a status information. You can take actions or make entries while the status is "Ready".

To hide the taskbar and maximize the screen, press the Start button and go to Settings, click on Taskbar & Start Menu. Choose Auto Hide in the Taskbar Options menu. Don't switch between programs using the task bar while the model is running. ProFinTools Project Finance needs substantial computing resources and is not meant to work as a multitasking program.

Installing Project Finance Tools

Insert the CD into your CD-drive. Go to Start on the Windows task bar and select Settings and then Control Panel. Go to Ad/Remove and select ProFinTools on the CD in the CD-drive. The installation program takes you through the installation process for the graphical user interface.

Once you are done with the installation of the graphical user interface leave Control Panels and open the Windows Explorer. Copy the folder "Multiproduct" from the CD to your c: drive. Then copy the file MyFirstCase.xls to the folder "MyDocuments" on your c: drive. Go with the Explorer to the folder "Multiproduct" and make sure that the Excelfiles in that folder are not read only (highlight with the cursor all the files in the folder "Multiproduct", click on File,Properties and make sure that the Read only box is not checked). Do the same for the Excel-files MyFirstCase.xls, Factory.xls and Tollroad.xls.

When you run the model the first time it is linked to the case file "MyFirstCase.xls" in the folder "MyDocuments".

Look at Excel—Files

You are invited to look at the Excel files that do the calculations. The files are protected. You should not try to modify them. Most important, don't press the Return button that you find on most of the pages. This will cause Excel to become invisible. If that happens, Press Ctrl+Delete+Alt. You will see a box with the programs that are resident in the memory. Go on Excel and end it.

Chapter 2

Introducing ProFinTools Project Finance

PROFINTOOLS PROJECT FINANCE allows you to structure the financing for a greenfield plant that sells up to three different products. The program provides you with the limited recourse tools that are standard in project finance.

Who Should Work with the Program?

Banks, engineering companies, project sponsors and credit insurance providers.

Negotiate with the ProFinTools Project Finance

The program comes with an interactive Windows graphical user interface. You can enter data during negotiations. The graphs allow you to quickly assess the impact of propositions that are on the negotiating table.

Quickly Assess Financial Viability

Quite often—at the very beginning of project design— you need a quick grasp on the financial viability of a project proposal. Without going first through a time consuming modeling process, PROFINTOOLS PROJECT FINANCE helps you to find out whether an idea is worth further pursuit. As your project data get more detailed, you can use PROFINTOOLS PROJECT FINANCE to further refine the analytical work.

Sensitivity Testing

Project finance models can be quite difficult to audit. It takes a while to locate and eliminate errors. PROFINTOOLS PROJECT FINANCE gives you an instrument to double check models, work on different scenarios and undertake extensive sensitivity testing. In Annex I you find a list of data requirements. Based on the data in the list (or a subset thereof) you can double check financial models and test for currency shocks, currency volatility, interest changes, delays in start up and all sorts of cost increases without engaging in hands on programming.

What Else does ProFinTools Project Finance?

The program generates monthly, quarterly, semi-annual and annual cash flows, income statements and balance sheets. The financial statements come with the standard financial ratios. The model provides you with graphs i.a. for capital expenditure, loans, equity, costs and sales. You can make incremental changes and assess their impact.

Which Project Finance Instruments are Featured by ProFinTools?

PROFINTOOLS PROJECT FINANCE provides you with the following instruments:

debt service reserve accounts (DSRA);

tailor made debt repayment schedules;

sweep to prepay loans if sufficient cash flow is available:

a stand by loan for both the construction and repayment phase of loans;

prices of variable inputs as a function of sales receipts;

limited recourse provided by input suppliers;

limited recourse provided by off-takers.

PROFINTOOLS PROJECT FINANCE shows you graphs that illustrate the utilization of the limited recourse over the project lifetime. This helps you to assess the robustness of the limited recourse package.

You can use the model to design your equity subscription plan and to ensure that a desired equity ratio is always met.

What Type of Sales Contracts can I Implement?

The model allows you to sell directly to the market;

through off-take contracts;

on a cost plus mark up basis;

through a combination of the above.

ProFinTools Project Finance and Multitasking

The model works on a monthly basis. Therefore the program has to process a huge amount of data. To do that in a reasonable time, we recommend that you shut down all other programs. You should also shut down Excel before you run ProFinTools.

ProFinTools Project Finance and Excel—Don't Copy and Paste

PROFINTOOLS PROJECT FINANCE automates Excel. Excel is always present in the background. When you shut down Excel while PROFINTOOLS PROJECT FINANCE is running, the model gives you an error message. You will have to exit and restart PROFINTOOLS PROJECT FINANCE before you can proceed.

The program uses the Excel data validation mechanism. This works fine as long as you don't paste illegal values into entry fields. Pasting illegal values wipes out the validation code. We have therefore disabled Copy and Paste. This is inconvenient but safer.

Chapter 3

ProFinTools Project Finance—Basics

Navigating ProFinTools Project Finance

PROFINTOOLS PROJECT FINANCE is an interactive financial environment. The program enables you to assess straight away the impact of relevant project data on the project's viability. If you structure a deal, you are in a constant dialogue with the program. You will refine your analysis as your knowledge of the project deepens.

The File and Global Menus

All starts with the File menu. If you want to start a new project, go to the File menu and click on New. The model's loads a fresh project case file and will ask you to name it (on a Pentium II laptop with 128 MB Ram this takes a couple of minutes). The Global menu gives you access to global project data like currencies or the plant's technical specifications. Once you have filled in the global data, it is very much up to you to decide the order in which you want to enter further data. Once you have made entries, you can go to the output system by clicking on Model and then on Show Me on the drop down menu. The program will present you a form that allows you to access the desired output and to look at numeric results and graphs that illustrate the impact of your actions. For a first go at a new project, it is best to proceed from left to right on the menu bar. This is also the structure of this user's guide.

How to Work with the User's Guide

The user's guide should not be read from back to back. It is rather a reference book you might turn to when you are working on a specific task. We have tried to make the data entry environment as self-explanatory as possible. The user guide provides you with an in depth explanation of the entry fields. You will also find checklists that contain the steps necessary to perform a task like entering a loan or a variable input.

Whatever you enter, PROFINTOOLS PROJECT FINANCE gives you a set of financial statements. This does not replace serious financial analysis. It should however make such analysis simpler and more accessible.

Quick and Dirty

There are few mandatory entries like the technical capacity and input-output coefficients. In most cases you can just accept the default values and go back later for further refinement. This means you can get a tentative answer at a very early stage of project design. This makes PROFINTOOLS PROJECT FINANCE an excellent instrument for a first quick project assessment. You can save a lot of time on jobs that soon prove not to be worth further effort. Should the project be worthwhile, you can use the program to refine the analysis as further data become available.

Save Your Scenario and Trade Information

PROFINTOOLS PROJECT FINANCE allows you to save scenarios. If you want to later return to a scenario, just go on the menu bar to File and click on Save as and save the scenario. If you want to exchange information with other parties, this is the file that you should transfer.

Sensitivity Testing

PROFINTOOLS PROJECT FINANCE permits automatic test runs for key variables like interest and exchange rates, costs or the start up date. The results are written into an Excel file.

The Data Requirement List

In Annex I, you find a list of data requirements. The list tells you which variables are optional (most) and which entries are required. The data requirements are also available as a word file on the CD so you can email it or print it out. If you don't make entries, the model works with the default values. The data requirement list indicates the impact of the default values.

Sample Cases

In Annex II you find attached two sample cases. A polyethylen factory and a toll road. The Case files for both are on the CD as factory.xls and Tollroad.xls.

A Word on Combo- and Listboxes

PROFINTOOLS PROJECT FINANCE uses combobox for entries and choices. The comboboxes display a drop down list if you click on the triangle to the right. You can then select an item on the list. The item is loaded into the display field and the drop down list disappears.

Listboxes are different. You turn the spinbutton to their right to review their content. To make a selection in a listbox you have to click on the content. The selected item turns blue.

Chapter 4

ProFinTools Project Finance—Global Data

Global

This chapter deals with global project data that you should enter before you enter other project data. While the program is fully functional without that information, you will not obtain meaningful results as the default construction period is set to four months and the capacity usage is set to zero. You also have only access to one currency—the currency of calculation (or numéraire)—if you do not enter currency information first. PROFINTOOLS PROJECT FINANCE provides two entry forms for global data: the form Name, Schedule and Technical Specs and the form Currencies.

Basic Project Data

Project Name and Time Horizon

Select Global on the menu bar. Choose Name, Schedule and Technical Specs on the drop down menu.

Project Name

Write the project name into the Project Name entry box.

Project Start

The project start is the first month in which you incur expenditure that you want to be included in the analysis. The model works on a monthly basis. Select the calendar month and calendar year of the project start.

Fiscal Year

Select the month you want to start your fiscal year. The model needs this information to generate quarterly, semi-annual and annual cash flows, income statements and balance sheets.

What does fiscal year month mean? Assume that you have entered February as the month of project start. Assume further that you have selected June as the month you want to start the fiscal year. In February you are then in the ninth fiscal year month (June is month one of the fiscal year, March to May are three months. As May is the twelfth month of the fiscal year the project start month February must be the ninth month of the fiscal year).

Start Up of Operations

Select the month of start up of operations. Start up of operations is defined as the first month your plant produces output. The time period from the project start to the start up of operations is the construction period. The construction period can be as long as 72 months (six years).

The model builds itself the inventories. Because the maximum time between order and delivery of inputs is set to 91.25 days (365 days per year/12*3=91.25 days per trimester) the earliest start up month is project month 4 (this allows the model to start buying inputs in project month 1).

Can I change the start up month? Absolutely, and anytime. However, if you have edited the production capacity use manually you should revisit your manual capacity use schedule after any change of the start up month. This is because if you have done such edited manually the program has no clue on your intentions for what is to happen in the time slice between the old and the new start up month. If the new start up month is later than the former start up month, the model will set capacity use up to the new start up month to zero. You will loose any capacity use entries you have made for that time period. If the new start up month is earlier than the former start up month, capacity use will be zero between the old and the new start up month.

End of Project—Shut Down of Plant—End of Analysis

You can terminate the economic life of your project any project month higher than month 73. In the month you select as End of Project your cash flow and income statement will go to zero and your balance sheet will freeze at the historical values of the month before the end of analysis.

Shut down of plant and capacity use: If you are not sure about the project lifetime it is better to start with a higher End of Project month. Cutting back the project life is a simple exercise. Extending the project life is somewhat more cumbersome. You must revisit the capacity use if you have manually edited it earlier. The model cannot know your intentions. If you do not edit the capacity use again its value will be zero between the former earlier the now later end of project. Further, possible subsidies are only reflected in the system up to the last subsidy month. You might therefore want to revisit subsidies as well.

Note: The program calculates subsidies until month 256. However, subsidies after the end of analysis are ignored.

Shut down of plant and IRR-NPV: In calculating the internal rate of return and the net present value, the program assumes that at the end of the project, fixed assets are sold at their balance sheet values.

Technical Specifications

Product Name

The program allows you to produce up to three products. For each product you have to enter the technical specifications. Start at the top of the frame Technical Specifications (on the entry form Global Project Data) with the box Product Name. Enter the name of the product. Before you press Enter, fill in the other entry fields in the frame.

Measurement Unit Output

PROFINTOOLS PROJECT FINANCE uses linear production functions to describe a single stage production process. Production costs are determined by input-output coefficients. Enter the unit that is used to measure the output (e.g. tons, gallons etc.). All later entries that refer to the output of the product (like variable inputs per unit or sales prices) refer to this unit of measurement.

Maximum Capacity

Enter the maximum number of units of the product that the plant is physically able to produce per year. E.g. if the plant can produce 1,000,000 units of product 1 per year, enter 1000000 for product 1.

Actual Capacity Usage

Enter the actual capacity usage (e.g. enter 95 for product 1 if capacity usage is 95%) of the plant for the product. To determine the number of units produced per month the model divides the annual maximum capacity by twelve and multiplies the monthly maximum output by the actual capacity usage.

Maintenance

What about Regular Maintenance Shut Downs?

Assume your plant works at 97% of the maximum capacity for product 1 through the year but needs a two-week annual maintenance shut down every August.

1. Enter 97 (for 97%) as Actual Capacity Usage.
2. Complete the other entries on the Global Project Data entry form.
3. Press Enter. The program writes the capacity use into the case file.
4. Select as learning curve Manual and press Edit Capacity Use. The program will show you the capacity use from start up on.
5. Select every August until the end of the project life. Enter for each August 50 (for 50%). Press Return and then Enter to write the changes you make into the case file.

Learning Curves

If your plant needs to be run in, production after start up of operations will not immediately reach the average capacity usage. ProFinTools allows you to automatically generate a Linear Learning Curve Production increases during the learning period monthly by equal amounts.

Steep Learning Curve

Production increases steeply at the beginning of the learning curve. Later, the learning curve levels off.

Flat Learning Curve

Production is flat at the beginning and steep later on.

Checklist: Create a Learning Curve
1. Select the product.
2. Enter the Actual Capacity Usage.
3. Select a learning curve (click, selection should turn blue). Enter the Capacity Use at Start up of operations.
4. Press Enter.

Checklist: Edit or look at a Learning Curve.
1. Go first through the steps 1–4 above (this saves you a lot of typing).
2. Select the product in the Product Name box.
3. Click on Manual in the Manual/Learning curve listbox (selection should turn blue). A button titled Edit Capacity Use will pop up.
4. Press Edit Capacity Use. The model will show you the learning curve.
5. Press Return when done.
6. Press Enter to write the data into the case file.

Checklist: Look at or Publish the Monthly Output
1. Exit the form Name, Schedule and Technical specifications.
2. On the menu bar select Model and then Show Me. The model loads the output system.
3. Press the command button Cost of Goods. The frame Costs will pop up. Click with the mouse on the product you want to study. Four comboboxes will appear. Click in the lowest box on Capacity Use—Learning Curve. Then Press either Show Me or Publish. The model loads the corresponding cost file.

Time Needed to Produce One Unit of Output

The time it takes to produce one unit of output is needed to calculate work in progress. The longer it takes to produce one unit of output the higher is the value of work in progress at any given time. Production can be instantaneous, as e.g. in the case of an electrical power plant. In that case the fields Days, Hours, Minutes and Seconds should be left with their default values zero.

Share in Overheads

The share in overheads is the percentage of overheads allocated to the product. Overheads are maintenance, administrative costs, factory overheads and insurance that is not directly related to the production of the good. Write percentage allocated to the product into the Share Overheads—% box. This entry is relevant in case you want to sell output on a mark up or cost plus basis.

Share in Depreciation

The share in depreciation—amortization is the percentage of the total depreciation—amortization allocated to the product in any project month. The information is needed for mark up pricing.

Currencies

To enter a currency, select Global on the menu bar. Choose Currencies on the drop down menu.

PROFINTOOLS PROJECT FINANCE allows you to work with up to eleven currencies: the currency of calculation (the numéraire) and up to ten other currencies.

Numéraire—currency of calculation

First enter the numéraire. The model converts all entries that you make in other currencies into units of the numéraire. The cash flow, income statement and balance sheet are generated in units of the numéraire.

GDP—Deflator

The gross domestic product deflator (GDP-Deflator) is the inflation rate that applies to the numéraire. If you have chosen the USD as your unit of calculation (numéraire) you should enter the annual inflation rate that you expect for the USD. If you expect prices to fall, enter a negative value. ProFintools will use the GDP-deflator to discount the free cash flow before calculating the Internal Rate of Return and the net present value of your project.

Last Project Month Inflation

Select the month in which you want the inflation or deflation to end. You can choose any project month smaller than 255

Note: If you enter inflation but keep input costs constant your relative prices will shift.

If all payments are made in the unit of account and all your sales receipts are in numéraire as well then you are done. Press Enter and exit Currencies.

Additional Currencies

Name of Additional Currency

Write the name of the additional currency into the Enter/Select Add. Currencies box. This resets the entry area for additional currencies. You can either design exchange rates automatically or manually.

Exchange Rate

To avoid tedious typing, it is best to first generate the exchange rate automatically and then edit it manually as you see fit.

Automatic Exchange Rate

Enter the exchange rate (number of currency units of the additional currency you have to pay for one unit of the numéraire) into the Enter Exch. Rate (Curr Units/Unit of Numéraire) field. Example: You have chosen the USD as numéraire. You want to enter the Canadian Dollar as an additional currency. Assume that you get for one Canadian Dollar USD 0.7. The exchange rate you should enter is 1 Canadian Dollar/0.7 USD=1.4285.

If you want the exchange rate to be constant over the project lifetime you are done. Press Enter. Exit Currencies once you have entered the additional currencies you want to use. You can always come back and enter additional currencies.

You might notice that it takes a while to exit the Currencies entry form. The model needs this time to update the project files.

Manual Exchange Rate

If you opt for Manual Exchange Rate the button Edit Exchange Rate will appear. Press this button to gain access to the entry area. For each project month you should enter an exchange rate bigger than zero. As this is quite boring it is better to first generate the exchange rate for all the 254 project month automatically and then edit it.

The program will not tolerate exchange rates of zero. If you leave a field empty ProFinTools will assume an exchange rate of one for that month.

Sensitivity Testing: Currency Trends and Currency Fluctuations

PROFINTOOLS PROJECT FINANCE gives you various options to simulate exchange rate trends, shocks or fluctuations:

Exchange Rate Trend—Percent per Year

For depreciation enter positive number. Example: Assume the exchange rate is 10 units of the additional currency for one unit of the numéraire at project start. You expect that you will have to pay 12 units of the additional currency at the end of project year 1 for one unit of the numéraire. The additional currency will have depreciated by 20%. Enter 20 in the Exchange rate Trend p.a. % box.

For appreciation enter a negative number. Example: Assume the exchange rate is now 10 units additional currency for one unit of numéraire. After one year you expect an exchange rate of 8 to ten. The additional currency has appreciated by 20%. Enter −20.

Last Month of Exchange Rate Trend

Select the last month of the exchange rate trend with the spinbutton. ProFintools allows you to establish a trend for up to 254 months. The default value is one month.

Exchange Rate Volatility

PROFINTOOLS PROJECT FINANCE uses a sine function to simulate currency volatility. You can influence both the length of a currency cycle (frequency) and the size of the swings (amplitude) around the long-term exchange rate.

Length of Cycle

Select the length (no. of months) of the currency cycle (up- and downswing) with the spin button Months—Length of Currency Cycle. If you expect your additional currency to go through a full cycle within four years select 48 (full cycle: appreciation, return to the long-term exchange rate, depreciation, return to the long term exchange rate). The default value is 60 months.

Percent of Exchange Volatility

Enter the percentage you want your currency to appreciate and depreciate. This entry determines the amplitude of the exchange rate fluctuations. Example: If you want your currency to appreciate and depreciate 20% during the currency cycle enter 20.

Status of Currency Cycle at Project Start

Select one of the following options for your additional currency (click on the listbox, selection should turn blue):

Half depreciated (default)
Fully depreciated
Half appreciated
Fully appreciated.

Example: Assume your exchange rate is 10 at project start. Assume further your currency volatility is 10 percent. If you select Half depreciated, your exchange rate is 10 at project start (going up). In case of Fully depreciated it is 11 (going down), in case of Half appreciated it is 10 (going down) and in case of Fully appreciated it is 12 (going up).

One Time Exchange Rate Shock

Month of Exchange Rate Shock

Select the month in which the exchange rate shock occurs with the spin button Month of One Time Exchange Rate Change (e.g. select 48 for a shock that occurs four years after project begin).

Depreciation—Appreciation

For depreciation enter a positive number. Example: Assume the exchange rate is 10 units of the additional currency for one unit of the numéraire the month before the exchange rate shock. After the shock you have to pay 13 units for one unit of the numéraire. The currency has depreciated 30%. Enter −30 (minus 30) in the One Time Devaluation (+)–Appreciation (−) box.

For appreciation enter a negative number. Example: The exchange rate is 10 units of the additional currency for 1 unit of the numéraire in the month before the exchange rate shock. After shock 1 unit of the numéraire costs only 7 units of the additional currency. The additional currency has appreciated 30%. Enter −30 (minus 30) into the One time Devaluation (+)–Appreciation (−) box.

Checklist: Simulate an Exchange Rate Trend

1. Select the currency.
2. Write the annual depreciation (+) or appreciation (−) into the exchange rate trend box.
3. Select the last month of the exchange rate trend with the spinbutton.
4. Press Enter.

Checklist: Simulate Exchange Rate Volatility

1. Select the currency.
2. Write the percentage of the currency swings (appreciation and depreciation) into the %—Currency Swings box.
3. Select the length of the currency cycle with the spinbutton.
4. Select the status of the currency cycle at project start.
5. Press Enter.

Checklist: Simulate a One-Time Exchange Rate Shock.

1. Select the currency.
2. Select the month of the exchange rate shock.
3. Write the percentage of the depreciation (+) or appreciation (−) into the One time Devaluation (+)—Appreciation (−) box.
4. Press Enter.

Checklist: Look at or Publish the Exchange Rate

1. After you have entered a currency (steps above) exit Currencies.
2. On the menu bar select Model and on the drop down menu Show Me.
3. Press Currencies. A box appears. Click on the currency you want to see.
4. Press Show Me if you want to see the exchange rate and an associated graph. Else, press Publish.

Chapter 5

ProFinTools Project Finance—Capital Expenditure

This chapter deals with capital expenditure (Capex) during construction and capital expenditure for reinvestment and/or expansion during operation. It also explains how to create manually or automatically a capital-expenditure-schedule.

Capital Expenditure During the Construction Period

PROFINTOOLS PROJECT FINANCE supports four capital expenditure categories:

| | | |
|---|---|---|
| 1. | Site | No depreciation, no reinvestment. |
| 2. | Buildings | Depreciation and reinvestment. |
| 3. | Equipment | Depreciation and reinvestment. |
| 4. | Pre-Production Costs | Depreciation, no reinvestment. |

Do not enter minimum stocks of inputs you buy for operations as capital costs. Such inputs should be entered under Variable and Fixed Operating Costs, PROFINTOOLS PROJECT FINANCE automatically builds up inventories and buys before start up of operations the minimum stocks needed to operate the plant.

You can enter under each Capex category up to 15 Capex—contracts.

Checklist: Enter Capex:

1 Select Capex on the menu bar.
2 Select the capex category (site, buildings etc.) on the dropdown menu. ProFinTools loads the entry form.
3 Write the name of the contract into the Contract Name Box.

Import Content

4 Select the Currency for import Content (click on the listbox, selection should turn blue). If you don't find the currency you need, exit form Capex, go to form Currencies and enter the additional currency.
5 Write the customs tariff—if any—into the Customs—% Box.
6 Select the Month of First Disbursement.
7 Select the Month of last Disbursement.
8 Select the Option Automatic Entry or Manual Entry of Capex Schedule.
9 Press OK—Go to Import Content Schedule.

If you have selected Manual Entry the model will show you an entry field for your import Capex under the contract. As you make entries PROFINTOOLS PROJECT FINANCE shows you the respective customs and Capex disbursements in units of the numéraire.

10 Press Return when you are done with your entries.

If you have selected the option Automatic Entry the model shows you the automatic entry form.

11 Write the total amount of import content into the respective box.
12 Write the down payment as percentage of the total import content amount in the entry box.
13 Write the final payment as percent of total import content in the entry box.
14 Press OK. ProFinTools allocates the down and the final payment to the First and Last Disbursement Months respectively and distributes the remaining expenditure equally over the construction period. PROFINTOOLS PROJECT FINANCE then shows you the disbursement schedule for editing.
15 Press Return when you are done.

Local Content

16 Select the local content currency (click, selection should turn blue).
17 If you don't find the currency you need, exit Capital Expenditure and go to Currencies. Enter the additional currency and return to Capital Expenditure once done.
18 Select the Month of First Disbursement.
19 Select the Month of Last Disbursement.
20 Select the option Manual or Automatic Entry.
21 Press OK—Go to Local Content Schedule.

If you have selected Manual Entry of Capex Schedule PROFINTOOLS PROJECT FINANCE show you an entry field for your local Capex under the contract. As you make entries model shows you the Capex disbursements in units of the numéraire.

22 Press Return when you are done.

If you have selected the option Automatic Entry of Capex Schedule the model shows you automatic entry form.

23 Write the total amount of import content into the respective box.
24 Write the down payment as percent of total local content amount into entry box.
25 Write the final payment as percent of total local content amount in the entry box Press OK—Go to Local Content Schedule. ProFinTools allocates the down payment and the final payment to the Month of First and Month of Last Payment and distributes the remaining costs equally over the construction period. The program then shows you the capex time schedule for editing.
26 Press Return when you are done.
27 To enter both the Import Content and the Local Content Time Schedules into the case file press Enter. If you forget to press Enter the entries will be dismissed.

Checklist: Across the Board Increase or Decrease of Capex under a Contract.

You can always go to Capex on the menu bar, select the Capex category (site, buildings etc.), select the contract you want to change and choose Manual Entry and then press OK—Go to Local (or Import) Content Schedule. This works fine if you want to change entries for a specific month. However, if you want to change the value of your Capex contract across the board (e.g. plus 10 percent) there is a more convenient way that saves you a lot of typing.

1 Choose Capex on the menu bar and Capex Utility on the drop down menu.
2 Select the Capex category and click on the contract you want to change. Enter the percentage change into the Add/Substract—% field.
3 Press Change Imports or Change Local Content.

Checklist: Look at or Publish the Capex—Category

1 After steps 1–27 of Capex entry as above.
2 Exit form Capex.
3 Select Model on the general menu bar.
4 Select the Capex—category of your contract (e.g. site, buildings)
5 Search the contract you want to review. The model shows you the expenditure time schedule. If you want to export the data, press Publish.

Under Capex on the form Model, you will also find aggregate capital expenditure time schedules for the different Capex categories and breakdowns:

Import content
Local content
Customs
Capex Categories

Checklist: Delete a Capex Contract

1 Select Capex on the general menu.
2 Select the Capex category. The program loads the Capex entry form.
3 Select the contract name in contract name box.
4 Press Delete. The program deletes the contract unless it is the basis for loan financing. In that case you will get an error message.

Reinvestment

Reinvestment may be necessary to update the plant. The program allows you to reinvest in buildings and equipment PROFINTOOLS PROJECT FINANCE makes provisions for reinvestments in the income statement and the balance sheet. Reinvestment appears in the cash flow once undertaken. In case funds are insufficient for provisioning, such provisioning is undertaken once funds are available in sufficient amounts. Reinvestment is made regardless of sufficient provisioning. The model assumes that the company is able to mobilize sufficient funding through limited recourse or equity injection. The reinvestment is activated and written of as the original capital expenditure in the respective category (linear depreciation, same number of years).See chapter 12 (pages 59–62) for details on reinvestment.

Chapter 6

ProFinTools Project Finance—Loans

This chapter deals with loans available under PROFIN-TOOLS PROJECT FINANCE. The model allows you to use up to six general-purpose loans to finance whatever needs arise. Further, the program automatically generates supplier credits if capital expenditure is not fully paid at start up of operation. Finally, as limited recourse instruments a stand by loan is available for the construction and the repayment phase.

General Purpose Loans

General purpose loans allow you to inject loan funds into the company whenever you want. The program generates disbursement and repayment schedules. If the project ends before the loan is fully repaid, the balance sheet will show you the utilization of the loan the month before the end of the project Interest payments then turn to zero. The loan output system (press Model on the menu bar and then Show Me and Loans) will provide you with the loan data as if funds were completely repaid regardless to the end of project life.

PROFINTOOLS PROJECT FINANCE presents to you a two-page entry form for general-purpose loans. On Loan Page One you find general loan data and the debt service reserve accounts (DSRA.). On Loan Page TWO you find financing, as well as disbursement and repayment schedules. You should first fill in Loan Page One.

Hint: To switch between pages press the toggle button in the bottom left hand corner.

General Loan Data

Loan Name

Write the name of the loan into the Loan name box.

Loan Currency

Select the Loan Currency (click, selected currency should turn blue). If you don't find the Loan Currency you want to use, press Enter in order not to lose entries made so far, exit Loans and select Global and then Currencies on the general menu bar.

Loan transactions are made in the loan currency. If the exchange rate changes foreign exchange (forex) gains or losses result as more or less has to be repaid in units of the numéraire. PROFINTOOLS PROJECT FINANCE takes that into account.

Interest Rate

Write the interest rate per year into the Interest p.a.—% box. Example: if the interest rate is 5.5% write 5.5.

Interest Calculation Methods

Select the Interest Calculation Method (click, listbox has to turn blue). Two methods are available. With method Standard the year has 365 days. If you choose the Euro method the year has 360 days resulting in a higher de facto interest rate.

Number of Months Interest is Paid in Arrears

Select the number of month interest is paid in arrears.

Percent of Interest Capitalized During the Disbursement Period

Write the percent of interest that is to be capitalized into the % of Interest Capitalized entry box. If 50 percent is to be capitalized, write 50. The interest rate is necessary, but not sufficient to ensure that interest is capitalized. You also have to determine the time period during which interest is to be capitalized. PROFINTOOLS PROJECT FINANCE allows you to capitalize interest up to and including the First Repayment Month. Before you can select the last month interest is to be capitalized the repayment schedule has to be established. This is done on Loan Page Two. See below how to establish a repayment schedule.

Management Fee

Write the percent of the total loan that has to be paid as management fee to the bank into the Management Fee % entry box. E.g. if 1.5 percent has to paid be write 1.5.

Arrangement Fee

Write the percent of the total loan that has to be paid as arrangement fee to the bank into the Arrangement Fee—% entry box. E.g. if 0.75 percent has to be paid write 0.75.

Commitment Fee

Write the percent of total loan that has to be paid as commitment fee to the bank into the Commitment Fee—% entry box. E.g. if 0.25 percent has to be write 0.25.

Debt Service Reserve Account (DSRA)

PROFINTOOLS PROJECT FINANCE allows you to establish debt service reserve accounts (DSRAs) for general purpose loans. DSRAs are held in the loan currency. The model keeps track of the resulting currency gains and losses. Interest on outstanding amounts is paid in units of numéraire. Interest that cannot be paid when due for lack of funds is deferred, calculated and held in units of numéraire.

Interest on DSRA

Write the rate of interest payable per year on the utilization of the debt service reserve account into the Interest on DSRA—% box. If interest rate is 5.5% write 5.5.

Interest in month t is paid on the utilization of the loan in month t−1 plus half the disbursement in month t (assumption: disbursement in the middle of month t).

Base—Percent of next Debt Service

ProFinTools differentiates between the DSRA's during the disbursement and the repayment phases. Based on the next debt service the program calculates the required amount to be held as a base in the DSRA. If the full next debt service (100 percent) is to be held as base, write 100 into the Disbursement Phase DSRA: DSRA as % of next Debt Service or Repayment Phase: DSRA as % of next Debt Service—entry box. If twice the next debt service is to be held as DSRA-base, write 200.

Monthly Step Ups

If you check the box Monthly Step ups, the model calculates monthly step ups to ensure that at payment dates for interest or principal the respective amount to be paid is on the DSRA on top of the required base. E.g. if the next debt service amounts to 1000 currency units and base requirements are 100%, payments have to be made every 10 months, the model will require a base of 1000 and make 10 monthly step ups of 100.

Note: If you capitalize interest up to the first repayment, the program will not generate step ups for interest during the disbursement phase as no interest is due.

Finance—but First Establish the Repayment Schedule?

PROFINTOOLS PROJECT FINANCE gives you complete flexibility to finance any expenditure. You can either select a Capex category, an individual capex contract or even an expenditure sub category within a contract, let's say the import content. You can further decide on the share of contract payments that you want to finance (e.g. 50%). Moreover, by setting the disbursement schedule accordingly you can choose the time slice you want to finance for a contract or cost category. This can be useful if e.g. a down payment has to be made from the project company's funds in month 5 but the rest of the contract should be loan financed. Finally you can manually create your disbursement schedule.

Before you start with financing issues you should give some thought to repayment. This is necessary, as the repayment method chosen and the repayment schedule have repercussions on the disbursement schedule. E.g. you cannot disburse after the loan has been fully repaid. There are three repayment methods available. Their main features are:

Equal Installments

Disbursements can be made during the repayment phase up to the Month of Last Repayment (see Loan Page Two, bottom right corner). The interest can be capitalized up to and including the first repayment month. You can use the Sweep function to prepay the loan at payment dates in case sufficient cash flow is available.

The program allows you to harmonize payment dates for interest and principal, In case of equal installments PROFINTOOLS PROJECT FINANCE makes the first repayment date of principal also an interest payment date. If your principal is due every six months and you pay interest six months in arrears, interest and principal payment dates will coincide during the repayment phase. If the time between installments and the number of months interest is paid in arrears differ, interest and principal payment dates will not coincide.

Annuity

Disbursements can be made until the last repayment installment (the program recalculates the annuity). Interest can be capitalized up to and including the first repayment month. You cannot use the Sweep-function.

In case of an annuity you can freely choose the number of months for interest to be paid in arrears during the disbursement phase. Starting with the first repayment, however, principal and interest payment dates coincide.

The debt service (interest+principal) should be equal in case of an annuity. There are two reasons why this might not be the case:

1. You have disbursed after the start of the repayment phase. The program recalculates the annuity and the debt service following this disbursement will be higher.
2. Interest and principal payment dates coincide during the repayment of an annuity. However, up to the first repayment date it is up to you to set the interest payment schedule. If the last interest payment date is closer to the first repayment date than the interim period between repayment dates, the debt service at the first repayment date will be lower than the following (equal) debt services. This happens as part of the interest, otherwise due at the first repayment date, has already been paid.

Manual Repayment Plan

The program allows you to tailor the repayment schedule. Disbursements can be made during the repayment phase up to the last repayment month. Interest can be capitalized up to the first repayment month.

At any repayment date you should not repay more than the loan utilization at this date. The program validates your entries accordingly and ensures that this does not happen. Example: The loan total is 1000 currency units. You repay in two installments. Assume you have entered 400 as the first installment. The validation will not allow you to enter more than 600 as the second installment. Now, if you return to the first installment and enter let's say 500, you will repay 1100 currency units—that is more than the company has borrowed. To avoid this the program checks your entries as you leave the form. If you have repaid too little, the program will add the amount still to be repaid to the last installment. If you have tried to repay more than a respective month's utilization your repayment will be restricted to the then outstanding amount. Therefore, you should always check in the loan output system what the model has done to your repayment plan.

Disbursement and Repayment Methods—What can I combine?

| Allowed combinations | |
| --- | --- |
| Disbursement Method | Repayment Method |
| Automatic disbursement schedule | Equal installments |
| | Annuity |
| Manual disbursement schedule | Equal Installments |
| | Annuity |
| | Manual Repayment Plan |

While a manually created disbursement schedule can be combined with all three repayment-methods (equal installments, annuity or manual repayment plan), an automatic disbursement schedule is restricted to equal installments and annuities. Why? If the contract expenditure that you finance under an automatically created disbursement schedule changes (either because costs increases or the exchange rate changes) your loan disbursements will automatically vary with that change. This can be very handy and can save you a lot of retyping. However, if you have designed your repayments manually, the program cannot know how you want the new loan amount to be repaid.

However, you can create your manual disbursement schedule, using the automatic disbursement schedule to save a lot of typing even if you want to work with a manual repayment plan. Go through all the steps (described below) to create a loan with an automatic disbursement schedule. Once you have created the loan, call it up again, revisit Loan Page Two and select Manual in the Financing frame. If you access the disbursement schedule for editing you will find the entries that the program has created for the automatic disbursement schedule. However, there is one difference. Once you have re-entered the loan, disbursements will not change with variations in the underlying capex contract or variations in the exchange rate.

Start Repayment Phase

Regardless of the number of month interest is paid in arrears the month you enter as start of the repayment phase will be an interest payment date. In the case of an annuity all later interest payment dates will coincide with the principal payment dates. In the cases of manual repayment or repayment in equal installments, the next interest payment date will be the number of month that interest is paid in arrears after this date. If you want interest and principal payment dates to always coincide, you should set the number of months interest is paid in arrears equal to the number of months between installments.

Checklist: Create a Repayment Plan
1 Select a loan and complete entries on Loan Entry Page One.
2 Press the Disbursement and Repayment button in the left-hand bottom corner. The model shows the disbursement and repayment entry fields.
3 Go to the Repayment Frame on the right and select the repayment method (Equal Installments, Annuity or Manual Repayment Plan—click, selection should turn blue)
4 Select the Month First Repayment
5 Select the Number of Installments
6 Select the number of months between installments. The model tells you when the last repayment will take place.

Disbursement Schedule

Checklist: Create a Disbursement Schedule
7 Go to Frame Disbursement Schedule in the middle.
8 Select the Month of Loan Effectiveness
9 Select the First Disbursement Month
10 Select the Last Disbursement Month What do You want to Finance?

Checklist: Finance a Contract or go Manual
11 Select the Capex category
  Total CAPEX
  Site
    List of site contracts appears (click, selection should turn blue).
    Select either Total Site or one of the Site Contracts. If you don't find the contract you are looking for press Enter in order not to lose the entries made so far, exit form Loans and go to CAPEX.
  Buildings
    List of building contracts appears (click, selection should turn blue).
  Select either Total Buildings or one of the Buildings Contracts. If you don't find the contract you are looking for see instructions under Site above
  Equipment
    List of equipment contracts appears (click, selection should turn blue). Select either Total Equipment or one of the Equipment Contracts. If you don't find the contract you are looking for see instructions under Site above.
  Pre-Production
    List of pre-production contracts appears (click, selection should turn blue).
    Select either Total Pre-Production or one of the Pre-Production Contracts. If you don't find the contract you are looking for see instructions under Site above.
  Manual
    Button—Go to Manual Disbursement Schedule appears.
    Press the Manual button. The program will provide you with a manual entry field. Press Return when you are done with the entries.
12 If you have not chosen Manual select an expenditure category
  Total Expenditure (this includes Customs)
  Total Imports
  Total Local Content
  Imports and Customs
  Local and Customs
  Imports and Local Content
13 Write the percentage of the total expenditure or the expenditure category you want to finance.
14 Press Enter.

Manual Disbursement and Annuity or Equal Installments
12 If you have selected Manual disbursement and Annuity or Equal Installments as repayment method the Edit Disbursement Schedule button appears on Loan Page Two. The buttons Enter Disbursement Schedule and Enter are disabled Press the button Edit Disbursement Schedule. The program shows you the manual disbursements entry form. Make your disbursement entries and press Return.
13 Press the Enter Disbursement Schedule button. The program runs a while and then gives you access to the Enter button. Press this button and you are done.

Manual Disbursement and Manual Repayment
12 If you have selected Manual disbursement and Manual Repayment Plan the model will show you on Loan Page Two the button Edit Disbursement Schedule.
The buttons Enter Disbursement Schedule and Enter are disabled. Press the button Edit Disbursement Schedule. The program shows you the manual disbursements entry form. Make your disbursement entries and press Return.
13 Press the Enter Disbursement Schedule button. The program runs a while and then gives you access the button Edit Manual Repayment Schedule. Press this button. The program shows you an entry form for manual repayments. Fill out the repayments. Don't try to repay more than the loan utilization at the respective month. Press Return.
14 The Enter button is now enabled. Press Enter to write the repayment schedule into the case file. This will take some time as the program has to do a lot of calculations to validate your repayment entries.

Checklist: Look at or Publish the Loan
1 Select Model on the general menu bar.
2 Select Loans
3 Choose the loan that you want to review, then press either Publish or Show Me
4 PROFINTOOLS PROJECT FINANCE shows you the principal loan data and a graphs for utilization and repayment the Sweep and the debt service reserve accounts The Sweep Function The Sweep uses free cash flow to prepay general-purpose loans at payment dates. If you want to use the Sweep you have to press the Sweep button for each loan that should share in the Sweep. Available cash flow will be shared among the general-purpose loans participating in the Sweep according to their utilization (outstanding debt at this moment) taking into account funds accumulated for Sweep of this specific loan. This is done because payment dates do not necessarily coincide. Prepayment takes place until the repayment phase starts at interest payment dates, from then on at principal payment dates. Ignoring amounts accumulated for Sweep would thus put loans with later payment dates at an advantage.

The sweep is held in units of the numéraire until used. You find a position in the balance sheet and in the cash flow under financing. The sweep works with a time lag of at least one month. Funds cannot be used in the month they become available. This would cause a circularity.

The Sweep can assume negative values. While cash flow set aside for the Sweep is kept in numéraire until used to prepay at payment dates, you can freely choose your loan currency. If the loan currency depreciates finds set aside at earlier exchange rates might be bigger than what is needed to prepay the whole loan. The exceeding cash flow is released and will show up as a negative value in the cash flow.

The debt service reserve accounts are automatically adjusted to reflect the prepayments made with the Sweep.

The Sweep is available only with the equal installment repayment method.

Checklist: Enable the Sweep
1 Select Loans on the general and Stand by Loans, Sweep on the drop down menu.
2 Select the Month Start Sweep
3 Select the Month of End Sweep
4 Write the percentage of free cash flow to be used for the Sweep into the respective % Cash Flow box.
5 Press Enter.
6 Exit the form Standby Loans, Sweep.
7 On the general menu bar select: Loans
8 Select the loans that you want to participate in the Sweep one after the other
9 For each loan press the Disbursement and Repayment button on the lower left hand corner. PROFINTOOLS PROJECT FINANCE shows the Loan Page Two: Disbursement and Repayment page.
10 Press the Sweep button,
11 Press the Enter button Checklist: Look at or Publish the Sweep
1 Select Model on the ProFinTools general menu bar.
2 Select Loans
3 Choose the loan that you want to review and press either Publish or Show Me
4 ProFinTools shows you the principal loan data and a graph for utilization and debt service, the Sweep and graphs for the debt service reserve accounts
Hint: If you make any changes that affect the cash flow during the Sweep period the amount available for the Sweep will be affected.

Stand by Loans

In case the project-company does not generate sufficient funds to cover all its payment obligations, limited recourse can be made available through Stand by Loans from project sponsors. Repayment will only take place if there is sufficient cash flow once other payments have been made. The above general purpose loans are senior to the Stand by Loans. PROFINTOOLS PROJECT FINANCE pays interest on Stand by Loans only if sufficient funds are available. Otherwise, interest payment is deferred.

Stand by Loan Construction

Checklist: Establish a Stand by Loan during the Construction Period
1 Select Loans on the general menu bar.
2 Click on Stand by Loans, Sweep—the model loads the form.
3 Go to Stand by Construction entry field and enter Maximum Stand by amount in units of the numéraire
4 Write the interest rate for the stand by loan into the interest box.
5 Press Enter.

Stand by Loan Repayment

Checklist: Establish a Stand by Loan during the Repayment Period
1 Select Loans on the general menu bar.
2 Click on Stand by Loans, Sweep—the model loads the stand by entry form
3 Go to Stand by Loan Repayment Phase entry field and enter maximum loan amount in units of the numéraire
4 Write the interest rate per year for the Stand by Loan into Interest % box.
5 Select the Last Disbursement Month.
6 Press Enter Checklist: Look at or Publish Stand by Loans
1 Select Model on the general menu bar.
2 Go to Financial Statements and select Monthly presentation.
3 Press either Publish to export or Show Me to look at the cash flow.
4 Press Return when done.
Alternative: Select Model and then Recourse.

Checklist: Delete a Stand by Loan
1 Select Loans on the general menu bar.
2 Click on Stand by Loans, Sweep—the model loads the stand by entry form
3 Click on the Delete button of either the Stand by Loan Construction or Repayment Phase.

Chapter 7

ProFinTools Project Finance—Supplier's Credit

During the construction phase PROFINTOOLS PROJECT FINANCE activates capital expenditure in the balance sheet as Work in Progress to the tune of disbursements made under the respective Capex category. The program assumes the plant is fully operational at Start up of operations. Thus Capex is activated at the sum of the full contract values of all the Capex contracts in the Capex category. E.g. if three contractors have done construction work for the project company at Start up of operations, the PROFINTOOLS PROJECT FINANCE assumes that the work is complete and activates the total value of the three construction contracts. In case all payments under the contracts have been effected before Start up of operations, no monies remain due to the contractors and thus there is no suppliers' credit after Start up of operations.

There might be retention money or a final payment instead of a performance bond. PROFINTOOLS PROJECT FINANCE treats any outstanding payments at Start up as Suppliers Credit. This credit is reduced as contract payments are effected. No interest is envisaged. Financing costs are assumed to be part of the contract price.

Checklist: Look at or Publish a Supplier's Credit:
1 Select Model on the general menu bar.
2 Select Financial Statements
3 Choose Monthly, Quarterly, Semi-Annual or Annual (selection should turn blue).
4 Go to Balance Sheet. Press either Publish to export the data or Show Me to take a look.
5 Press Return once you have studied the credit.

Chapter 8

ProFinTools Project Finance—Equity

This chapter deals with Equity and Dividends. The model allows you to pay in capital at any moment during the project cycle. In case of insufficient cash flow, the program automatically generates Additional Shareholder Investments—equity paid in by the shareholders to prevent financial collapse. Other equity categories are retained earnings and cash flow from earlier periods earmarked for the prepayment of loans (the Sweep) but not yet used because the respective loan principal payment date(s) has not yet arrived.

Checklist: Pay in capital

1 Select Equity on the general and Paid in Capital and Dividends on the drop down menu
2 Opt alternatively either for (1) Monthly Entry of Paid in Capital for finetuning or (2) Access to Time Series Paid in Capital for a first rough shot. If you have opted for (1) select the project month you want to look at with the spinbutton on the left upper side. The program shows you the equity ratio, the required and actual balances on the debt service reserve account and the additional shareholder investment in the month under consideration.
3 Write the amount of capital (in units of numéraire) in the equity entry box or entry fields (in case of entry method (2)) and press Enter. This updates the equity ratio.

Checklist: Pay in Capital in Kind

1 Select Capex on the general menu.
2 Select the correct Capex-category and enter the capital goods you want to pay in kind as a Capex contract as described in Chapter 5.
3 Exit Capex and select on the general menu bar Equity
4 Select Paid in Capital and Dividends.
5 Select with the spinbutton on the left upper side, the months in which you have paid in capital in kind. Write for each month you pay in capital in kind, the value of the capital paid in kind in units of numéraire.

Example: assume you transfer to the project company two machines worth 1,000 and 3,000 currency units of numéraire respectively in project months 5 and 17. To do so create a Capex equipment contract with the numéraire as contract currency, disburse under the Capex equipment contract 1000 currency units of numéraire in project month 5 and 3000 units of numéraire in project month 17. You should then go on the entry form Equity to project month 5, pay in 1000 currency units of numéraire and then pay in 3000 units in project month 17.

Checklist: Look at Equity Graphs and Ratios or Publish

1 Select Model on the general menu bar.
2 Press the Equity button. The model shows you inter alias the equity ratio, capital structure, additional shareholder investments etc. Select what you want to see or publish, then press Show Me or Publish.

Dividends

Earnings can either be retained or paid out as dividends. The program allows you to select the percentage of earnings to be retained and the dividend payment frequency (monthly, quarterly, semi-annually or annually). Up to the First Dividend Payment Month (default is project month one) no funds are paid into the Dividends Payable account. The model only pays funds into the account if at the time of allocation the
1. balance in the debt service reserve account is at the required level;
2. the stand-by loans are fully repaid and interest thereon has been paid
3. the deferral credits are fully repaid and no interest thereon is outstanding.

Funds in the account Dividends Payable are disbursed at the next dividend due date regardless of a possible worsening of the cash flow since the allocation.

Minimize Additional Shareholder Investment

You can sustain a negative cash flow as long as you have money in the cash account. To prevent red ink in the cash account the model undertakes additional shareholder investments if necessary. This can happen even with a perfectly profitable company as it is quite possible that the earnings exceed the cash flow in a given month. If you disburse more than you have as cash in hand the program will inject capital into the company. If you want to prevent such an outcome, check the box Minimize Additional Shareholder Investment. This restricts allocations to the Dividends Payable account to the tune of available cash flow.

Checklist: Pay Dividends

1 Select Equity on the general menu.
2 Select Paid in Capital and Dividends
3 Go to the frame Dividends and select dividend frequency (monthly, quarterly, semi-annually, annually) in the payments listbox (click, selection should turn blue).
4 Write the percentage of earnings you want to pay out. E.g. if you want to pay 50 percent as dividends write 50 in the % Dividend box.
5 Select the First Dividend Payment Month.
6 Press Enter.

Chapter 9

ProFinTools Project Finance—Taxes and Subsidies

Taxes

This chapter deals with Taxes and Subsidies. PROFINTOOLS PROJECT FINANCE allows you to pay corporate and property taxes. The program ignores Value Added Tax. However, indirect sales taxes can be modeled in the context of sales contracts.

Corporate Taxes

Often the corporate tax rate on retained earnings differs from the tax rate on dividends. The program allows you to enter different tax rates for the two tax bases. Tax rates might also differ over time as the Government might use the tax code to promote economic activity. This can be done e.g. through tax holidays. Finally, the tax code usually allows to carry forward losses. PROFINTOOLS PROJECT FINANCE allows you to address all these issues. It further allows you to manually edit the tax rate over time.

Checklist: Pay Corporate Taxes

1 Select Equity on the general menu bar.
2 Click on Taxes and Subsidies. Go to the frame Income Tax
3 Select the option Automatic Tax Rate Entry
4 If the authorities provide a tax holiday, select the project month up to which the holiday is granted. Write holiday tax rates for retained earnings and dividends in to %—Tax Rate retained Income during Holiday and %—Tax Rate disbursed Income during Holiday entry boxes. E.g. if the tax rate is 25 percent write 25. If during the holiday no taxes have to be paid write 0.
5 Write the regular tax rates into the regular % Tax Rate retained Income and % Tax Rate disbursed Income entry boxes.

6 Select the tax payment frequency or leave the default value: Monthly, quarterly, semi-annually or Annually (click, selection should turn blue).
7 Select with the spinbutton the number of years losses are carried forward or leave the default value.
8 Select the tax payment frequency (monthly, quarterly, semi-annually, yearly—click, selection should turn blue).
9 Press Enter.

Checklist: Edit Manually Corporate Tax Rates
1 Select option Manual Rate Entry and press Enter
2 The model shows you the automatically generated entries. Once done with editing, press Return and then Enter Checklist: Look at or Publish Corporate Taxes
1 Select Model on the general menu. Press Taxes
2 Select Income Tax and press Show Me or Publish.

Property Tax
Tax codes differ widely and change often. That makes generalization difficult. PROFINTOOLS PROJECT FINANCE uses fixed assets as the tax base for the property tax Checklist: Pay Property Tax
1 Select Equity on the general menu. Click on Taxes and Subsidies
2 Go to the frame Property Tax and select the option Automatic Tax Rate Entry
3 If the authorities provide a tax holiday select the project month up to which the holiday is granted. Write the holiday tax rate in to the %—Tax Rate during Holiday entry box. E.g. if the tax rate is 25 percent write 25. If during the holiday no taxes have to be paid write 0.
4 Write the regular tax rate into the regular tax rate box.
5 Select the tax payment frequency (Monthly, quarterly, semi-annually or Annually—click, selection should turn blue) or leave the default value. Press Enter Checklist: Edit Manually the Property Tax Rates
1 Select Manual Rate Entry and press Enter
2 PROFINTOOLS PROJECT FINANCE shows you the automatically generated entries.
Once done with editing, press Return and then Enter Checklist: Look at or Publish Property Taxes
1 Select Model on the general menu. Press Taxes
2 Select Property Tax and press Show Me or Publish.

Subsides
You can inject production subsidies into the company manually or automatically:

Checklist: Enter Subsidies
1 Select Equity on the general menu.
2 Click on Taxes and Subsidies and go to the frame Subsidies
3 Select the option Automatic Subsidies (or Manual Entry in which case you have to edit the subsidies schedule)
4 Select the first and last subsidy month.
5 Write the annual subsidy into the annual subsidy box and press Enter.

Chapter 10

ProFinTools Project Finance—Variable Costs

Variable Costs
This chapter focuses on variable costs like direct material costs or direct labor. Whenever you have an input output coefficient, you should use variable costs. If your direct costs are fixed, enter such costs as fixed operating costs (see chapter 11).

PROFINTOOLS PROJECT FINANCE foresees two different pricing mechanisms: (1) input costs determined by the prices in the input market and (2) prices determined by sales receipts. The latter allows you to pass through some of the cash flow risks to your suppliers. In case you use the second pricing mechanism you can also make use of a deferral (loan) mechanism.

Variable Costs—Input Costs Determined by Prices in the Input Market
You can enter up to 14 inputs. Entries fall into two categories: technical and financial. Before you start with either of them, make sure you have filled in the form Name, Schedule and Technical Specs (general menu bar Global). You cannot enter any variable costs if you have not entered products first.

Select Product and Variable Cost Contract

Product
First select the product for which the input is needed. The model loads a list of the variable input needed for the production of this product into the variable cost box.

Variable Cost
Write/select the name of the cost or cost contract. This loads the data corresponding to these costs into the entry form.

Technical Entries

Unit of Measurement
Inputs are measured in their respective measurement units e.g. liters, gallons, tons.

Input Output Coefficient
The program works with a linear production function that you define by telling the program how many units of the respective input factor are needed to produce one unit of output.

Minimum Stock
Write the number of units of the input factor held in stock into the Minimum Stock—No. of Units box. This number is needed to build inventories and working capital needs. PROFINTOOLS PROJECT FINANCE sets up automatically the minimum stock before the start up of operations.

Days from Order to Delivery
Write the number of days from order to delivery into the Days from Order to Delivery box. You can enter any positive real number between 0 and 91.24. PROFINTOOLS PROJECT FINANCE needs this information to order the input on time.

Financial Entries

Variable Cost Currency
Select the contract currency in the listbox. The selected currency should turn blue. If you don't find the currency, press Enter to save entries made so far, exit Variable Costs, on the general menu bar select Currencies. Once you have entered the currency, return to the form Variable Costs.

Price/Unit of Input Factor (in Selected Currency)
Write the Price per Unit of Input Factor into input factor cost box.

Input Unit Price Trend
If the unit price of the input factor increases, enter a positive number. E.g. if the price per unit rises 10% per year, enter 10 in the Input Unit Price Trend—% p.a. box.

For price decreases, enter a negative number. Eg. if the price per unit falls by 10% per year, enter −10 (minus 10).

First Month of Trend

Select the First Month of Trend. PROFINTOOLS PROJECT FINANCE allows you to start the trend at any project month lower than month 254. The default setting is 1 month.

Last Month of Trend

Select the Last Month of Trend. The program allows you to end the trend at any project month lower than month 254. The default setting is month two.

Percent of Price Swings—Volatility

Enter the percentage you want your input factor price to go up and down around the long-run price trend. This entry determines the amplitude of the price swings. E.g. if you want you're the price of your input factor to go up by and down by 20% during a price cycle enter 20.

Month—Length of Cycle

A sinus curve is used to simulate input price volatility. You can influence both the length of a price cycle and the amplitude of the price swings around the long-term price. The default value is project month 60.

Cycle Status at Project Start

Select one of the following options for your input factor price at project start (click, selection should turn blue):
  Half-way up. (default)
  Top Price.
  Half-way down.
  Bottom Price.

Percent Down Payment

Write the percentage of the down payment at time of order into the Down Payment—% entry box. E.g. if the down payment is 15% write 15. This influences working capital needs.

Average Number of Days from Creation of Payment Obligation to Payment

Write the number of days from the creation of the payment obligation to the actual payment into the Average Days before Payment 0<Days<91 box. This can be any positive real number between 0 and 91.24. The model needs this information to calculate working capital needs.

Checklist: Enter an Input Factor
1 Select Variable Costs on the general menu bar. Click on Variable Costs determined by prices on Input Market. The program loads the form.
2 Select the product.
3 Write/select the name of the input factor into the Variable Cost box
4 Write the unit of measurement
5 Write the input output coefficient (number of units of input factor to produce one unit of output) into the Input Output Coefficient box
6 Write the number of units of the input factor to be held as iron stock into respective box or leave the default value
7 Write the delivery time into the respective box or accept the default value zero.
8 Select the contract currency (click, selection should turn blue).
9 Write Price/Unit of Input Factor in the selected currency into the respective box Optional—in case you want to establish a price trend or do sensitivity testing 10 Write price trend per annum (p.a.) into the Input Unit Price Trend—% p.a. box.
11 Select the First Month of Trend and the Last Month of Trend.
12 Write the price volatility into the %—Price Swings box.
13 Select the cycle length.
14 Select the cycle status at project start—price half way up, top Price, half way down, bottom Price (click, selection should turn blue).
15 Press Enter Checklist: Look at or Publish Variable Costs
1 Perform steps 1–15 above.
2 Exit Variable Costs
3 Select Model on the general menu bar.
4 Press the button Cost of Goods, select the product and then the input cost factor you want to study or publish. The model shows you the input cost and an associated graph.

Checklist: Delete Variable Costs
1 Select product and then the variable cost input factor.
2 Press Delete.

Variable Costs—Prices Determined by Sales Receipts

You can enter two inputs of this type for each product. Entries fall in two categories: technical and financial. Before you start with either of them, select the product and then write the name of the input factor contract in the Contract Name Box. This resets the entry form.

Technical Entries (skip this section if you have read the description of Technical Entries under Variable Costs— Input Prices determined by Input Market, skip this section and go directly to Financial entries).

Unit of Measurement

Inputs are measured in their respective units of measurement e.g. liters, gallons, tons.

Input Output Coefficient

The program works with a linear production function that you define by telling the program how many units of the respective input factor are needed to produce one unit of output.

Minimum Stock

Write the number of units of the input factor held in stock into the Minimum Stock box. PROFINTOOLS PROJECT FINANCE needs to know this figure in order to calculate working capital needs. The model buys the iron reserve before start up of operations.

Days from Order to Delivery

Write the number of days it takes to receive the input factor from the time of order to receipt in stock into the Days from Order to Delivery box. This can be any positive real number between 0 and 91.24. The program needs this information to order the input factor on time.

Financial Entries

Base for Input Factor Pricing

You have two choices: (1) You can select an offtake (sales)—contract that will serve as a base for the input factor or (2) you can manually enter a market price scenario (e.g. if you have a market study with price projections) that serves as your price base.

Case 1—Off-Take Contract as Pricing Base

Select the off-take contract in the listbox (selection should turn blue). The Contract Currency box is disabled as you choose together with the off-take contract (that serves as a input price bases) the off-take contract's currency. If you don't find the off-take contract that you are looking for, press Enter to save your entries, unload the form and enter your off-take contract according to the procedure described in chapter 13. Return to the Variable Costs form and select first the variable cost contract and then the off-take Contract that should serve as a price base.

Case 2—Manual Entry

If you have a market study with long-term price projections select Manual Entry. Select the market price currency. Press Edit Market Prices. PROFINTOOLS PROJECT FINANCE shows you an entry field that allows you to enter for each project month an output market price. Press Return once you have completed your entries.

Alternatively, to minimize typing, you can first choose an off-take contract, enter it as a price base and in a second go edit it. This should be done, if an off-take contract is available, whose monthly prices bear some resemblance with your intentions.

Input Price as Percent of (Off-Take—Contract) Sales Price

Write the Cost/Unit as % of Sales Price in the respective box. E.g. if the output sales price is 100 currency units per unit of output and you want the price of the input/unit be 50% of that price write 50 into the entry box. The model prices the input factor always at 50% of the sales price of your output—as long as the price is higher than a possibly stipulated minimum price.

Minimum Price/Unit Output

Long term supply contracts often stipulate a minimum price. This minimum price usually increases through the project lifetime. Write this minimum price into the Minimum Price/Unit Box. Leave the default value 0 if no Minimum Price is agreed upon.

Minimum Price Increase p.a.

Write the minimum price increase per year into the %—Minimum Price Increase p.a. entry box. E.g. if you want the minimum price to increase by 4.5% p.a., write 4.5. The yearly price increase is converted into monthly price increases.

First and Last Month of Minimum Price Increase

You can freely select the first and last month of the minimum price increase.

Percent Down Payment

Write the percentage of the down payment at time of order into the Down Payment—% entry box. E.g. if the down payment is 15% write 15. This influences your working capital needs.

Average Days from Creation of Payment Obligation to Payment

Write the average number of days from the creation of the payment obligation for your input to the actual payment into the Average Days before Payment 0<Days<91 box. PROFINTOOLS PROJECT FINANCE needs this information to calculate working capital needs.

If you do not want to establish a payment credit mechanism, you are done. Press Enter.

Deferral of Payments Due to Supplier—Payment Credit Mechanism

PROFINTOOLS PROJECT FINANCE allows you to shift part of the cash flow risks to the supplier. This is done through a deferral—credit mechanism. The company pays the full contract price but receives a loan from the off-taker equal to the deferred amount. The deferral credit mechanism is triggered when the following conditions are met:

The company cannot fulfill its payment obligations.
The input price is equal or higher than a negotiated trigger price.
The agreed deferral—credit is not yet fully utilized.

Maximum Deferral—Credit Amount

Write the Maximum Amount to be credited by the supplier into the Max Amount deferred box. Payments are credited in the contract currency. Repayment takes place only if sufficient funds are available. PROFINTOOLS PROJECT FINANCE takes care of foreign exchange gains or losses.

Trigger Price

Write the sales price/unit of output that triggers the deferral—credit mechanism into the Trigger Price Deferral box. Deferral only happens in case of insufficient cash flow.

Interest Rate Per Year on Deferred Amount

Write interest rate per year into the interest rate box. E.g: if interest rate is 5.5% write 5.5. Interest on arrears is paid monthly.

Checklist: Enter an Input Factor

1 Select Variable Costs on the general menu
2 Click on Variable Costs determined by Commodity Markets The model loads the entry form.
3 Select the product. If you have not yet entered your product, go to Global on the general menu bar and then to Name, Schedule and Technical Specs and make the necessary entries.
4 Write the name of the input factor into the Variable Cost box
5 Write the unit of measurement
6 Write the input output coefficient (number of units of input factor necessary to produce one unit of output) into the Input Output Coefficient box
7 Write the number of units of the input factor to be held as iron stock into the respective box or leave the default value
8 Write the delivery time into the respective box or accept the default value
9 Select the off-take contract that will serve as a price base (click, selection should turn blue) or select manual entry. In case of manual entry select the contract currency.
10 Write the price of the input factor as percentage of the sales price per unit into the Cost/Unit as % of Sales Price entry Box.
11 Write the Minimum Price/Unit into the respective Box.
12 Write the increase per year of the minimum price into the respective box.

Press Enter or continue with optional entries:

Checklist: Optional—If You want to Establish a Price Trend or do Sensitivity Testing 13 Write the maximum deferral—credit amount into the respective box (contract currency)
14 Write the Trigger Price Deferral into the entry box
15 Press Enter—you are done.

Checklist: Look at or Publish Variable Costs

1 Perform Steps 1–15 above.
2 Exit Variable Costs
3 Go to Model and then to Show Me.
4 Select Costs of Goods
5 Select the product and then the input you want to review or publish. Press Publish or Show Me. The model shows you the input costs and associated graphs.

Checklist: Delete Variable Costs
1 Select the product and then the variable cost input factor.
2 Press Delete.

Chapter 11

ProFinTools Project Finance—Fixed Costs

Fixed Operating Costs, Maintenance and Overheads

This chapter deals with fixed operating costs. You can enter up to 14 fixed operating cost items for each product. The chapter further deals with maintenance for site, construction and equipment and overheads like insurance costs, administrative costs and general factory overheads that cannot be directly allocated to a product.

Fixed Operating Costs

You can use this category for example for direct labor if the number of workers is fixed regardless of the output (if you have a labor coefficient, you should enter such costs as variable costs). Other examples are insurance of equipment used exclusively for the production of a specific product or fixed maintenance costs directly related to a product To get started go to Fixed Costs on the general menu bar. Select General and Administrative Costs, Fixed Operating Costs on the drop down menu. The model loads an entry form.

Start by selecting the product. Then enter the name of the fixed operating cost item into the Enter/Select name of Fixed Operating Cost item box. This resets the entry form.

Cost Currency

Select the cost currency (click, selection should turn blue). If you don't find the currency, press Enter to save your entries and exit the form. On the general menu select Global and on the drop down menu Currencies. Once you have entered the currency, return to the form General & Administrative Costs, Fixed Operating Costs.

Cost Per Year

Write the fixed operating costs per year at prices current at project start into the entry box. The model divides your entry by twelve to obtain the monthly costs at project start.

Cost Increase Per Year

For fixed operating cost increases enter a positive number. E.g. if the cost per year rises 10% per year, enter 10 in the Cost Increase p.a.—% box. The model breaks down the 10% increase into monthly increases and make cost adjustments over the year. E.g. if your cost are 1000 currency units per year and you have a price trend of plus 10% per year, the model divides the yearly cost by 12 and inflates the monthly cost by a Monthly Inflation factor. If there is no cost increase, leave the default value 0.

For cost decreases enter a negative number. E.g. if the cost per year fall by 10% per year, enter −10 (minus 10).

First and Last Month Cost Increase

Select the first and last months of cost increase. You can start and end cost increases anytime.

Checklist: Enter a Fixed Operating Cost Item
1. On the general menu select Fixed Costs. On the drop down menu choose General & Administrative Costs, Fixed Operating Costs.
2. Select the product and enter the name of the fixed operating cost item into the Enter/Select name of Fixed Operating Cost item box (frame on the right).
3. Select the cost currency (click, selection should turn blue).
4. Write the cost p.a. at prices current at project start into the Cost p.a. at Prices Current at Project Start box.
5. Write the cost increase, if any, in the Cost Increase p.a.—% box.
6. Select the first and last cost increase month.

Checklist: Delete a Fixed Operating Cost Item
1 On the general menu select Fixed Costs. On the drop down menu choose General & Administrative Costs, Fixed Operating Costs.
2 Select the product.
3 Select the name of the direct cost in the Enter/Select name of Fixed Operating Cost item box.
4 Press Delete.

Checklist: Look at a Fixed Operating Cost Item
1. On the general menu select Model. On the drop down menu select Show Me. The model loads the form.
2. Press the button Cost of Goods.
3. Select the product and then the fixed operating cost item. Press Show Me.

Maintenance

If you can directly allocate maintenance costs, enter such costs as fixed operating costs (see above). If the maintenance costs are not direct by nature you have a choice: You can enter general maintenance costs for site, construction or equipment (1) either as percent of the capital expenditure under the respective capital expenditure-category during the construction period or (2) you can enter an absolute figure.

To get started go to Fixed Costs on the general menu bar. Select Depreciation and Maintenance on the drop down menu. Go to the right frame on the form that appears.

Maintenance Category

Select the maintenance category (Equipment, Buildings, Site).

Entry Method: % of Capital Expenditure (Capex) or Manual

Select the entry method by pressing on the option button % of Capex or Manual. If you choose to enter the maintenance cost as percentage of the capital expenditure after pressing OK an entry form appears that allows you to enter a percentage figure. If you select Manual, you'll be allowed to enter a yearly maintenance cost figure. Whatever method you choose, maintenance will be calculated in units of numéraire.

If you enter maintenance as a percentage of capital expenditure any changes in your capital expenditure will automatically be reflected in the maintenance costs. This is not the case if you enter an absolute figure.

Maintenance Cost Increase

You can establish a maintenance cost trend. For maintenance cost increases enter a positive number. E.g. if the cost per year rises 10% per year, enter 10 in the Increase p.a. box. PROFINTOOLS PROJECT FINANCE breaks down the 10% increase into monthly increases and make cost adjustments over the year. E.g. if your cost are 1000 currency units per year and you have a price trend of plus 10% per year, the model divides the yearly cost by 12 and inflates the monthly cost by a monthly cost inflation factor. If there is no cost increase, leave the default value 0.

For cost decreases enter a negative number. E.g. if the cost per year fall by 10% per year, enter −10 (minus 10).

First and Last Month of Maintenance Cost Increase (or Decrease)

Select the first and last months of the cost increase or decrease. You can start and end cost increases anytime.

Example: Assume your capital expenditure on equipment is 1,200 units of numéraire. You want to spend yearly ten percent of this amount for maintenance. However, towards the end of the project life you reinvest less and as a consequence, incur higher maintenance costs. To model this select as first month of cost increase the month you feel maintenance cost might go up the first time.

Checklist: Enter Maintenance
1. On the general menu bar select Fixed Costs. On the drop down menu choose Depreciation and Maintenance.
2. Select the maintenance category and the entry type (as percentage of Capex or manual). Press OK.
3. Write % of Maintenance Costs as % of Capex or as a yearly amount in the respective box.
4. Write Increase—% p.a.—if any—into the respective box.
5. Select the first and last maintenance cost increase month.
6. Press Enter.

Checklist: Delete Maintenance
1. On the general menu bar select Fixed Costs. On the drop down menu choose Depreciation and Maintenance.
2. Select the maintenance category and press OK.
3. Press first Delete and then Cancel to close the entry field.

Checklist: Look at Maintenance Costs
1. On the general menu bar select Model. On the drop down menu choose Show Me.
2. Press button Model. You find the maintenance for site, construction and equipment in the cash flow in rows 52–54.

Overheads
The model knows three overhead categories: Administrative overheads, factory overheads and insurance.

To get started go to Fixed Costs on the general menu bar. Select General and Administrative Costs, Fixed Operating Costs on the drop down menu.

Administrative Overheads, Factory Overheads and Insurance
Entries for the three overhead categories (administrative, factory and insurance) follow the same pattern:

Cost Category
Select the overhead type you want to enter. The cost category should turn blue.

Currency
Choose the currency. The currency should turn blue.

Overheads Per Year
Write the cost per year into the cost p.a. at Prices current at Project Start entry box. The model divides the yearly cost by twelve to get the monthly overheads. Overheads are taken into account from start up of operations onwards.

Cost Increase p.a.
You can establish a overheads cost trend. For overhead cost increases enter a positive number. E.g. if the cost per year rises 10% per year, enter 10 in the Cost Increase p.a. box. PROFINTOOLS PROJECT FINANCE breaks down the 10% increase into monthly increases and make cost adjustments over the year. E.g. if your cost are 1000 currency units per year and you have a price trend of plus 10% per year, the model will divide the yearly cost by 12 and inflate the monthly cost by a monthly cost inflation factor. If there is no cost increase, leave the default value 0.

First and Last Month Cost Increase
Select the first and last months of the cost increase or decrease You can start and end cost increases anytime.

Checklist: Enter Overheads
1. On the general menu bar select Fixed Costs. On the drop down menu choose General and Administrative Costs, Fixed Operating Costs
2. Select the overhead category (Administrative Costs, Factory Overheads, Insurance—click, selection should turn blue)
3. Select the currency (click, selection should turn blue).
4. Enter the overheads per year into the Cost p.a. at Prices Current at Project Start box.
5. Enter the yearly cost increase, if any, into the Cost Increase p.a.—% box.
6. Select the first and last cost increase month.
7. Press Enter.

Checklist: Delete Overheads
1. On the general menu bar select Fixed Costs. On the drop down menu choose General and Administrative Costs, Fixed Operating Costs
2. Select the cost category (Administrative Costs, Factory Overheads, Insurance).
3. Press Delete.

Checklist: Look at Overheads
1. On the general menu bar select Model. On the drop down menu choose Show Me.
2. Press the button Model. You find the maintenance for site, construction and equipment in the cash flow in rows 55–57.

Chapter 12

ProFinTools Project Finance—Amortization and Depreciation—Reinvestment

This chapter deals with amortization, depreciation and reinvestment. The program uses the linear depreciation method to depreciate capital expenditure for buildings and equipment costs. Pre-production costs and capitalized interest during construction are also linearly amortized. There is no depreciation for capital expenditure on site.

Reinvestment is possible for buildings and equipment. Reinvestment for buildings and equipment is depreciated linearly over the same number of years that applies to depreciation of Capex made during the construction period. If you have told PROFINTOOLS PROJECT FINANCE to depreciate Capex for equipment over 10 years, and five years after the start up of operations you reinvest, the reinvestment will be fully depreciated 15 years after start up of operations.

To get started go to Fixed Costs on the general menu bar. Select Depreciation and Maintenance on the drop down menu. Go to the right frame on the form that appears.

Capex Category
Select the Capex category (Buildings, Equipment, Pre-Production Expenses, Interest during construction)

Reinvestment or No Reinvestment
If you want to reinvest (only with buildings and equipment) press the option button Reinvestment.

Number of Years for Linear Depreciation
The OK button gives you access to the entry field for the number of years you want to use for depreciation or amortization.

Reinvestment—% of Capex
If you want to update your plant write the percentage of the original capital expenditure (during the construction period) that you want to reinvest. If your equipment has cost you 1,000,000 units of numéraire, and you want to reinvest 5% or 50,000 write 5 into the entry box.

Year of First and Last Reinvestment
Select the first and last year of reinvestment. Towards the end of project life it might not worthwhile to reinvest.

Months Between Reinvestments
You can select the frequency of reinvestment by telling the model the number of months between reinvestments.

Checklist: Enter Depreciation and Reinvestment
1 Select Fixed Costs on the general menu bar. Select Depreciation and Maintenance on the drop down menu.
2 Select the Capex category that you want to depreciate and opt for reinvestment if intended
3 Press OK. The model shows you a spinbutton that allows you to set the number of years for linear depreciation or amortization. Select the number of years
4 Press Enter. If you don't reinvest, you are done. Else:
5 Walk through the reinvestment pop up form. Write reinvestment as percent of Capex into the respective box.
6 Select the first and last reinvestment year after start up of operations (towards the end of project life it might be uneconomical to update the plant).
7 Select the number of months between reinvestments and press Enter. The program calculates the reinvestment schedule.

Checklist: Delete Depreciation and Reinvestment
1 Select Fixed Costs on the general menu and Depreciation and Maintenance on the drop down menu. Select the Capex category that you want to depreciate and opt for No Reinvestment.
2 Press OK. You see a spinbutton that allows you to set the number of years for linear depreciation or amortization. Select the number of years. Press Enter.

Checklist: Look at Depreciation and Reinvestment
1 Select Model on the general menu and Show Me on the drop down menu.
2 Press button Model.
3 Depreciation and amortization are in rows 280–287 of the income statement. The Capex balance sheet values are in rows 348–360. Press Return when done.

Expansion of Capacity
Walk through steps 1 to 7 above (to avoid repeat expansions, select the number of months between reinvestments accordingly). Then go to Global, choose Name, Schedule and Technical Specs on the drop down menu. Select the product and edit manually the output increase (example: set the Maximum Capacity to 1,000,000 units p.a. and Actual Capacity Useage to 90%. Production is 900.000 units p.a. In month 150 you expand. Edit manually the capacity use from that month on (see chapter 4).

Chapter 13

ProFinTools Project Finance—Sales—Commodity Market Pricing
PROFINTOOLS PROJECT FINANCE provides you with three types of sales contracts: (1) off-take agreements (2) direct sales without intermediary based on commodity prices determined in the output market. We will call this type of price mechanism commodity market pricing. (3) Mark up or cost plus contracts, which determine output prices as a function of the firm's production cost. This chapter deals with contract types (1) and (2)—direct sales or sales through up to three off-take agreements for each product. PROFINTOOLS PROJECT FINANCE provides you with the tools to model common sales expenses on the side of the off-taker and/or the project-company. It allows you to establish price trends and to undertake sensitivity testing. You can use a deferral mechanism for fees to be paid to the off-taker. All this is optional. The chapter starts with a review of the inventory cycle.

Inventory Cycle
Before you enter sales contracts you should go to Sales on the general menu bar and select Inventory Cycle on the drop down menu.
Select the product and enter the inventory cycle (average number of days finished goods remain in stock). The default value is zero. Goods can remain in stock for up to 91 days before they are sold. PROFINTOOLS PROJECT FINANCE needs this information in order to calculate the balance sheet position finished goods and working capital needs.

Case 1—Inventory cycle=0 days
Your balance sheet position for finished goods is zero, regardless whether you sell your output or keep it.

Case 2—Inventory cycle=91 days
Your balance sheet position for finished goods shows the maximum value for goods in stock—the value of the production of 91 days at production costs. The value of any output unsold after 91 days is set to zero.

Checklist: Enter Inventory Cycle
1 Select Sales on the general menu and Inventory Cycle on the drop down menu.
2 Select the product.
3 Write the inventory cycle into the entry Box (must be zero or any positive number smaller than 91.2) and press Enter Commodity Market Pricing
To get started go to Sales on the general menu bar and select Commodity Market Pricing on the drop down menu. The model loads a two-page entry form. On Sales Page One you find the general off-take contract data and an entry field for sales expenses of the project company. On Sales Page Two the sales expenses incurred by the off-taker are listed. You also find on Sales Page Two handling and flat fees, indirect taxes and duties and a deferral mechanism for fees to be paid by the off-taker. You can switch between sales pages with the toggle button in the bottom left hand corner.
Start your entries on Sales Page One.

Product
First select the product. This resets the entry form. If you have not yet entered a product (Global and the Name, Schedule and Technical Specs) you cannot work with the sales form as there is nothing to sell.

Contract
Select/write the off-take contract into the contract entry box. You can enter up to three off-take contracts per product. PROFINTOOLS PROJECT FINANCE assumes that the off-take contract runs over the whole project lifetime.

Direct Sales—No Off-taker (Sales Contract Type 2)
Fill out the price entries and the project company's sales expenses, accept all the default values for the off-taker's sales expenses (set to zero) and ignore the deferral mechanism.

Contract Currency
Select the contract currency (click, selection should turn blue). If you don't find the currency you want to use, press Enter in order not to lose entries made so far. Exit Sales and select Global on the general and then Currencies on the drop down menu.

Transactions regarding the off-take contract proper (not sales expenses) are always made in the contract currency.

Share of Contract in Total Sales

Write the share of the contract in the sales of total output of the product into the Share of Contract in Total Sales—% box. E.g. write 15.5 if the share is 15.5%. You can allocate all sales to one contract. You can also choose to sell less than 100% of output. However, output not sold is discarded. The model stocks finished goods valued at production costs only for up to three month according to your inventory cycle. It is always possible to reduce production, rather than selling less than 100% of the output—and incurring the production costs. If you want to reduce sales in absolute unit numbers, select Global on the general menu, click on Name, Schedule and Technical Specs., then adjust manually the capacity use during the project month(s) under consideration.

Hint: You can combine commodity pricing with mark up pricing. E.g. in case of a power plant you might go for long term mark up contracts for base load and sell a certain percentage of production on the spot market.

Average Number of Days Before Receipt of Payment

Write the average number of days from the date of sale to the receipt of payment into the Avg. No. of Days before Receipt of Payment box. This can be any positive real number between 0 and 91.24. PROFINTOOLS PROJECT FINANCE needs this information to calculate working capital needs.

Automatic or Manual Price

PROFINTOOLS PROJECT FINANCE offers you two methods to enter the sales prices: Automatic or manual. You might find it convenient to generate sales prices automatically over the whole project lifetime and then edit them as you feel appropriate. The manual entry allows you to enter data from a market study.

Let's look at the automatic entry first:

Automatic Sales Price Entry

Select automatic price.

Price Per Unit

Write the sales price into the Price per Unit box. The price should include the indirect taxes except the value added tax (VAT). If you don't want the price to vary over the project lifetime you are done. You can leave the Off-take Contract Data frame and make entries on the remainder of the form.

Sales Price Trend

For price increases enter a positive number. E.g. if the price per unit of sold output rises 10% per year, enter 10 in the Sales Price Trend box.

For price decreases enter a negative number. Eg. should the price per unit fall by 10% per year, enter −10 (minus 10).

First and Last Trend Month

Select the first and last price increase month. PROFINTOOLS PROJECT FINANCE allows you to start or end the trend at any project month.

Manual Sales Price Entry

If you select the manual price option the button Edit Sales Price will appear. Press this button and the model will give you access to an entry sheet. If you have generated earlier automatically a sales price, you will find these entries ready to be edited. Press Return once you are done.

Sales Price Fluctuations

The model allows you to generated fluctuations around the long-term price trend. You can generate such fluctuations regardless whether you have generated the sales prices automatically or manually.

Cycle Length

The model uses a sine function to simulate sales price volatility. You can influence both the length of a price cycle and the amplitude of the price swings around the long-term price.

Percent of Price Swings—Volatility

Enter the percentage you want your sales price to go up and down around the long-term trend. This entry determines the amplitude of the price swings. E.g. if you want the sales price to go up by and down by 20% during a price cycle enter 20.

Cycle Status

Select one of the following options for the sales price (click, selection should turn blue):

Half way up (default)
Top Price
Half way down
Bottom Price

If you sell directly to the market and if you have no sales expenses, press Enter and you are done. Otherwise continue:

Difference Between Sales Expenses of the Project Company and the Off-Taker

The program allows you to enter sales expenses both for the project-company and the off-taker. Entry methods are identical. There is however an important difference in the way sales expenses are treated. Whereas sales expenses incurred by the off-taker are deducted from the payments made to the project-company and thus reduce sales receipts, the sales expenses of the project-company are stated as such in the cash flow and income statement.

Sales Expenses Project Company

Transport Cost Currency

Select the transport cost currency (click, selection should turn blue). If you don't find the currency you want to use, press Enter in order not to lose your entries, exit Sales and select Global on the general menu bar and then Currencies on the drop down menu.

Transport Cost Per Unit of Output

Write the transport cost per unit into the Transport Cost/Unit entry box. If the project company incurs no transport costs accept the default zero.

Transport Cost Increase Per Year

For transport cost increases enter positive number. E.g. if the transport cost/sold unit of output rises 10% per year, enter 10 in the % Cost Increase p.a. box. The yearly increase is converted into monthly increases.

For cost decreases enter negative number. Eg. if the transport cost/sold unit falls by 10% per year, enter −10 (minus 10).

First and Last Month of Transport Cost Increase

You can start or end your transport cost trend at any month during the project life.

Insurance Cost Currency

Select the insurance cost currency (click, selection should turn blue). The Currency Insurance box should turn blue. If you don't find the currency you want to use, press Enter in order not to lose entries made so far, Exit Sales and select Global on the general menu bar and then Currencies on the drop down menu.

Insurance Cost/Unit of Output

Write the insurance cost per unit of output into the Insurance Cost/Unit box. Accept the default value zero if the project company incurs no insurance costs directly related to the sales.

Insurance Cost Increase Per Year

For insurance cost increases enter a positive number. E.g. if the insurance cost per unit of sold output rises 10% per year, enter 10 in the insurance % Cost Increase p.a. box.

For insurance cost decreases enter a negative number. E.g. if the insurance cost per sold unit falls by 10% per year, enter −10 (minus 10).

First and Last Month of Insurance Cost Increase

You can start or end your insurance cost trend at any month during the project life.

Sales Expenses Off-Taker

You find the sales expenses of the off-taker on Sales Page Two on the upper left. Entries are identical to the sales expense entries for the project-company. If you sell directly to the market you can ignore this item and accept the default values (zero).

Indirect Taxes and Duties (Sales Page Two)

Indirect Tax

Write the percent of sales tax that has to be paid into the Indirect Tax—% box. If the tax is 10.5% write 10.5. Accept the default value zero if the market price per unit that you have entered earlier is net of taxes.

Import Duty

Write the percent of duty that has to be paid. If customs is 5.5% write 5.5 into the Duty entry box. Accept the default value zero if the market price per unit that you have entered is net of customs. Duty is paid on the sales price minus indirect taxes minus handling fee.

Handling Fee and Flat Fee—Off-Taker

Usually the off-taker receives a handling fee—a percentage of the sales receipts—for his services. Sometimes a flat fee is negotiated. PROFINTOOLS PROJECT FINANCE allows you to model such fees. Both fees are deducted from the payments to the project-company.

Handling Fee

Write the percent of gross sales receipts (net of indirect taxes but before duty) that the off-taker receives for his services. E.g. if the off-taker can deduct 5% write 5 into the %—Handling Fee entry box. Leave the default zero if there is no handling fee.

Flat Fee p.a.

Write the annual flat fee into the Flat Fee p.a. entry box. The model assumes that the flat fee is paid in the contract currency.

Flat Fee Increase p.a.

For flat fee increases enter a positive number. E.g. if the flat fee rises 10% per year, enter 10 in the %—Flat Fee Increase p.a. box. The yearly increase is converted in a monthly increase factor. The flat fee thus increases continually.

For flat fee decreases enter a negative number. E.g. if the flat fee falls by 10% per year, enter −10 (minus 10).

Deferral Mechanism Data

PROFINTOOLS PROJECT FINANCE allows you to shift part of the cash flow risks to the off-taker. This is done through a deferral—credit mechanism. The company pays the full sales price but receives a loan from the off-taker equal to the deferred handling/and or flat fee. The deferral credit mechanism is triggered when the following conditions are met:

The company cannot fulfill its payment obligations.

The sales price is equal or lower than a negotiated trigger price.

The agreed deferral—credit is not yet fully utilized.

Maximum Amount to be deferred

Write the Maximum Deferred Amount credited by the off-taker to the project-company into the respective entry box. The model pays back the loan once sufficient funds are available.

Trigger Price

Write trigger price that triggers the deferral-credit if the company's cash flow is insufficient into the entry field. The trigger price has to be in the contract currency.

Flat Fee Deferral Percent

Write the percentage of flat fee that is to be deferred into the % Flat Fee deferred entry box. E.g. if you want to defer 12.3% write 12.3.

Handling Fee Deferral Percent

Write percentage of the handling fee that is to be deferred into the % Handling Fee Deferred box. E.g if you want to defer 12.3% write 12.3.

Interest on Deferred Amounts

If the project-company has to pay interest on the deferred amounts write the interest rate per year into the Interest p.a. on Deferred Amount box. If the interest rate is 5.5% write 5.5.

Checklist: Enter an Off-Take Contract—Required

1 Select Sales on the general menu.
2 Click on Sales Commodity Market Pricing. The program loads the form.
3 Select the product that you want to sell.
4 Write the name of the off-take contract into the Contract box
5 Select the contract currency (selection should turn blue).
6 Select the price generating method—automatic price or manual.
7 Write the price per unit by the end user (net of VAT)
8 Write the average days before payment into the respective box.

Checklist: Optional—If You want to Establish a Price Trend or do Sensitivity Testing 9 Write the sales price trend into the Sales Price Trend %—p.a. box
10 Select first and last trend month.
11 Write price volatility into the % Price Swings box.
12 Select the length of the cycle with the Month—Length of Cycle spinbutton.
13 Select status of the price cycle at project start (Price half way up, Top Price, half way down, Bottom Price—click, selection should turn blue).
14 Enter the indirect tax rate into the Indirect Tax—% box.
15 Enter the duty into the Duty % field.
16 Press Enter if there are no sales expenses.

Checklist: Optional—Sales Expenses Off-Taker
17 Select the transport cost currency (click, selection should turn blue).
18 Write the off-taker's transport cost per unit.
19 Write the transport cost increase percent per year—if any.
20 Select the insurance cost currency.
21 Write the insurance cost per unit—if any.
22 Write the insurance cost increase percent per year Checklist: Optional—Handling Fee and Flat Fee
23 Write the handling fee into the %—Handling Fee box (see Sales Page Two).
24 Write the flat fee into the % Flat Fee p.a. box.
25 Select the first and last flat fee increase month.

Checklist: Optional—Deferral—Credit Mechanism
26 Write the Maximum Deferral Amount
27 Write deferral Trigger Price
28 Write the percentage of the flat fee that you want to be deferred.
29 Write the percentage of the handling fee that you want to be deferred.
30 Write the interest rate p.a. on the deferred amounts.

Checklist: Optional—Sales Expenses Project Company
30 Select the transport cost currency (click, selection should turn blue).
31 Write the transport cost per unit.
32 Write the transport cost increase per year.
33 Select the insurance cost currency (click, selection should turn blue).
34 Write the insurance cost per unit.
35 Write insurance cost increase per year.

Checklist: Delete Off-Take Contract
1. Select Sales on the general menu. Click on Sales Commodity Market Pricing. The program loads the form.
2. Select the product that you want to sell then press Delete.

Checklist: Look at or Publish Off-Take Contracts
1 Select Model on the general menu and Show Me on the drop down menu.
2 Press the button Sales then select first the product and then the contract you want to study. The program shows you the contract and associated graphs.
3 For an overview press the button Model.

Chapter 14

ProFinTools Project Finance—Sales—Mark Up Pricing

PROFINTOOLS PROJECT FINANCE provides three types of sales contracts: Direct Sales (1) or (2) off-take agreements based on commodity prices determined in the output market, and (3) mark up or cost plus contracts which determine output prices as a function of the firm's production cost. This chapter deals with contract type (3)—sales through up to three mark up contracts for each product.

If your finished goods don't sell instantaneously (as in the case of a generating plant) you should first enter the inventory cycle for the product that you want to sell (see Chapter 13).

To get started go to Sales on the general menu bar and select Mark up Pricing on the drop down menu. The model loads the entry form.

Data Entries

Entries fall into three categories: Contract, Mark up and Sales Expenses.

Contract Entries

Product
First select the product. This resets the entry form. If you have not yet entered a product (Global and the Name, Schedule and Technical Specs) you cannot work with the mark up form as there is nothing to sell.

Contract
Select/write the off-take contract into the contract entry box. You can enter up to three off-take contracts per product. The model assumes that the off-take contract runs over the whole project lifetime. You don't have to enter a contract currency. All mark up contracts are calculated in units of numéraire.

Share of Contract in Total Sales
Write the percentage of total sales of the product that you want to sell under the mark up contract into the Share of Contract in Total Sales—% entry box. E.g. write 15.5 if the share is 15.5%. You can allocate all sales to one contract. You can also choose to sell less than 100% of output. The model piles up finished goods valued at production costs. This does not make much sense. Therefore always sell 100% of output. If you want to reduce sales in absolute unit numbers, select Global on the general menu, click on Name, Schedule and Technical Specs. and adjust manually the capacity use during the project month(s) under consideration.

Hint: You can sell a product with a combination of competitive off-take pricing and mark up pricing contracts.

Avgerage No. of Days Before Receipt of Payment
Write the number of days from the date of sale to the actual payment into the Avg. No. of Days before Payment box. This can be any positive real number betwee 0 and 91.24. The model needs this information to calculate working capital needs Mark Up Entries Mark Up Basis
Select the mark up basis. You can choose Total Operating Costs, Variable Costs, Fixed Operating Costs or Variable+ Fixed Operating Costs. The program adjusts for the share of the contract in total sales.

Example: Assume that you have chosen Total Operating Costs as mark up basis. Assume that the total operating costs reach 2000 units of numéraire in project month 60. You produce 100 units in month 60. The mark up basis therefore is 2000 units of numéraire/100=20 units of numéraire If your mark up contract's share is 30% the mark up basis is 20 units of numéraire times 30 (the number of units sold under the contract). This is equal to or 600 units of numéraire.

Mark Up Percent
Write the percentage you want to mark up into the Mark up % box. E.g. if you envisage a mark up of 10% write 10.
The model multiplies the mark up basis with the mark up percent. To stay with the example directy above: If your mark up basis is 600 units of numéraire and you use a 10% mark up gross sales receipts will be 660 units of numéraire.

Flat Payment p.a.
The model allows you to enter a flat payment like for example a connection fee.

Flat Payment Increase % p.a.
For flat payment increases enter a positive number. E.g. if the flat fee rises 10% per year, enter 10 in the Flat Payment Increase % p.a. box. The yearly increase is converted into a monthly rate. The flat payment thus increases continually.

For flat payment decreases enter a negative number. Eg. if the payment by 10% per year, enter −10 (minus 10).

First and Last Trend Month

Select the first and last flat payment increase month. ProFinTools allows you to start or end the Trend at any project months.

Sales Expenses Project Company

Transport Cost Currency

Select the transport cost currency (click, selection should turn blue). If you don't find the currency you want to use, press Enter in order not to lose entries made so far, exit Mark up Pricing and select Global on the general menu bar and then Currencies on the drop down menu. Enter the desired currency.

Transport Cost Per Unit of Output

Write the transport cost per unit into the Transport Cost/ Unit entry Box. If the project-company incurrs no transport costs accept the default zero.

Transport Cost Increase Per Year

For cost increases enter a positive number. E.g. if the transport cost per unit of output rise 10% per year, enter 10 in the transport Cost Increases p.a.—% box.

For cost decreases enter a negative number. Eg. if the transport cost per unit fall by 10% per year, enter −10 (minus 10).

Insurance Cost Currency

Select the insurance cost currency (click, selection should turn blue). If you don't find the currency you want to use, press Enter in order not to lose entries made so far, exit Mark up Pricing, select Global on the general and then Currencies on the drop down menu. Enter the desired currency.

Insurance Cost Per Unit of Output

Write the insurance cost per unit into the Insurance Cost/Unit box. Accept the default value zero if the project-company incurrs no insurance costs directly related to sales.

Insurance Cost Increase Per Year

For cost increases enter positive number. E.g. if the cost per unit sold rises 10% per year, enter 10 in the Cost Increase p.a. % box.

For cost decreases enter a negative number. Eg. if the cost per unit sold falls by 10% per year, enter −10 (minus 10).

Checklist: Enter a Mark Up Contract—Requiered
1 On the general menu select Sales.
2 Click on Mark up Pricing. The program loads the form.
3 Select the product.
4 Write the name of the mark up contract into the Contract box.
5 Select the Mark up Basis.
6 Write the share of the contract in the sales of the product int ot the entry box.
7 write the Average Days before Payment into the box.
8 Write the mark up percent into the entry box
9 write the flat payment—if any—or accept the default value zero.
10 Write the flat payment increase per year into the entry box.
11 Select the first and last month for the flat payment increase (or decrease).
12 Press Enter if there are no Sales Expenses else proceed with entries.

Checklist: Sales Expenses Project Company—Optional
13 Select the transport cost currency (click, selection should turn blue).
14 Write the transport cost per unit.
15 Write the transport Cost increase per year.
16 Select the insurance cost currency (click, selection should turn blue).
17 Write the insurance cost per unit.
18 Write the insurance cost increase per year.

Checklist: Delete a Mark Up Contract
1 On the general menu select Sales. Then click on Mark up Pricing.
2 Select the product and then press Delete.

Checklist: Look at or Publish Mark Up Contracts
1 Perform Steps 1–18 above.
2 Exit form Mark up Pricing.
3 On the general menu select Model. Then Press Show Me on the drop down menu
4 Press Sales.
5 Select the product, the mark up contract type and then the contract you want to review. The program shows you the contract and associated graphs.

Chapter 15

ProFinTools Project Finance—Lookit

This chapter deals with the output system. PROFINTOOLS PROJECT FINANCE provides you special output files that contain graphs to illustrate the results. To look at results on the screen go to Model on the general menu bar and select Show Me on the drop down menu. The output files are loaded on demand with the exception of the Case File (the file you use to make your entries) and the Model file (the model itself). This implies that you have to wait a short while before you can access the information. To access the files press the respective button. Not all the graphs are visible when you access the file. To access invisible graphs move to the right on the slide bar.

Publish

The program allows you to export the content of an output file. Use the Publish button. You will be prompted for a file name and a folder. The selected information is copied to that file. Once you have exited the program, you can print or edit the files as you like.

Out of Memory

Try not to open all output files at the same time. If you have other progams running or little free space on c: you might encounter an out of memory error. If that happens, exit the program, close other programs, free space on the c: drive and restart the program.

In the following we will introduce the output files in alphabetical order:

CAPEX—Capital Expenditure
You have access to
1. Capex contract overview.
2. Graphs—Capex Totals
    Total Imports, Total Customs, Total Local
    Cost categories (site, buildings, equipment, pre-production).
3. Site capex entries
    List of monthly entries for all individual site capex contracts.
4. Total Site Graphs
    Graph Total Capex Site
    Graph Total Site Imports Graph Total Site Customs
Graph Total Site Local Content
Graph Site Capex Break down
5. Buildings Capex Entries
   List of monthly entries for all individual buildings capex contracts.
6. Total Buildings Graphs (see above).
7. Equipment Capex Entries
   List of monthly entries for all individual equipment capex contracts.
8. Total Equipment Graphs (see above).
9. Pre-Production Capex Entries
   List of monthly entries for all individual pre-production capex contracts.
10. Total Pre-Production Graphs (see above).

Case File

If you press the button Case File on the Model output surface you get access to the project file that you use for data entries. The Case File allows you to quickly check out your entries. It also allows you to snoop around in case you feel something went wrong while you made entries or deleted data. However, the Case File is designed to serve as a data bank. Data are organized according to the needs of the computer. Therefore, you might want to completely ignore it.

To give you a general orientation, here are the major landmarks of the case file:

| | |
|---|---|
| Rows 2–70 | General project data and currencies |
| Rows 71–356 | Capital expenditure |
| Rows 360–371 | Overheads. |
| Rows 405–429 | Maintenance. |
| Rows 433–463 | Depreciation and reinvestment. |
| Rows 467–479 | Equity and dividends. |
| Rows 481–494 | Standby loans and sweep. |
| Rows 539–734 | General-purpose loans. |
| Rows 995–1022 | Taxes and subsidies. |
| Rows 1900–1923 | General product data |
| Rows 2000–2999 | Product 1 |
| Rows 3000–3999 | Product 2 |
| Rows 4000–4999 | Product 3 |

Cost of Goods

First select the product. You get access to a menu that allows you to select variable costs (price of input determined on the input market or price of input as a function of sales prices), fixed operating costs or an overview of the fixed operating and variable costs caused by the product.

Variable Costs—Flexible Contract Pricing

After you have selected the variable cost contract you will find the monthly and unit cost caused by that input factor and the:
graph total cost caused by the factor in numéraire;
unit cost in numéraire;
price of one unit of the input in the contract currency;
price/unit of input factor in numéraire.
To see all of the graphs move to the right with the slide bar.

Variable Costs—Price of Input Determined on Input Market

After you have selected the variable cost contract you will find the monthly and unit cost caused by that input factor as well as the:
graph total cost caused by the factor in numéraire
unit cost in numéraire
price of one unit of the input in the contract currency.

To see all of the graphs move to the right with the slide bar.

Fixed Operating Cost

You get access to monthly costs over the whole project lifetime.

Cost Totals

The listbox at the bottom gives you access to the
1. Total Cost of Production
2. Total Variable Costs
   For each month you get access to the total variable cost and the variable cost per unit (in numéraire).
   The model creates the graphs Total Variable Costs and Total Variable Costs per unit.
3. Total Fixed Operating Costs
   For each fixed operating cost item a time series of monthly cost.
4. Capacity Use—Learning Curve
   You find the production capacity (number of units per year) for the product, the capacity use for each project month and the number of units produced.
   You also find the graphs Capacity use and Monthly Output.

Currencies

The output folder Currencies is straightforward: Select the currency that you want to study. The model shows you for each month the exchange rate and a graph. At the top of the output file you find an overview over all exchange rates (select currency one to access that table).

Equity

The button Equity on the output form gives you access to a selection box.
1. Paid in Capital+Additional Shareholder Investment
2. CF (Cash flow) set-aside for Sweep
3. Provisioning for Buildings
4. Provisioning for Equipment
5. Equity Structure
6. Total Shareholder Equity
7. Access to whole sheet
   To look at the graphs move downward.

Financial Statements

PROFINTOOLS PROJECT FINANCE gives you two access routes to financial results. You have immediate access to the model itself, the monthly cash flow, income statement and balance sheet through the button Model. However, the only ratio you will find there is the equity ratio. For a more detailed study of the financial results press Financial Statements on the Model output surface. Two selection lists appear.

Upper Selection List

In the upper list you can select the Cash Flow, the Income Statement, the Balance Sheet, Ratios and Graphs or the Whole sheet.

Lower Selection List

The lower list allows you to decide the form of presentation:
1. Annual
2. Semi-Annually
3. Quarterly
4. Monthly
   The conversion is done on the basis of the fiscal year, not the calendar year. Therefore, the annual cash flow is the respective fiscal year's cash flow.

PROFINTOOLS PROJECT FINANCE calculates the following ratios:

Profitability Ratios (Rows 511–524)
1. Gross Profit Margin
2. Profit Margin
3. Return on Total Assets
4. Return on Equity
, Graph Profit row 525–551):

Liquidity Ratios—Measures (Rows 552–566)
1. Net Working Capital
2. Current Ratio
3. Quick Acid Test
   Graphs Liquidity Ratios and Net Working Capital (Rows 567–616)

Leverage Ratios
1. Debt Ratio and graph (Rows 617–652)
2. Debt/Equity Ratio and graph (Rows 653–684)
3. Interest Cover Ratio and graph (Rows 685–718)
4. Debt Service Cover Ratio and graph (Rows 719–756)
5. Equity Ratio and graph (Rows 757–797)

Internal Rate of Return and Net Present Value

On the Model output form press the button IRR & NPV. Then enter the discount rate and press Show Me. The model uses the GDP-deflator to deflate the monthly free cash flow. The free cash flow is then converted into annual cash flow data. These data are used to calculate the IRR and the NPV for the free cash flow and net profits. While you will always find an NPV, the model does not necessarily come up with the IRR. This happens e.g. if your free cash flow is negative through all the project life.

Loans

The model works with different types of loans: General-purpose loans, stand-by loans, variable cost deferral-credits and off-take fee deferral credits. This section is dedicated to general-purpose loans. For the other loan types refer to recourse.

General-Purpose Loans

You access general-purpose loans in the Model output environment through the button Loans. Select the loan you want to look at.

You will get access to the usual loan data like fees, interest, utilization and debt service and the debt service reserve account both in the loan currency and in units of numéraire.

To look at the graphs move below the data section and slide to the right. The model generates for each loan the
1. Graph Utilization End of Month—Loan Currency.
2. Graph Utilization End of Month—numéraire.
3. Graph Debt Service (Repayment, Interest due, Sweep in loan currency).
4. Graph Sweep.
5. Total DSRA—Loan Currency.
6. DSRA—Principal: Principal Base and Principal Step up—Loan Currency.
8. DSRA—Interest: Interest Base and Interest Step ups.

Model

The button Model on the Model output surface gives you access to the model itself. This is the most rapid way to check out the impact of your entries or changes. At the top of the page you find the cash flow, the income statement and the balance sheet. From row 416 below there are only quite technical calculations. For a more detailed review we recommend that you go either to the special output files or to the Financial Statements (see above). The Financial Statements are loaded with ratios and graphs, provide a quarterly, semi-annually and yearly presentation and thus give a better picture.

Limited Recourse—the Hierarchy

Limited Recourse—the Company Needs Help

| | |
|---|---|
| 1st Line of Defense: | DSRA: If cash flow after debt service is negative, the model will draw down the debt service reserve accounts if available. |
| 2nd Line of Defense: | Stand by loans: Should the cash flow remain negative once the DSRA's have been depleted, the model will draw down the stand by loan that is applicable (construction or repayment). |
| 3rd Line of Defense: | Deferral Credit Variable Costs: If the cash flow remains negative even after the stand by loans have been disbursed up to their maximum amount, the variable cost deferral kicks in - if available. |
| 4th Line of Defense: | Deferral Credit Off-Taker: If the cash flow is still negative after deferral of variable costs it is time to call upon the deferral of handling fees and flat fees, if agreed upon. |
| 5th Line of Defense: | Additional Shareholder investment: Any remaining negative cash flow will have to be met by additional shareholder investment, should the cash account be empty. |

Interest due on deferred amount: As long as the cash flow of the company is negative, no interest neither on the stand by loans nor on the deferral of variable cost or off-take fees will be paid.

Limited Recourse—Replenishment, Repayment—the Company is Back on her Feet

| | |
|---|---|
| 1st Replenishment DSRAs | Before any amounts disbursed to the project-company are repaid, available cash flow is used to fulfill any payment obligations due under the senior debt (general-purpose loans). The remaining balance will be used towards the replenishment of the debt service reserve accounts up to the required balance. |
| 2nd Repayment - Stand by Loans: | If cash flow is available after the senior debt has been serviced and the DSRA been replenished, the remaining cash flow will be used to repay the principal first of the construction and then of the repayment stand by loan. Once the principal of both loans has been fully repaid, any deferred interest on these loans will be paid. The stand by loans for the construction and repayment phase are senior to the deferral - credits by input suppliers (variable costs) and off-takers (flat and handling fees). |
| 3rd Repayment - Variable Costs: | If the cash flow after interest payments on the stand by loans is positive, the deferred variable cost will be paid (i.e. the variable cost loan will be repaid). If positive cash flow remains, any outstanding interest on the variable cost loan will be paid. |
| 4th Repayment - Off-taker: | Should the cash flow remain positive after interest on variable cost loans has been paid, the off-take deferral credit will be paid down. Once that is done, outstanding interest on the off-take credit will be paid. |
| 5th Dividends: | Only once all the above has been met, dividends can be disbursed. |

General Limited Recourse Information

Press the button Recourse on the Model output surface. You obtain general and/or product specific information. If you click on the combo box Total Recourse, you gain access to the 1. Balance of DSRA
   Monthly data on total debt service, debt service covered by the cash flow, cash flow after debt service, required DSRA and its balance.
   Graph Required total DSRA and balance on DSRA.
2. Standby loan construction phase.
   Monthly data on loan maximum utilization and unused amount.
   Graph Stand by
3. Standby Loan Repayment Phase.
   Monthly data on loan maximum utilization and unused amount.
   Graph Stand by
4. Total Unconditional Reserves.
   Monthly data on unused Standby construction or repayment.
   Graph Unused unconditional Reserves
5. Total Unused Reserves.
   Sum of the unused recourse reserves under products 1–3 and unused Stand bys.
   Graph Unused reserves.
6. Product Recourse
   If you click in the Total Recourse combobox on Product Recourse two further comboboxes pop up. Click in the Product combobox on the product that you want to review and select in the third combobox one of the following options:
1. Deferment—Credits Variable cost
   You get access to the two variable cost input factors that can vary as a function of the sales price of the output. To go to the second variable cost factor move below on the slide bar.
   The model gives you information on the maximum deferrable amount, the utilization of the deferral—credit, the unused amount.
   Graphs Deferral Variable cost for each of the two input factors.
2. Unused Recourse Variable Costs
   Monthly time series on unused variable cost recourse and a Graph total unused conditional reserves available under the variable cost contract arrangements for this product.
3. Deferment Credits Off-take Contracts
   You find for the three available off-take contracts the monthly data on the deferral of the handling and the flat fee, the maximum deferral amount, the utilization of the deferral credit and the unused amount. You also find a Graph Deferral Flat and Handling Fee (utilization and unused amounts).
   Move downwards to access off-take contract two and three.
4. Unused Recourse Off-take Contracts
   Monthly time series on unused off-take cost recourse and a Graph Total unused conditional reserves available under the off-take arrangements.
5. Total unused Product Recourse
   You find monthly data on the unused recourse.
   Graph Total Conditional Unused Reserves (according to your selection for product 1, 2 or 3)

Sales
Press the button Sales on the output form Model. Then click on the product that you want to see. Three selection boxes appear:

Off-Take and Direct Sales
The model gives you for each month the revenues, the sales expenses of the off-taker (that are deducted from the revenues), the sales expenses of the project-company and the net sales receipts. You will also find the utilization of the off-take deferral—credit mechanism. Included are the
1. Graph net Sales Receipts.
2. Sales Expenses.
3. Sales Price/Unit Markup
You will find inter alias information on the total costs including the share in overheads, the share of the contract in these costs (this is the mark up base) and sales receipts and sales expenses. The model generates the
1. Graph Net Sales Receipts—in numéraire
2. Graph Mark up and Flat Fee
3. Graph Sales Expenses Project-Company General: The third selection box gives you the options
1. Overview all contracts
2. Graphs—Off-take Sales Receipts
   Graph Total Sales Receipts—Off-take
   Graph Total Net Sales Receipts—Off-take
   Graph Total Sales Expenses—Off-take
3. Graphs—Mark up Sales Receipts
4. Graphs Total Sales Receipts—Expenses Taxes
The button Taxes on the output form Model gives you access to a selection box. You have two choices: Income tax and property tax.

Corporate Tax
The model shows you for each month the Earnings before Taxes (EBT), the tax bases for retained and disbursed income, the tax rates and the tax payments. You will also find information on tax refunds necessary in case you have overpaid taxes (this happens if you pay e.g. monthly corporate tax and enjoy good earnings at the start of the year but run into a bad spell later).
Below you find the following graphs:
1. Tax base retained income.
2. Tax retained income.
3. Tax base dividend.
4. Tax on dividends.
5. Accumulated income tax payable
6. Income Tax paid
7. Accumulated income Tax during the Calendar Year.
8. Total Income Tax and Tax Refund.

Property Tax
The model shows you for each month i.a. the tax base—fixed assets, the tax rate and the tax paid.
Below you find the graphs:
1. Tax Base—Fixed assets.
2. Tax.
3. Accumulated Property Tax Payable.
4. Property Tax Paid.

Chapter 16

ProFinTools Project Finance—Break Even Price and Sensitivity Testing

PROFINTOOLS PROJECT FINANCE allows you to save scenarios: Just save your case file under another name. It also allows automatic sensitivity testing for the most important variables. To access the sensitivity testing environment go to Model on the general menu and click on Test on the drop down menu. All project files involved in the calculations are opened. Therefore it takes a while until the form loads. You can look for the break even price and test capital expenditure, currencies, costs, interest rates, sales and the start up of operations. In each case you will be prompted for a discount rate needed to calculate the net present value. You will also be asked for a filename where the output is to be stored.

Caveat: You get as feedback the net present value of both the profits and the free cash flow associated with the test variables, the total of additional shareholder investment, if any, and the internal rate of return, if the model finds a solution. However, the model does not tell you in which years, if any, it makes additional shareholder investments. Therefore, once you have pre-tested a number of variables, you should refine your analysis by testing manually the most critical entries.

Break Even Sales Price

Use this feature if you want to know at what sales price your company breaks even.

Commodity Market Pricing—Off-take Contracts

You can only test one sales price at a time. The other sales prices are kept constant. The program needs a sales contract and a sales price to work with. Therefore, before you can engage in break even testing, you have to enter at least one sales contract (go on the general menu bar to Sales and then to Commodity Market Pricing or Mark up Pricing). You also have to tell the program the Break Even Month (start up month<=break even month<end of analysis).

The program looks at the break-even month and the sales price that you have generated for the break-even month. The program searches for a multiplier for that sales price that leads to a sales price in the break-even month that generates zero profits. All sales prices over the whole project lifetime are multiplied with that multiplier.

The sales price you get as break-even price is a sales price at project start. In the break-even month this sales price might differ from the price at project start as you might have established a sales price trend or currency fluctuations. You might also have created a seasonal sales price pattern with the "manual edit" feature.

The program goes through up to twenty five iterations. The iterations and the associated internal rates or return (IRR), the net present values (of the free cash flow and the net profits) and the total share holder investments are documented in the results file. The last entry in the results-file is the net profit in the break-even month. It might not be exactly zero after the iterations. Further, the program does not always come up with a solution. This might have inter alias the following causes:

| | |
|---|---|
| Case 1: | Even with a sales price of zero the net profits of the project company in the selected month are greater than zero. This happens, if the sales receipts of the other off-take or mark up contracts are so high that the company generates profits anyway, even if you give away for free the output under the contract under study. |
| Case 2: | You have set the share of the contract under study inadvertently to zero. In that case changes of the sales price have no impact on the cash flow. |
| Case 3: | You have set the sales price of the contract under study inadvertently to zero. As the program works with multiples of the sales price that you have entered, the sales price will always be zero and you don't reach a solution. |
| Case 4: | Twenty-five iterations are not enough. |

Capex

The program goes through all the capital expenditure contracts one by one and increases the import content expenditure for each month by 10, 20 and 30 percent. Then lowers the expenditure by −10, 20 and 30%. Then the program moves on to the local content and does the same. After each variable change the program runs and calculates the IRR and the NPV, Then it moves to the next capex contract. The test output shows you how the IRR, the NPV of profits and free cash flow and total additional shareholder investments react to the capex changes.

Caveat: Use the Manual disbursement method to finance capital expenditure if you want to prevent the loan amount to vary with the capex contract value.

Currencies

The program tests the exchange rates of all additional currencies. Each of the exchange rates are consecutively increased and decreased by 10, 20 and 30 percent. Note, the program does not test for currency volatility. If you want to test for currency volatility you should first enter such features in the form Currencies. (go to Global). The automatic test run will apply to any exchange rate over the 254 month time horizon the same procedure regardless whether the exchange rate reflects upward or downward cycles. The test output shows you how the IRR, the NPV of profits and free cash flow and total additional shareholder investments react to an across the board devaluation or appreciation of a currency.

Costs

PROFINTOOLS PROJECT FINANCE tests for each product each fixed operating cost and each variable cost. Each fixed operating cost items is increased first by 10, 20 and 30 percent and then decreased by 10, 20 and 30 percent. The same procedure applies to the up to 14 variable input factors whose prices are determined on the input market. However, in case of the (per product up to two) variable input factors whose prices are contracted as a percentage of the output sales prices, it is this percentage that is increased by 10, 20 and then 30 percent. The percentage is then decreased by the same percentage rates. The test output shows you the prices/unit that are entered as test variables and how the IRR, the NPV of profits and free cash flow and total additional shareholder investments react to the respective input price changes.

Interest Rates

The interest rates of all the general-purpose loans are consecutively increased and decreased by 10, 20 and 20 percent. The test output shows the interest rates that are entered as test variables and the reaction of the IRR and the NPV of the free Cash flow and the net profits to interest rate changes. It also shows the respective total additional shareholder investments. The impact on the IRR and the NPV of the free Cash flow should be zero except in the case the company pays corporate tax as interest rate are deductible as an expense. The NPV of the net profits should be sensitive to interest rate changes.

Sales

The program tests each off-take or direct sales contract. The model first increases and then decreases the sales price by 10, 20 and 30 percent. It does not test for price volatility. If you want price volatility to be included in the test you should go to Sales on the general menu and then to Commodity Market Pricing on the drop down menu. Then include price cycles as you see fit.

In case of mark up pricing, the mark up percentage is increased and then decreased by 10, 20 and 30 percent. The test result shows how the IRR and the NPV of the free Cash flow and the net profits react to price changes or changes in the mark up percentage. It also shows the corresponding total additional shareholder investments.

Start Up

PROFINTOOLS PROJECT FINANCE advances the start up of operations from the original start up month in twenty-four one-month-steps. The test results show you how total additional shareholder investments, IRR and the NPV of the free cash flow and net profits react to delays in the start up.

Caveat: The program does not adjust the learning curves. Therefore, if you have implemented a learning curve, the program will test first a delay of one month (t+1) at the output level t+1, then a delay of t+2 with production starting at the output level t+2. Therefore, the real cost of a delay might differ.

Thus, after getting an idea of what's going on it is advisable to test for the outcome manually (go to Global and then to Name, Schedules and Technical Specs.).

EXAMPLE I

The Widget Inc—A Chemical Company

You want to create the Widget Inc. You want to install three production lines:
  line 1 for the production of LDPE GP Film,
  line 2 for LLDPE—Butene
  line 3 for LLDPE Octene.
You have negotiated three turnkey contracts with three suppliers from countries. The suppliers have subcontracted the construction work. The contracts currencies differ. However all site- and construction work is payable in USD.
The LDPE and LLDPE—Butene lines use ethylene as major input. The LLDPE—Octene production line processes ethan. The banks insist on longterm supply and off-take contracts.
Your market is volatile and geographically diverse. The Widget Inc is exposed to commodity price and foreign exchange risks. The he banks want a limited recourse package that consists of
  a stand by loan for the construction phase
  a stand by loan for the loan repayment phase
  ethylene and ethan price formulas (subject to a minimum price)
  deferral of part of the ethylene and ethan payments in case of cash flow problems
  deferral of part of the handling fee if there is a cash flow crisis
The banks tell you that that at least 30 percent of the required funds should be paid in as equity.

They insist that the equity ratio does not go below 30% until start up of operation. The banks don't want to finance any down payments.

You find the necessary entries below and in the case file factory.xls on the PROFINTOOLS PROJECT FINANCE CD. The case was calculated at constant prices. It is up to you to do the sensitivity testing.

It will take—depending on the speed of your computer—up to a couple of minutes to reconfigure PROFINTOOLS PROJECT FINANCE (go to File, Open and select factory.xls).

Questions:
1. How much commodity price volatility can the limited recourse package withstand before the Widget Chemical Company defaults?

On the general menu go to Sales. On the drop down menu click on Commodity Market Pricing.
   Generate sales price increases/decreases or/and fluctuations (see chapter 13)

2. How much exchange rate volatility can the company withstand?

On the general menu select Loans. On the drop down menu click on Bank loans. Change the financing method to Manual (this prevents the loan amount to vary with the exchange rate—for details see chapter 6).
   On the general menu go to Global. On the drop down menu select Currencies.
   Hit the company with a currency shock, a depreciation trend and/or cyclical exchange rate fluctuations (see chapter 4). E.g. try out a currency volatility of 50%, cycle length 60 months for the Peso and the Pound.

3. How much input price increases can the company withstand? You project a USD-inflation rate of 4% p.a. for the first ten years of the project life. Your USD—fixed operating costs increase by 7% p.a. during that period. Euro input price inflation is 3% p.a. during the first ten years.

Select Global on the general and Name, Schedule and Technical Specs on the drop down menu.
   Enter the GDP-deflator.
   Select Fixed Costs on the general menu and then General and Administrative Costs, Fixed Operating Costs on the drop down menu. Establish price trends.
   Select Variable Costs on the general and Costs determined by Input Market on the drop down menu. Establish price trends.

Basic Project Data

| Project Name | Widget Chemical Company |
| --- | --- |
| Project start: | Jun.-01 |
| Start up of Operations - Project Month | 30 |
| Fiscal year | Jan.–Dec. |
| End of Project - Project Month | 210 |

Products

| Product Name | LDPE GP Film | LLDPE - Butene | LLDPE- Octene |
| --- | --- | --- | --- |
| Measurement Unit of Output | tons | tons | Tons |
| Maximum Capacity p.a. | 200,000 | 150,000 | 140,000 |
| Actual Capacity usage | 97% | 95% | 98% |
| Capacity Usage at Start up | 80% | 80% | 85% |
| Learning Period - Months | 12 | 14 | 9 |
| Type of Learning Curve | Linear | Steep | Steep |
| Production time/ Unit of Output | 2 h 30 min. | 3 h 10 min. | 4 h 20 min |
| Share in over-heads | 40% | 30% | 30% |

Currencies

Numeraire

| Numeraire | USD |
|---|---|
| GDP Deflator - % | 0 |
| Last Project Month Inflation | n/a |

Additional Currencies

| Name | Peso | Yen | Euro | Pound |
|---|---|---|---|---|
| Exchange Rate | 5 | 105 | 2.1 | 0.95 |
| Exchg. Rate Trend | 0%. | 0%. | 0%. | 0%. |
| Last Month of Exch. Rate Trend | n/a | n/a | n/a | n/a |
| Currency Swings | 0% | 0% | 0% | 0% |
| Length of Currency Cycle | n/a | n/a | n/a | n/a |
| Start of Currency Cycle | n/a | n/a | n/a | n/a |
| One Time App./Depreciation | n/a | n/a | n/a | n/a |
| Month of One Time App./Depreciation | n/a | n/a | n/a | n/a |

Capital Expenditure

Capex Site

| Contract | Site Acquisition | | Site Preparation | |
|---|---|---|---|---|
| Contract Currency | USD | | Pound | |
| Customs - % | 0% | USD | 0% | Pound |
| Project Month | Import Content | Local Content | Import Content | Local Content |
| 1 | | | | |
| 2 | | | | |
| 3 | | 500,000 | | |
| 4 | | | | |
| 5 | | | | |
| 6 | | | | 20,000 |
| 7 | | | | 30,000 |
| 8 | | | | 30,000 |
| 9 | | | | 20,000 |
| Total | | 500,000 | | 100,000 |

Capex Buildings

| | Contract | | | | | |
|---|---|---|---|---|---|---|
| | Build. LDPE GP Film Plant | | Build. LLDPE - Butene | | Build. LLDPE - Octene | |
| | Contract Currency | | | | | |
| | USD | USD | USD | USD | USD | USD |
| | Customs - % | | | | | |
| | 0% | | 0% | | 0% | |
| Project Month | Import Content | Local Content | Import Content | Local Content | Import Content | Local Content |
| 1 | | | | 82,500 | | |
| 2 | 75,000 | | | | | |
| 3 | | | | 67,500 | | |
| 4 | | | | | | |
| 5 | | | | | | |
| 6 | | | | 5,500 | | |
| 7 | 5,000 | | | 5,500 | | |
| 8 | 5,000 | | | 5,500 | | 4,500 |
| 9 | 5,000 | | | 44,000 | | 4,500 |
| 10 | 40,000 | | | 88,000 | | 4,500 |
| 11 | 80,000 | | | 88,000 | | 36,000 |
| 12 | 80,000 | | | 110,000 | | 72,000 |
| 13 | 100,000 | | | 88,000 | | 72,000 |
| 14 | 80,000 | | | 5,500 | | 90,000 |
| 15 | 5,000 | | | | | 72,000 |
| 16 | | | | | | 4,500 |
| 17 | | | | | | |
| 18 | | | | | | |
| 19 | | | | | | |
| 20 | | | | 27,500 | | |
| 21 | 25,000 | | | | | |
| 22 | | | | | | 22,500 |
| Total | 500,000 | | | 550,000 | | 450,000 |

| | Capex Equipment | | | | | |
|---|---|---|---|---|---|---|
| | Contract | | | | | |
| | Equip. LDPE GP Film Plant | | Equip. LLDPE - Butene | | Equip. LLDPE - Octene | |
| | Contract Currency | | | | | |
| | Yen | Yen | Euro | Euro | Pound | USD |
| | | | Customs - % | | | |
| Project Month | 5% Import Content | Local Content | 5% Import Content | Local Content | 5% Import Content | Local Content |
| 1. | 787,500,000 | | 9,000,000 | | 9,000,000 | 150,000 |
| 2 | | | | | | |
| 3 | | | | | | |
| 4 | | | | | | |
| 5 | | | | | | |
| 6 | | | | | | |
| 7 | | | | | | |
| 8 | | | | | | |
| 9 | | | | | | |
| 10 | | | | | | |
| 11 | | | | | | |
| 12 | | | | | | |
| 13 | | | | | | |
| 14 | | | | | | |
| 15 | | | 500,000 | | | |
| 16 | 1,000,000 | | 500,000 | | | |
| 17 | 2,000,000 | | 500,000 | | | |
| 18 | 3,000,000 | | 1,000,000 | | 550,000 | |
| 19 | 7,000,000 | | 2,000,000 | | 550,000 | |
| 20 | 70,000,000 | | 6,000,000 | | 550,000 | |
| 21 | 100,000,000 | | 10,000,000 | | 1,100,000 | |
| 22 | 800,000,000 | | 12,000,000 | | 2,200,000 | |
| 23 | 1,000,000,000 | | 8,000,000 | | 6,600,000 | 200,000 |
| 24 | 1,050,000,000 | | 4,000,000 | | 11,000,000 | 300,000 |
| 25 | 900,000,000 | | 2,000,000 | | 13,200,000 | 200,000 |
| 26 | 80,000,000 | | 1,000,000 | | 8,800,000 | 100,000 |
| 27 | 76,500,000 | | 500,000 | | 4,400,000 | |
| 28 | 50,000,000 | | | | 2,200,000 | |
| 29 | 2,000,000 | | | | 1,100,000 | |
| 30 | | | | | 550,000 | |
| 31 | | | | | | |
| 32 | | | | | | |
| 33 | | | | | | |
| 34 | | | | | | |
| 35 | | | | | | |
| 36 | | | | | | |
| 37 | | | | | | |
| 38 | | | | | | |
| 39 | | | | | | |
| 40 | | | | | 3,300,000 | 50,000 |
| 41 | | | | | | |
| 42 | 321,000,000 | | 3,000,000 | | | |
| Total | 5,250,000,000 | | 60,000,000 | | 66,000,000 | 1,000,000 |

Capex Pre-Production Costs

| | Contract | | | | | |
|---|---|---|---|---|---|---|
| | Legal Fees | Consulting | | Licencense | | |
| | Contract Currency | | | | | |
| | USD | USD | Euro | Euro | Euro | Euro |
| | | | Customs - % | | | |
| Project Month | 0% Import Content | Local Content | 0% Import Content | Local Content | 0% Import Content | Local Content |
| 1 | | 1,500,000 | 150,000 | | 750,000 | |
| 2 | | | 25,000 | | | |
| 3 | | | 25,000 | | | |
| 4 | | | 25,000 | | | |
| 5 | | | 25,000 | | | |
| 6 | | | 25,000 | | 4,250,000 | |
| 7 | | | 25,000 | | | |
| 8 | | | 25,000 | | | |
| 9 | | | 25,000 | | | |
| 10 | | | 25,000 | | | |
| 11 | | | 25,000 | | | |
| 12 | | | 25,000 | | | |
| 13 | | | 25,000 | | | |
| 14 | | | 25,000 | | | |
| 15 | | | 25,000 | | | |
| 16 | | | 25,000 | | | |
| 17 | | | 25,000 | | | |
| 18 | | | 25,000 | | | |
| 19 | | | 25,000 | | | |
| 20 | | | 25,000 | | | |
| 21 | | | 25,000 | | | |
| 22 | | | 25,000 | | | |
| 23 | | | 25,000 | | | |
| 24 | | | 25,000 | | | |
| 25 | | | 25,000 | | | |
| 26 | | | 25,000 | | | |
| 27 | | | 25,000 | | | |
| 28 | | | 25,000 | | | |
| 29 | | | 25,000 | | | |
| 30 | | | 25,000 | | | |
| 31 | | | | | | |
| 32 | | | | | | |
| 33 | | | | | | |
| 34 | | | | | | |
| 35 | | | | | | |
| 36 | | | | | | |
| 37 | | | | | | |
| 38 | | | | | | |
| 39 | | | | | | |
| 40 | | | 25,000 | | | |
| 41 | | | 25,000 | | | |
| 42 | | | 75,000 | | | |
| Total | | 1,500,000 | 1,000,000 | | 5,000,000 | |

Loans

Bank Loans

| Loan Name | Loan LDPE GP Film | Loan LLDPE Butene | Loan LLDPE Octene |
|---|---|---|---|
| Loan Currency | Yen | Euro | Pound |
| Interest | | | |
| Interest p.a. - % | 5% | 4.50% | 5.50% |
| Interest Calc. Method | Standard | Standard | Standard |
| No. of Month Interest paid in | 6 | 6 | 6 |

-continued

Bank Loans

| Loan Name | Loan LDPE GP Film | Loan LLDPE Butene | Loan LLDPE Octene |
|---|---|---|---|
| Arrears | | | |
| % of Interest Capitalized Fees | 0% | 100% | 0% |
| Management Fee % | 1% | 1% | 1% |
| Arrangement Fee % | n/a | n/a | n/a |
| Commitment fee % | 0.25% | 0.25% | 0.25% |
| No. of Month Commitment Fee is paid in Arrears | 3 | 3 | 3 |
| Debt Service Reserve Account | | | |
| Disbursement Phase DSRA - % of next Debt Service | 100% | 100% | 100% |
| Repayment Phase DSRA - % of next Debt Service | 100% | 100% | 100% |
| Interest on DSRA - % p.a. | 5% | 4.50% | 4.50% |
| Monthly Step ups | TRUE | TRUE | TRUE |
| Financing | | | |
| Capex - Type/Manual Contract | Equipment Equip. LDPE GP Film | Equipment Equip. LLDPE Butene | Equipment Equip. LDPE Octene |
| Category | Total Expenditure | Total Expenditure | Total Expenditure |
| % of Payments Financed | 100% | 100% | 100% |
| Disbursement Schedule | | | |
| Month of Loan Effectiveness | 1 | 1 | 1 |
| First Disbursement Month | 16 | 15 | 18 |
| Last Disbursement Month | 42 | 42 | 40 |
| Repayment Method | | | |
| Repayment Method | Equal Installments | Equal Installments | Equal Installments |
| Sweep | FALSE | FALSE | FALSE |
| First Repayment Month | 36 | 36 | 36 |
| Month - Start Repayment Phase | 30 | 30 | 30 |
| No. of Installments | 10 | 10 | 10 |
| Last Month Capitalization of Interest | 30 | 30 | n/a |

Stand by Loans

| Stand by Loan Construction Phase | USD |
|---|---|
| Maximum Amount | 10,000,000 |
| % Interest p.a. | 7% |

| Stand by Loan Repayment Phase | USD |
|---|---|
| Maximum Amount | 5,000,000 |
| Last Disbursement Month Stand by Repayment Phase | 90 |
| % Interest p.a. | 7% |

Equity

| Project Month | Capital Paid in this Month - USD |
|---|---|
| 1 | 30,000,000 |
| 2 | |
| 3 | |
| 4 | |
| 5 | |
| 6 | |
| 7 | |
| 8 | |
| 9 | |
| 10 | 10,000,000 |
| 11 | |
| 12 | |
| 13 | |
| 14 | |
| 15 | 250,000 |
| 16 | 200,000 |
| 17 | 200,000 |
| 18 | 400,000 |
| 19 | 1,000,000 |
| 20 | 1,000,000 |
| 21 | 2,000,000 |
| 22 | 3,700,000 |
| 23 | 5,000,000 |
| 24 | 7,000,000 |
| 25 | 6,500,000 |
| 26 | 3,000,000 |
| 27 | 2,000,000 |
| 28 | 2,000,000 |
| 29 | 1,000,000 |
| 30 | 15,000,000 |
| Total | 90,250,000 |

Dividends

| | |
|---|---|
| % - Dividend | 100% |
| Payments | Annually |
| First Dividend Month | 42 |

Taxes

| | |
|---|---|
| Manual Tax Rate Entry | FALSE |
| Automatic Tax Rate Entry | TRUE |
| % - Tax Rate retained Income | 20% |
| % - Tax Rate disbursed Income | 30% |
| Tax Payment | Quarterly |
| Tax Holiday - Until Project Month | 42 |
| % - Tax Rate retained Income during Holiday | 10% |
| % - Tax Rate Disb. Income during Holiday | 20% |
| Years - Carry forward Losses | 5 |

Depreciation

| Capex Category | Buildings | Equipment | Pre-Prod. Exp. | Interest During Constr. |
|---|---|---|---|---|
| Reinvestment | TRUE | TRUE | FALSE | FALSE |
| Linear Depreciation - Years | 20 | 8 | 5 | 5 |
| Reinvestment % of Capex | 0.50% | 2% | n/a | n/a |
| First Reinvestment - Years after Start up | 6 | 4 | n/a | n/a |
| Last Reinvestment - Years after Start up | 15 | 15 | n/a | n/a |
| No. of Months between Reinvestments | 36 | 24 | n/a | n/a |

Overheads

| Maintenance Category | Site | Buildings | Equipment |
|---|---|---|---|
| Method - % of Capex | TRUE | FALSE | TRUE |
| Method - Manual | FALSE | TRUE | FALSE |
| % of Capex | 0.50% | n/a | 2.50% |
| Manual - Numeraire | n/a | 300,000 | n/a |
| Increase - % p.a. | 0% | 0% | 0.50% |
| First Month Maintenance Inc. | n/a | n/a | 120 |
| Last Month Maintenance Inc. | n/a | n/a | 220 |

Administration Factory Overheads and Insurance

| | Administrative Costs | Factory Overheads | Insurance |
|---|---|---|---|
| Currency | USD | USD | USD |
| Cost p.a. at Prices Current at Project Start | 200,000 | 300,000 | 250,000 |
| Cost Increase p.a. - % | 0% | 0% | 0% |
| First Month Cost Increase | n/a | n/a | n/a |
| Last Month Cost Increase | n/a | n/a | n/a |

Fixed Operating Costs

Product 1: LDPE GP Film

| Fixed Operating Cost | Currency | Cost p.a. Project Start | Cost Inc. p.a. - % | First Month Increase | Last Month Increase |
|---|---|---|---|---|---|
| Three shifts | | | | | |
| Supervisors (3) | USD | 96,000 | 0% | n/a | n/a |
| First Operators (3) | USD | 72,000 | 0% | n/a | n/a |
| Operators (15) | USD | 180,000 | 0% | n/a | n/a |
| Laboratory (3) | USD | 48,000 | 0% | n/a | n/a |
| Only Daytime | | | | | |
| Chief Engineer (1) | USD | 70,000 | 0% | n/a | n/a |
| Process engineer (1) | USD | 60,000 | 0% | n/a | n/a |
| Lab Technicians (2) | USD | 72,000 | 0% | n/a | n/a |
| Plumber (1) | USD | 30,000 | 0% | n/a | n/a |
| Electrician (1) | USD | 30,000 | 0% | n/a | n/a |

Product 2: LLDPE - Butene

| Fixed Operating Cost | Currency | Cost p.a. Project Start | Cost Inc. p.a. - % | First Month Increase | Last Month Increase |
|---|---|---|---|---|---|
| Three shifts | | | | | |
| Supervisors (3) | USD | 96,000 | 0% | n/a | n/a |
| First Operators (3) | USD | 72,000 | 0% | n/a | n/a |
| Operators (20) | USD | 240,000 | 0% | n/a | n/a |
| Laboratory (3) | USD | 48,000 | 0% | n/a | n/a |
| Only Daytime | | | | | |
| Chief of plant (1) | USD | 70,000 | 0% | n/a | n/a |
| Process engineer (1) | USD | 60,000 | 0% | n/a | n/a |
| Lab Technicians (2) | USD | 72,000 | 0% | n/a | n/a |
| Computer exp. (1) | USD | 40,000 | 0% | n/a | n/a |
| Electrician (1) | USD | 30,000 | 0% | n/a | n/a |
| Plant Safety (1) | USD | 24,000 | 0% | n/a | n/a |

Product 3: LLDPE - Octene

| Fixed Operating Cost | Currency | Cost p.a. Project Start | Cost Inc. p.a. - % | First Month Increase | Last Month Increase |
|---|---|---|---|---|---|
| Three shifts | | | | | |
| Supervisors (3) | USD | 96,000 | 0% | n/a | n/a |
| First Operators (3) | USD | 72,000 | 0% | n/a | n/a |
| Operators (19) | USD | 228,000 | 0% | n/a | n/a |
| Laboratory (3) | USD | 48,000 | 0% | n/a | n/a |
| Only Daytime | | | | | |
| Chief of plant (1) | USD | 75,000 | 0% | n/a | n/a |
| Process engineer (1) | USD | 65,000 | 0% | n/a | n/a |
| Lab Technicians (2) | USD | 72,000 | 0% | n/a | n/a |
| Plumbers (2) | USD | 60,000 | 0% | n/a | n/a |
| Electrician (1) | USD | 30,000 | 0% | n/a | n/a |
| Plant Safety (1) | USD | 24,000 | 0% | n/a | n/a |

Variable Costs

Product 1: LDPE GP Film

| Name | Buten | Octen | Solvent | Hydrogen | Div. Chemcials | Electricity | Pressurized Vapor | Cooling Water | Process Water |
|---|---|---|---|---|---|---|---|---|---|
| Unit of Measurement | n/a | n/a | Kg | kg | kg | kwh | kg | cbm | Cbm |
| Input Output Coeff. | n/a | n/a | 20 | 0.02 | 1 | 600 | 610 | 250 | 0.5 |
| Minimum Stock | n/a | n/a | 2000 | 5000 | 1000 | 0 | 0 | 0 | 0 |
| Delivery Time | n/a | n/a | 80 | 20 | 45 | 0 | 0 | 0 | 0 |
| Currency | n/a | n/a | Euro | Euro | Euro | USD | USD | USD | USD |
| Price/Unit of Input | n/a | n/a | 1.5 | 0.05 | 5 | 0.1 | 0.01 | 0.02 | 0.02 |
| Input Price Trend p.a. | 0% | 0% | 0% | 0% | 0% | 0% | 0% | 0% | 0% |
| First Month Trend | n/a | n/a | n/a | n/a | n/a | n/a | n/a | n/a | n/a |
| Last Month Trend | n/a | n/a | n/a | n/a | n/a | n/a | n/a | n/a | n/a |
| % Price Swings | n/a | n/a | 0 | 0 | 0 | 0 | 0 | 0 | 0 |
| Months Length of Cycle | n/a | n/a | n/a | n/a | n/a | n/a | n/a | n/a | n/a |
| Cycle at Project Start | n/a | n/a | n/a | n/a | n/a | n/a | n/a | n/a | N/a |
| Down Payment | n/a | n/a | 15 | 15 | 15 | 0 | 0 | 0 | 0 |
| Avg. Days before Paym. | n/a | n/a | 60 | 70 | 50 | 30 | 0 | 0 | 0 |

Product 1: LDPE GP Film - Flexible Input Pricing

| Name | EthylensupplyInc Contr 1 |
|---|---|
| Unit of Measurement | tons |
| Input Output Coeff. | 1.05 |
| Minimum Stock | 1,000 |
| Delivery Time | 0 |
| Trigger Price Deferral-USD | 450 |
| % deferred | 50% |
| Max. Amount deferred | 2,000,000 |
| % Interest p.a. on deferred Amount | 5% |
| Sales Contract | LDPE Contract 1 |
| Currency | USD |
| Cost/Unit as % of Sales Price | 40% |
| Minimum Price/Unit Input (USD) | 300 |
| %- Minimum Price increase p.a. | 0% |
| First Month Trend | n/a |
| Last Month Trend | n/a |
| Down Payment | 15 |
| Avg. Days before Paym. | 60 |

Product 2: LLDPE - Butene

| Name | Buten | Octen | Solvent | Hydrogen | Div. Chemcials | Electricity | Pressurized Vapor | Cooling Water | Process Water |
|---|---|---|---|---|---|---|---|---|---|
| Unit of Measurement | kg | n/a | kg | kg | kg | Kwh | kg | cbm | cbm |
| Input Output Coeff. | 90 | n/a | 17 | 0.01 | 1 | 540 | 610 | 300 | 0.4 |
| Minimum Stock | 2000 | n/a | 2000 | 2500 | 1000 | 0 | 0 | 0 | 0 |
| Delivery Time | 30 | n/a | 80 | 20 | 50 | 0 | 0 | 0 | 0 |
| Currency | Pound | n/a | Euro | Euro | Euro | USD | USD | USD | USD |
| Price/Unit of Input | 1.5 | n/a | 1.5 | 0.05 | 10 | 0.1 | 0.01 | 0.02 | 0.02 |
| Input Price Trend p.a. | 0% | 0% | 0% | 0% | 0% | 0% | 0% | 0% | 0% |
| First Month Trend | n/a | n/a | n/a | n/a | n/a | N/a | n/a | n/a | n/a |
| Last Month Trend | n/a | n/a | n/a | n/a | n/a | N/a | n/a | n/a | n/a |
| % Price Swings | n/a | n/a | 0 | 0 | 0 | 0 | 0 | 0 | 0 |
| Months Length of Cycle | n/a | n/a | n/a | n/a | n/a | n/a | n/a | n/a | n/a |
| Cycle at Project | n/a | n/a | n/a | n/a | n/a | n/a | n/a | n/a | n/a |

-continued

Product 2: LLDPE - Butene

| Name | Buten | Octen | Solvent | Hydrogen | Div. Chemcials | Electricity | Pressurized Vapor | Cooling Water | Process Water |
|---|---|---|---|---|---|---|---|---|---|
| Start | | | | | | | | | |
| Down Payment | n/a | n/a | 15 | 15 | 15 | 15 | 0 | 0 | 0 |
| Avg. Days before Paym. | n/a | n/a | 60 | 70 | 50 | 50 | 0 | 0 | 0 |

Product 2: Flexible Input Pricing

| Name | EthylensupplyInc Contr 2 |
|---|---|
| Unit of Measurement | Tons |
| Input Output Coeff. | 1.05 |
| Minimum Stock | 1,000 |
| Delivery Time | 0 |
| Trigger Price Deferral | 3,500 |
| % deferred | 50% |
| Max. Amount deferred | 4,000,000 |
| % Interest p.a. on deferred Amount | 5% |
| Sales Contract | LLDPE Butene Contract 2 |
| Currency | Peso |
| Cost/Unit as % of Sales Price | 40% |
| Minimum Price/Unit Input (Peso) | 1800 |
| %- Minimum Price increase p.a. | 0% |
| First Month Trend | n/a |
| Last Month Trend | n/a |
| Down Payment | 15 |
| Avg. Days before Paym. | 60 |

Product 3: Flexible Input Pricing

| Name | EthanGasVendor |
|---|---|
| Unit of Measurement | Tons |
| Input Output Coeff. | 1.08 |
| Minimum Stock | 1,000 |
| Delivery Time | 0 |
| Trigger Price Deferral | 1,500 |
| % deferred | 50% |
| Max. Amount deferred | 2,000,000 |
| % Interest p.a. on deferred Amount | 5% |
| Sales Contract | LLDPE Octene Contract 2 |
| Currency | Peso |
| Cost/Unit as % of Sales Price | 25% |
| Minimum Price/Unit Input (Peso) | ? |
| %- Minimum Price increase p.a. | 0% |
| First Month Trend | n/a |
| Last Month Trend | n/a |
| Down Payment | 15 |
| Avg. Days before Paym. | 60 |

Product 3: LLDPE - Octene

| Name | Buten | Octen | Solvent | Hydrogen | Div. Chemcials | Electricity | Pressurized Vapor | Cooling Water | Process Water |
|---|---|---|---|---|---|---|---|---|---|
| Unit of Measurement | n/a | kg | kg | kg | kg | Kwh | kg | cbm | cbm |
| Input Output Coeff. | n/a | 85 | 22 | 0.03 | 1 | 580 | 640 | 300 | 0.4 |
| Minimum Stock | n/a | 2000 | 2000 | 2500 | 1000 | 0 | 0 | 0 | 0 |
| Delivery Time | n/a | 40 | 80 | 20 | 50 | 0 | 0 | 0 | 0 |
| Currency | n/a | Euro | Euro | Euro | Euro | USD | USD | USD | USD |
| Price/Unit of Input | n/a | 75 | 1.5 | 0.05 | 12 | 0.1 | 0.01 | 0.02 | 0.02 |
| Input Price Trend p.a. | 0% | 0% | 0% | 0% | 0% | 0% | 0% | 0% | 0% |
| First Month Trend | n/a | n/a | n/a | n/a | n/a | n/a | n/a | n/a | n/a |
| Last Month Trend | n/a | n/a | n/a | n/a | n/a | n/a | n/a | n/a | n/a |
| % Price Swings | n/a | n/a | 0 | 0 | 0 | 0 | 0 | 0 | 0 |
| Months Length of Cycle | n/a | n/a | n/a | n/a | n/a | n/a | n/a | n/a | n/a |
| Cycle at Project Start | n/a | n/a | n/a | n/a | n/a | n/a | n/a | n/a | n/a |
| Down Payment | n/a | 15 | 15 | 15 | 15 | 15 | 0 | 0 | 0 |
| Avg. Days before Paym. | n/a | 60 | 60 | 70 | 50 | 50 | 0 | 0 | 0 |

Sales—Offtake Contracts

| Product 1: LDPE GP Film | | |
|---|---|---|
| Offtake Contract Data | | |
| Product | LDPE GP Film | LDPE GP Film |
| Contract | LDPE GP Film Contract 1 | LDPE GP Film Contract 2 |
| Contract Currency | USD | Pound |
| Share of Contract | 50% | 50% |
| Avg. No. Days before Receipt of Payment | 60 | 30 |
| Automatic Price | TRUE | TRUE |
| Price per Unit | 2,300 | 2,400 |
| Sales Price Trend p.a. | 0% | 0% |
| First Month Trend | n/a | n/a |
| Last Month Trend | n/a | n/a |
| % Price Swings | 0% | 0% |
| Months-Length of Cycle | n/a | n/a |
| Cycle at Project Start | n/a | n/a |
| Sales Expenses Company | | |
| Currency Transport Cost | USD | USD |
| Transport Cost/Unit | 60 | 60 |
| % Cost Increase p.a. | 0% | 0% |
| First Month Transport Cost Increase | n/a | n/a |
| Last Month Transport Cost Increase | n/a | n/a |
| Currency Insurance | USD | USD |
| Insurance Cost/Unit | 1.5 | 1.5 |
| % Cost Increase p.a. | 0% | 0% |
| First Month Insurance Cost Increase | n/a | n/a |
| Last Month Insurance Cost Increase | n/a | n/a |
| Sales Expenses Off-Taker | | |
| Currency Transport Cost | Peso | Pound |
| Transport Cost/Unit | 200 | 20 |
| % Cost Increase p.a. | 0% | 0% |
| First Month Transport Cost Increase | n/a | n/a |
| Last Month Transport Cost Increase | n/a | n/a |
| Currency Insurance | Peso | Pound |
| Insurance Cost/Unit | 100 | 2 |
| % Cost Increase p.a. | 0% | 0% |
| First Month Insurance Cost Increase | n/a | n/a |
| Last Month Insurance Cost Increase | n/a | n/a |
| Fees | | |
| Handling Fee - % | 5% | 5% |
| Flat Fee p.a. | 0 | 0 |
| % Flat Fee Increase p.a. | n/a | n/a |
| First Month Flat Fee Increase | n/a | n/a |
| Last Month Flat Fee Increase | n/a | n/a |
| Taxes and Duty | | |
| Indirect Tax - % | 10% | 0% |
| Duty | 5% | 0% |
| % Handling Fee deferred | 50% | 50% |
| % Flat fee deferred | 0% | 0% |
| Trigger Price | USD 2,700 | Pound 2750 |
| Max. amount deferred | USD 500,000 | Pound 500,000 |
| % Interest on deferred Amount | 5% | 5% |

| Product 2: LLDPE - Butene | | |
|---|---|---|
| Offtake Contract Data | | |
| Product | LLDPE Butene | LLDPE Butene |
| Contract | LLDPE Butene Contract 1 | LLDPE Butene Contract 2 |
| Contract Currency | Yen | Peso |
| Share of Contract | 50% | 50% |
| Avg. No. Days before Receipt of Payment | 60 | 30 |
| Automatic Price | TRUE | TRUE |
| Price per Unit | 100,000 | 8,500 |
| Sales Price Trend p.a. | 0% | 0% |
| First Month Trend | n/a | n/a |
| Last Month Trend | n/a | n/a |
| % Price Swings | 0% | 0% |
| Months-Length of Cycle | n/a | n/a |
| Cycle at Project Start | n/a | n/a |
| Sales Expenses Company | | |
| Currency Transport Cost | USD | USD |
| Transport Cost/Unit | 60 | 60 |
| % Cost Increase p.a. | 0% | 0% |
| First Month Transport Cost Increase | n/a | n/a |
| Last Month Transport Cost Increase | n/a | n/a |
| Currency Insurance | USD | USD |
| Insurance Cost/Unit | 1.5 | 1.5 |
| % Cost Increase p.a. | 0% | 0% |
| First Month Insurance Cost Increase | n/a | n/a |
| Last Month Insurance Cost Increase | n/a | n/a |
| Sales Expenses Off-Taker | | |
| Currency Transport Cost | Yen | Peso |
| Transport Cost/Unit | 2000 | 300 |
| % Cost Increase p.a. | 0% | 0% |
| First Month Transport Cost Increase | n/a | n/a |
| Last Month Transport Cost Increase | n/a | n/a |
| Currency Insurance | Yen | Peso |
| Insurance Cost/Unit | 500 | 50 |
| % Cost Increase p.a. | 0% | 0% |
| First Month Insurance Cost Increase | n/a | n/a |
| Last Month Insurance Cost Increase | n/a | n/a |
| Fees | | |
| Handling Fee - % | 5% | 5% |
| Flat Fee p.a. | 0% | 0% |
| % Flat Fee Increase p.a. | n/a | n/a |
| First Month Flat Fee Increase | n/a | n/a |
| Last Month Flat Fee Increase | n/a | n/a |
| Taxes and Duty | | |
| Indirect Tax - % | 10% | 0% |
| Duty | 5% | 0% |
| % Handling Fee deferred | 50% | 50% |
| % Flat fee deferred | 0% | 0% |
| Trigger Price | Yen 120,000 | Peso 95,000 |
| Max. amount deferred | Yen 50,000,000 | Peso 2,500,000 |
| % Interest on deferred Amount | 5% | 5% |

| Product 3: LLDPE - Octene | | |
|---|---|---|
| Offtake Contract Data | | |
| Product | LLDPE Octene | LLDPE Octene |
| Contract | LLDPE Octene Contract 1 | LLDPE Octene Contract 2 |
| Contract Currency | Peso | Pound |
| Share of Contract | 40% | 60% |
| Avg. No. Days before Receipt of Payment | 60 | 30 |
| Automatic Price | TRUE | TRUE |
| Price per Unit | 8,000 | 3,000 |
| Sales Price Trend p.a. | 0% | 0% |
| First Month Trend | n/a | n/a |
| Last Month Trend | n/a | n/a |
| % Price Swings | 0% | 0% |
| Months-Length of Cycle | n/a | n/a |
| Cycle at Project Start | n/a | n/a |
| Sales Expenses Company | | |
| Currency Transport Cost | USD | USD |
| Transport Cost/Unit | 60 | 60 |
| % Cost Increase p.a. | 0% | 0% |
| First Month Transport Cost Increase | n/a | n/a |
| Last Month Transport Cost Increase | n/a | n/a |
| Currency Insurance | USD | USD |
| Insurance Cost/Unit | 1.5 | 1.5 |
| % Cost Increase p.a. | 0% | 0% |
| First Month Insurance Cost Increase | n/a | n/a |
| Last Month Insurance Cost Increase | n/a | n/a |
| Sales Expenses Off-Taker | | |
| Currency Transport Cost | Peso | Pound |
| Transport Cost/Unit | 200 | 20 |
| % Cost Increase p.a. | 0% | 0% |
| First Month Transport Cost Increase | n/a | n/a |
| Last Month Transport Cost Increase | n/a | n/a |
| Currency Insurance | Peso | Pound |
| Insurance Cost/Unit | 100 | 2 |
| % Cost Increase p.a. | 0% | 0% |
| First Month Insurance Cost Increase | n/a | n/a |
| Last Month Insurance Cost Increase | n/a | n/a |
| Fees | | |
| Handling Fee- % | 5% | 5% |
| Flat Fee p.a. | 0 | 0 |
| % Flat Fee Increase p.a. | n/a | n/a |
| First Month Flat Fee Increase | n/a | n/a |
| Last Month Flat Fee Increase | n/a | n/a |
| Taxes and Duty | | |
| Indirect Tax- % | 10% | 0% |
| Duty | 5% | 0% |
| Deferral | | |
| % Handling Fee deferred | 50% | 50% |
| % Flat fee deferred | 0% | 0% |
| Trigger Price | Peso 15,000 | Pound 8,000 |
| Max. amount deferred | Peso 2,500,000 | Pound 500,000 |
| % Interest on deferred Amount | 5% | 5% |

EXAMPLE II

The Toll Road Project

You are an US-based investor who wants to go into the toll road business in Franc-country. The Government gives you the Scenic Toll Road Rights (STR) for 15 years but expects your project company to built and operate the road. After 15 years of operation the project company has to hand over the STR to Franc-Country. The Government pays you the book value of the STR at the time of transfer provided the road is well maintained. You have to write off the road within 25 years.

You hire an US-contractor to do the work. Most of the construction costs are in Francs. But there is a substantial import content in the bridges' part of the contract.

Your traffic projection shows that traffic is initially flat and only picks up slowly. Overtime traffic increases substantially. Tolls are regulated.

You have identified a bank that is willing to give you an USD-loan for the investment. The bank does not finance consulting and legal fees. Further, it does not finance the 15 percent down payment to the contractor.

As your cash flow is initially flat the bank agrees to adapt the debt service to your projected payment capacities.

The bank asks for a debt service account and stand by loans for both the construction and the repayment phase. It requires an equity ratio of 30 percent or higher until start up. You have to wait one year after start up before you can take out money.

You find the necessary entries below and in the case file tollroad.xls on the PROFINTOOLS PROJECT FINANCE CD. The case was calculated at constant prices. It is up to you to do the sensitivity testing.

It will take—depending on the speed of your computer— up to a couple of minutes to reconfigure PROFINTOOLS PROJECT FINANCE (go to File, Open and select Tollroad.xls).

Questions:
1. The Government allows you to increase tolls up to 10 percent after three years of operation in case the Peso devaluates more than 10 percent after start up. How big a devaluation can the company withstand?
   On the general menu go to Global. On the drop down menu click on Currencies.
   Generate a currency shock after three years of operations.
2. Try out varying traffic figures.
   On the general menu select Global. On the drop down menu click on Name, Schedule and Technical Specifications. Change the Traffic figures. Change the growth patterns—playing with different learning curves.
3. The bank offers you a longer repayment schedule of sixteen equal installments combined with a sweep and a slightly higher interest rate of 5.5 percent. Until full repayment of the loan 80 percent of the free cash flow have to be allocated to the sweep. Does the project still make economic sense?
   On the general menu select Loans. On the drop down menu go to Bank Loans. Change the repayment method to Equal Installments and press the Sweep toggle (to go back to the manual repayment schedule you will have to revert to the CD).

Basic Project Data

| Project Name | Toll road |
|---|---|
| Project start: | Jun-01 |
| Start up of Operations - Project Month | 30 |
| Fiscal year | Feb–Jan |
| End of Project - Project Month | 210 |

Products

| Product Name | Passenger Cars | Trucks | Buses |
|---|---|---|---|
| Measurement Unit of Output | Cars | Trucks | Bus |
| Maximum Capacity p.a. | 100,000,000 | 10,000,000 | 50,000 |
| Actual Capacity usage | 100% | 100% | 100% |
| Capacity Usage at Start up | 5% | 5% | 5% |
| Learning Period - Months | 150 | 180 | 150 |
| Type of Learning Curve | Flat Learning Curve | Flat Learning Curve | Flat Learning Curve |
| Production time/ Unit of Output | n/a | n/a | n/a |
| Share in overheads | 20% | 60% | 20% |

Currencies

Numeraire

| Numeraire | USD |
|---|---|
| GDP Deflator - % | 0 |
| Last Project Month Inflation | n/a |

Additional Currencies

| Name | Franc |
|---|---|
| Exchange Rate | 3 |
| Exchg. Rate Trend | 0% |
| Last Month of Exch. Rate Trend | n/a |
| Currency Swings | 0% |
| Length of Currency Cycle | n/a |
| Start of Currency Cycle | n/a |
| One Time App./Depreciation | n/a |
| Month of One Time App./Depreciation | n/a |

Capital Expenditure

Capex Buildings

| | Contract | | | |
|---|---|---|---|---|
| | Bridge | | Road Construction | |
| | Contract Currency | | | |
| | USD | Franc | USD | Franc |
| | Customs - % | | | |
| Project Month | 5% Import Content | Local Content | 0% Import Content | Local Content |
| 1 | | 45,000,000 | 4,500,000 | 90,000,000 |
| 2 | | | | |
| 3 | | | | |
| 4 | | | 1,000,000 | |
| 5 | | | 1,000,000 | |
| 6 | 7,500,000 | | 1,000,000 | 9,000,000 |
| 7 | | | 1,000,000 | 9,000,000 |
| 8 | | | 1,000,000 | 9,000,000 |
| 9 | | | 1,000,000 | 9,000,000 |
| 10 | | | 1,000,000 | 18,000,000 |
| 11 | | 9,000,000 | 1,000,000 | 18,000,000 |
| 12 | 500,000 | 9,000,000 | 1,000,000 | 18,000,000 |
| 13 | 500,000 | 9,000,000 | 1,000,000 | 18,000,000 |
| 14 | 500,000 | 12,000,000 | 1,000,000 | 18,000,000 |
| 15 | 500,000 | 12,000,000 | 1,000,000 | 18,000,000 |
| 16 | 500,000 | 30,000,000 | 1,000,000 | 21,000,000 |
| 17 | 1,000,000 | 30,000,000 | 1,000,000 | 21,000,000 |
| 18 | 1,000,000 | 30,000,000 | 1,000,000 | 21,000,000 |
| 19 | 2,000,000 | 36,000,000 | 1,000,000 | 24,000,000 |
| 20 | 5,000,000 | 12,000,000 | 1,000,000 | 21,000,000 |
| 21 | 5,000,000 | 12,000,000 | 1,000,000 | 21,000,000 |
| 22 | 9,000,000 | 12,000,000 | 1,000,000 | 21,000,000 |
| 23 | 5,000,000 | 12,000,000 | 1,000,000 | 21,000,000 |
| 24 | 3,000,000 | 12,000,000 | 1,000,000 | 27,000,000 |
| 25 | 2,000,000 | 900,000 | 1,000,000 | 27,000,000 |
| 26 | 1,000,000 | 900,000 | 1,000,000 | 27,000,000 |
| 27 | 500,000 | 900,000 | 1,000,000 | 27,000,000 |
| 28 | 500,000 | 300,000 | | 27,000,000 |
| 29 | | | | 18,000,000 |
| 30 | | | | |
| 31 | | | | |
| 32 | | | | |
| 33 | | | | |
| 34 | | | | |
| 35 | | | | |
| 36 | | | | |
| 37 | | | | |
| 38 | | | | |
| 39 | | | | |
| 40 | | | | |
| 41 | | | | |
| 42 | 5,000,000 | 15,000,000 | 1,500,000 | 30,000,000 |

USD 5,000,000 Francs 300,000,000 USD 30,000,000 Francs 600,000,000

Capex Pre-Production Costs

| | Contract | | | |
| | Engineering | | Supervision | |
| | Contract Currency | | | |
| | USD | Franc | USD | Franc |
| | | Customs - % | | |
| Project Month | 5% Import Content | Local Content | 0% Import Content | Local Content |
|---|---|---|---|---|
| 1 | 1,500,000 | | 150,000 | |
| 2 | 1,000,000 | | | |
| 3 | 2,000,000 | | | |
| 4 | 2,000,000 | | 25,000 | |
| 5 | 2,000,000 | | 25,000 | |
| 6 | 1,000,000 | | 25,000 | 300,000 |
| 7 | | | 25,000 | 12,000 |
| 8 | 500,000 | | 25,000 | 9,000 |
| 9 | | | 25,000 | 8,000 |
| 10 | | | 25,000 | 3,000 |
| 11 | | | 25,000 | |
| 12 | | | 25,000 | |
| 13 | | | 25,000 | |
| 14 | | | 25,000 | |
| 15 | | | 25,000 | |
| 16 | | | 25,000 | |
| 17 | | | 25,000 | |
| 18 | | | 25,000 | |
| 19 | | | 25,000 | |
| 20 | | | 25,000 | |
| 21 | | | 25,000 | |
| 22 | | | 25,000 | |
| 23 | | | 25,000 | |
| 24 | | | 25,000 | |
| 25 | | | 25,000 | |
| 26 | | | 25,000 | |
| 27 | | | 25,000 | |
| 28 | | | 25,000 | |
| 29 | | | 25,000 | |
| 30 | | | 25,000 | |
| 31 | | | | |
| 32 | | | | |
| 33 | | | | |
| 34 | | | | |
| 35 | | | | |
| 36 | | | | |
| 37 | | | | |
| 38 | | | | |
| 39 | | | | |
| 40 | | | | |
| 41 | | | | |
| 42 | | | | 50,000 |

Total USD 10,000,000 USD 1,000,000 Francs 330,000

Equity

| Project Month | Capital Paid in this Month - USD |
|---|---|
| 1 | 60,000,000 |
| 2 | |
| 3 | |
| 4 | 800,000 |
| 5 | 3,100,000 |
| 6 | 13,350,000 |
| 7 | 500,000 |
| 8 | 1,400,000 |
| 9 | 1,100,000 |
| 10 | 850,000 |
| 11 | 900,000 |
| 12 | 1,700,000 |
| 13 | 1,150,000 |
| 14 | 1,200,000 |
| 15 | 1,500,000 |
| 16 | 1,300,000 |
| 17 | 1,300,000 |
| 18 | 2,750,000 |
| 19 | 1,900,000 |
| 20 | 1,800,000 |
| 21 | 1,950,000 |
| 22 | 1,900,000 |
| 23 | 4,200,000 |
| 24 | 14,000,000 |
| 25 | 3,700,000 |
| 26 | 5,500,000 |
| 27 | 4,500,000 |
| 28 | 4,000,000 |
| 29 | 6,000,000 |
| 30 | 12,000,000 |
| Total | 154,350,000 |

Loans

| Bank Loans | |
|---|---|
| Loan Name | Construction Loan |
| Loan Currency | USD |
| Interest | |
| Interest p.a. - % | 5% |
| Interest Calc. Method | Standard |
| No. of Month Interest is paid in Arrears | 6 |
| % of Interest Capitalized | 0% |
| Fees | |
| Management Fee % | 1% |
| Arrangement Fee % | n/a |
| Commitment fee % | 0.25% |
| No. of Month Commitment Fee is paid in Arrears | 3 |
| Debt Service Reserve Account | |
| Disbursement Phase DSRA - % of next Debt Service | 100% |
| Repayment Phase DSRA - % of next Debt Service | 100% |
| Interest on DSRA - % p.a. | 5% |
| Monthly Step ups | TRUE |
| Financing | |
| Capex - Type/Manual | Manual |
| Contract | n/a |
| Category | n/a |
| % of Payments Financed | n/a |
| Repayment Method | |
| Repayment Method | Manual |
| Sweep | n/a |
| First Repayment Month | 36 |
| Month - Start Repayment Phase | 30 |
| Months between Installments | 6 |
| No. of Installments | 12 |
| Last Month Capitalization of Interest | n/a |
| Disbursement Schedule | |
| Month of Loan Effectiveness | 1 |
| First Disbursement Month | 7 |
| Last Disbursement Month | 42 |

Stand by Loans

| | |
|---|---|
| Stand by Loan Construction Phase | USD |
| Maximum Amount | 20,000,000 |
| % Interest p.a. | 5% |
| Stand by Loan Repayment Phase | USD |
| Maximum Amount | 5,000,000 |
| Last Disbursement Month Stand by Repayment Phase | 54 |
| % Interest p.a. | 7% |

Dividends

| | |
|---|---|
| % - Dividend | 100% |
| Payments | Annually |
| First Dividend Month | 42 |

Taxes

| | |
|---|---|
| Manual Tax Rate Entry | FALSE |
| Automatic Tax Rate Entry | TRUE |
| % - Tax Rate retained Income | 20% |
| % - Tax Rate disbursed Income | 30% |
| Tax Payment | Annually |
| Tax Holiday - Until Project Month | 42 |
| % - Tax Rate retained Income during Holiday | 0% |
| % - Tax Rate Disb. Income during Holiday | 0% |
| Years - Carry forward Losses | 4 |

Depreciation

| Capex Category | Buildings | Pre-Prod. Exp. |
|---|---|---|
| Reinvestment | TRUE | FALSE |
| Linear Depreciation - Years | 25 | 5 |
| Reinvestment % of Capex | 10% | N/a |
| First Reinvestment - Years after Start up | 7 | N/a |
| Last Reinvestment - Years after Start up | 14 | N/a |
| No. of Months between Reinvestments | 84 | N/a |

Overheads

Maintenance

| Maintenance Category | Buildings |
|---|---|
| Method - % of Capex | FALSE |
| Method - Manual | TRUE |
| % of Capex | n/a |
| Manual - Numeraire | 0.5% |
| Increase - % p.a. | 0% |
| First Month Maintenance Increase | n/a |
| Last Month Maintenance Increase | n/a |

Administration Factory Overheads and Insurance

| | Administrative Costs | Factory Overheads | Insurance |
|---|---|---|---|
| Currency | Franc | Franc | USD |
| Cost p.a. at Prices Current at Project Start | 300,000 | 25,000,000 | 400,000 |
| Cost Increase p.a. - % | 0% | 0% | 0% |
| First Month Cost Increase | n/a | n/a | n/a |
| Last Month Cost Increase | n/a | n/a | n/a |

Fixed Operating Costs

Product 1: Passenger Cars

| Fixed Operating Cost | Currency | Cost p.a. Project Start | Cost Inc. p.a. - % | First Month Increase | Last Month Increase |
|---|---|---|---|---|---|
| Cashiers Passenger Lanes | Franc | 1,800,000 | 0% | n/a | n/a |
| Safety Personnel | Franc | 900,000 | 0% | n/a | n/a |

Product 2: Trucks

| Fixed Operating Cost | Currency | Cost p.a. Project Start | Cost Inc. p.a. - % | First Month Increase | Last Month Increase |
|---|---|---|---|---|---|
| Cashiers Truck Lanes | Franc | 900,000 | 0% | n/a | n/a |
| Weigh Station | Franc | 1,200,000 | 0% | n/a | n/a |

Product 3: Buses

| Fixed Operating Costs | Currency | Cost p.a. Project Start | Cost Inc. p.a. - % | First Month Increase | Last Month Increase |
|---|---|---|---|---|---|
| Cashiers Bus Lanes | Franc | 360,000 | 0% | n/a | n/a |

Variable Costs

Product 1: Passenger Cars

| Name | Wayside Cleanups |
|---|---|
| Unit of Measurement | Cleanup |
| Input Output Coeff. | 0.005 |
| Minimum Stock | n/a |
| Delivery Time | n/a |
| Currency | Franc |
| Price/Unit of Input | 300 |
| Input Price Trend p.a. | 0% |
| First Month Trend | n/a |
| Last Month Trend | n/a |
| % Price Swings | n/a |
| Months Length of Cycle | n/a |
| Cycle at Project Start | n/a |
| Down Payment | n/a |
| Avg. Days before Paym. | n/a |

| Product 3: Buses | |
|---|---|
| Name | Wayside cleanup |
| Unit of Measurement | Clean up |
| Input Output Coeff. | 0.01 |
| Minimum Stock | n/a |
| Delivery Time | n/a |
| Currency | Franc |
| Price/Unit of Input | 200 |
| Input Price Trend p.a. | 0% |
| First Month Trend | n/a |
| Last Month Trend | n/a |
| % Price Swings | n/a |
| Months Length of Cycle | n/a |
| Cycle at Project Start | n/a |
| Down Payment | n/a |
| Avg. Days before Paym. | n/a |

Sales—Offtake Contracts

| Product 1 Passenger Cars | |
|---|---|
| Offtake Contract Data | |
| Product | Passenger Cars |
| Contract | Avg. Passenger Tariff |
| Contract Currency | Franc |
| Share of Contract | 100% |
| Avg. No. Days before Receipt of Payment | 0 |
| Automatic Price | TRUE |
| Price per Unit | 30 |
| Sales Price Trend p.a. | 0% |
| First Month Trend | n/a |
| Last Month Trend | n/a |
| % Price Swings | 0% |
| Months - Length of Cycle | n/a |
| Cycle at Project Start | n/a |
| Sales Expenses Company | |
| Currency Transport Cost | USD |
| Transport Cost/Unit | 0 |
| % Cost Increase p.a. | 0% |
| First Month Transport Cost Increase | n/a |
| Last Month Transport Cost Increase | n/a |
| Currency Insurance | USD |
| Insurance Cost/Unit | 0 |
| % Cost Increase p.a. | 0% |
| First Month Insurance Cost Increase | n/a |
| Last Month Insurance Cost Increase | n/a |
| Sales Expenses Off-Taker | |
| Currency Transport Cost | USD |
| Transport Cost/Unit | 0 |
| % Cost Increase p.a. | 0% |
| First Month Transport Cost Increase | n/a |
| Last Month Transport Cost Increase | n/a |
| Currency Insurance | USD |
| Insurance Cost/Unit | 0 |
| % Cost Increase p.a. | 0% |
| First Month Insurance Cost Increase | n/a |
| Last Month Insurance Cost Increase | n/a |
| Fees | |
| Handling Fee - % | 0% |
| Flat Fee p.a. | 0 |
| % Flat Fee Increase p.a. | n/a |
| First Month Flat Fee Increase | n/a |
| Last Month Flat Fee Increase | n/a |
| Taxes and Duty | |
| Indirect Tax - % | 0% |
| Duty | 0% |

| Product 1 Passenger Cars | |
|---|---|
| % Handling Fee deferred | 0% |
| % Flat fee deferred | 0% |
| Trigger Price | 0 |
| Max. amount deferred | 0 |
| % Interest on deferred Amount | 0% |

| Product 2: Trucks | |
|---|---|
| Offtake Contract Data | |
| Product | Trucks |
| Contract | Avg. Truck Tariff |
| Contract Currency | Franc |
| Share of Contract | 100% |
| Avg. No. Days before Receipt of Payment | 0 |
| Automatic Price | TRUE |
| Price per Unit | 90 |
| Sales Price Trend p.a. | 0% |
| First Month Trend | n/a |
| Last Month Trend | n/a |
| % Price Swings | 0% |
| Months - Length of Cycle | n/a |
| Cycle at Project Start | n/a |
| Sales Expenses Company | |
| Currency Transport Cost | USD |
| Transport Cost/Unit | 0 |
| % Cost Increase p.a. | 0% |
| First Month Transport Cost Increase | n/a |
| Last Month Transport Cost Increase | n/a |
| Currency Insurance | USD |
| Insurance Cost/Unit | 0 |
| % Cost Increase p.a. | 0% |
| First Month Insurance Cost Increase | n/a |
| Last Month Insurance Cost Increase | n/a |
| Sales Expenses Off-Taker | |
| Currency Transport Cost | USD |
| Transport Cost/Unit | 0 |
| % Cost Increase p.a. | 0% |
| First Month Transport Cost Increase | n/a |
| Last Month Transport Cost Increase | n/a |
| Currency Insurance | USD |
| Insurance Cost/Unit | 0 |
| % Cost Increase p.a. | 0% |
| First Month Insurance Cost Increase | n/a |
| Last Month Insurance Cost Increase | n/a |
| Fees | |
| Handling Fee - % | 0% |
| Flat Fee p.a. | 0 |
| % Flat Fee Increase p.a. | n/a |
| First Month Flat Fee Increase | n/a |
| Last Month Flat Fee Increase | n/a |
| Taxes and Duty | |
| Indirect Tax - % | 0% |
| Duty | 0% |
| % Handling Fee deferred | 0% |
| % Flat fee deferred | 0% |
| Trigger Price | 0 |
| Max. amount deferred | 0 |
| % Interest on deferred Amount | 0% |

| Product 3: Buses | |
|---|---|
| Offtake Contract Data | |
| Product | Buses |
| Contract | Avg. Bus Tariff |
| Contract Currency | Franc |
| Share of Contract | 100% |
| Avg. No. Days before Receipt of Payment | 0 |
| Automatic Price | TRUE |
| Price per Unit | 60 |
| Sales Price Trend p.a. | 0% |
| First Month Trend | n/a |
| Last Month Trend | n/a |
| % Price Swings | 0% |
| Months - Length of Cycle | n/a |
| Cycle at Project Start | n/a |
| Sales Expenses Company | |
| Currency Transport Cost | USD |
| Transport Cost/Unit | 0 |
| % Cost Increase p.a. | 0% |
| First Month Transport Cost Increase | n/a |
| Last Month Transport Cost Increase | n/a |
| Currency Insurance | USD |
| Insurance Cost/Unit | 0 |
| % Cost Increase p.a. | 0% |
| First Month Insurance Cost Increase | n/a |
| Last Month Insurance Cost Increase | n/a |
| Sales Expenses Off-Taker | |
| Currency Transport Cost | USD |
| Transport Cost/Unit | 0 |
| % Cost Increase p.a. | 0% |
| First Month Transport Cost Increase | n/a |
| Last Month Transport Cost Increase | n/a |
| Currency Insurance | USD |
| Insurance Cost/Unit | 0 |
| % Cost Increase p.a. | 0% |
| First Month Insurance Cost Increase | n/a |
| Last Month Insurance Cost Increase | n/a |
| Fees | |
| Handling Fee - % | 0% |
| Flat Fee p.a. | 0 |
| % Flat Fee Increase p.a. | n/a |
| First Month Flat Fee Increase | n/a |
| Last Month Flat Fee Increase | n/a |
| Taxes and Duty | |
| Indirect Tax - % | 0% |
| Duty | 0% |
| % Handling Fee deferred | 0% |
| % Flat fee deferred | 0% |
| Trigger Price | 0 |
| Max. amount deferred | 0 |
| % Interest on deferred Amount | 0% |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. A method for implementing a machine-readable financial simulation computer program product for creating a project preparation, negotiating and testing environment using project finance tools, comprising:

installing the program which is contained as computer readable code on a computer usable medium for generating financial statements, financial data, charts, graphs and reports using the project finance tools providing limited recourse including debt service reserve accounts, stand-by loans and risk sharing with suppliers and off-takers in a computer;

entry and editing of data representative of multiple contracts and multiple capital expenditure categories;

selecting a desired loan financing time horizon;

setting a percentage of a capital expenditure time series to be financed; and generating a loan disbursement time series independent of changes in capital expenditures and exchange rates based on an earlier automatically generated disbursement time series, wherein the capital expenditure categories serve as a basis for loan financing comprise a first category which includes total capital expenditure, site, buildings, equipment and pre-production costs; a second category which includes total expenditure in a category element or sub-elements which include imports, local content, customs, imports and customs, local content and customs, and imports and customs; a third category which is an individual contract; and a fourth category which includes a total expenditure of a contract or sub-elements thereof, including imports, local content, customs, imports and customs, local content and customs, and imports and local content.

2. A method for implementing a machine-readable financial simulation computer program product for creating a project preparation, negotiating and testing environment using project finance tools, comprising:

installing the program which is contained as computer readable code on a computer usable medium for generating financial statements, financial data, charts, graphs and reports using the project finance tools providing limited recourse including debt service reserve accounts, stand-by loans and risk sharing with suppliers and off-takers in a computer;

entry and editing of data representative of multiple contracts and multiple capital expenditure categories;

selecting a desired loan financing time horizon;

setting a percentage of a capital expenditure time series to be financed; and generating a loan disbursement time series and independent of changes in capital expenditures and exchange rates based on an earlier automatically generated disbursement time series, further comprising sharing cash flow risks with a supplier including, upon selection of a sales contract and inputting of a percentage to be applied to a sales price of the selected sales contract to obtain input price, establishing a link between the sales contract and the input price and entering the name of the selected sales contract into a variable input record to allow the input price in units of account to vary—subject to a minimum price time series—with the sales price time series and an associated exchange rate time series.

* * * * *